United States Patent
Yamamoto et al.

(10) Patent No.: US 9,174,526 B2
(45) Date of Patent: Nov. 3, 2015

(54) DRIVE CONTROLLER FOR VEHICLE

(75) Inventors: Akihiro Yamamoto, Saitama (JP); Tomokazu Katayama, Saitama (JP); Yoshihiro Kanamaru, Saitama (JP); Sei Shinohara, Saitama (JP); Nobuyuki Hiramatsu, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 305 days.

(21) Appl. No.: 13/387,696

(22) PCT Filed: Jul. 30, 2010

(86) PCT No.: PCT/JP2010/062956
§ 371 (c)(1),
(2), (4) Date: Jan. 27, 2012

(87) PCT Pub. No.: WO2011/013828
PCT Pub. Date: Feb. 3, 2011

(65) Prior Publication Data
US 2012/0143426 A1    Jun. 7, 2012

(30) Foreign Application Priority Data

Jul. 31, 2009 (JP) ................. 2009-180059
Jul. 31, 2009 (JP) ................. 2009-180060
Jul. 31, 2009 (JP) ................. 2009-180062

(51) Int. Cl.
*G05D 13/00* (2006.01)
*B60K 6/52* (2007.10)
(Continued)

(52) U.S. Cl.
CPC . *B60K 6/52* (2013.01); *B60K 6/383* (2013.01); *B60K 6/448* (2013.01); *B60K 7/0007* (2013.01);
(Continued)

(58) Field of Classification Search
CPC ............ B60K 6/383; B60K 1/02; B60K 6/52; B60K 6/448; B60W 10/08; B60W 20/00; B60L 7/18; B60L 15/2036
USPC .............. 701/22; 477/3, 5, 44, 77; 180/65.21
See application file for complete search history.

(56) References Cited

U.S. PATENT DOCUMENTS 6,321,865 B1    11/2001    Kuribayashi et al.
2001/0029220 A1*    10/2001    Kato .................. 477/5
(Continued)

FOREIGN PATENT DOCUMENTS

EP    1 393 952 A2    3/2004
EP    1 818 558 A1    8/2007
(Continued)

*Primary Examiner* — Redhwan k Mawari
*Assistant Examiner* — Rodney P King
(74) *Attorney, Agent, or Firm* — Westerman, Hattori, Daniels & Adrian, LLP

(57) ABSTRACT

In a drive controller for a vehicle including: a drive source configured to output a drive force to a first axle serving as one of front and rear wheel axles; an electric motor configured to output a drive force to a second axle serving as the other of the front and rear wheel axles; a one-way power transmission device disposed on a power transmission pathway between the second axle and the electric motor so as to transmit a power drive force from the electric motor to the second axle; a two-way power transmission device that transmits a rotation power from the second axle to the electric motor or transmits the power drive force and a regeneration drive force from the electric motor to the second axle, the drive controller includes: a first detector that detects a speed of the vehicle or a rotation speed of the second axle; a target rotation speed determination section that determines a target rotation speed of the electric motor based on the speed of the vehicle or the rotation speed of the second axle; a second detector that detects a rotation speed of the electric motor; and a controller that controls the electric motor such that the rotation speed of the electric motor is synchronized with the target rotation speed and that controls an output torque of the electric motor or an activation of the two-way power transmission device, when the electric motor starts power drive or regeneration drive while the vehicle is traveling by the drive force from the drive source.

21 Claims, 39 Drawing Sheets

(51) Int. Cl.

| | | |
|---|---|---|
| *B60K 6/448* | (2007.10) |
| *B60K 7/00* | (2006.01) |
| *B60K 17/356* | (2006.01) |
| *B60W 10/02* | (2006.01) |
| *B60W 10/08* | (2006.01) |
| *B60K 6/383* | (2007.10) |
| *B60L 7/18* | (2006.01) |
| *B60L 11/12* | (2006.01) |
| *B60L 11/14* | (2006.01) |
| *B60L 15/20* | (2006.01) |
| *B60K 1/00* | (2006.01) |
| *B60K 17/04* | (2006.01) |
| *B60W 20/00* | (2006.01) |

(52) U.S. Cl.
CPC ............... *B60K 17/356* (2013.01); *B60L 7/18* (2013.01); *B60L 11/123* (2013.01); *B60L 11/14* (2013.01); *B60L 15/2036* (2013.01); *B60W 10/02* (2013.01); *B60W 10/08* (2013.01); *B60K 1/00* (2013.01); *B60K 17/046* (2013.01); *B60K 2001/001* (2013.01); *B60K 2007/0046* (2013.01); *B60K 2007/0092* (2013.01); *B60L 2240/12* (2013.01); *B60L 2240/421* (2013.01); *B60L 2240/423* (2013.01); *B60L 2240/461* (2013.01); *B60L 2260/28* (2013.01); *B60L 2270/145* (2013.01); *B60W 20/00* (2013.01); *B60W 2520/10* (2013.01); *B60W 2710/081* (2013.01); *B60Y 2300/73* (2013.01); *Y02T 10/6217* (2013.01); *Y02T 10/6243* (2013.01); *Y02T 10/6265* (2013.01); *Y02T 10/642* (2013.01); *Y02T 10/7077* (2013.01); *Y02T 10/7275* (2013.01)

(56) References Cited

U.S. PATENT DOCUMENTS

| | | | |
|---|---|---|---|
| 2006/0166777 A1* | 7/2006 | Aikawa et al. | 475/149 |
| 2009/0227418 A1* | 9/2009 | Farnsworth | 477/7 |

FOREIGN PATENT DOCUMENTS

| | | | |
|---|---|---|---|
| EP | 1 955 885 A2 | | 8/2008 |
| JP | 5-1589 A | | 1/1993 |
| JP | 10-288059 A | | 10/1998 |
| JP | 11-99838 A | | 4/1999 |
| JP | 2003-32806 A | | 1/2003 |
| JP | 2005-98456 A | | 4/2005 |
| JP | 2006-264647 A | | 10/2006 |
| JP | 2006272983 A | * | 10/2006 |
| JP | 2008-239041 | | 10/2008 |
| JP | 2008-267353 A | | 11/2008 |
| JP | 2009-101738 A | | 5/2009 |

\* cited by examiner

BACKLASH

DRIVE CONTROLLER FOR VEHICLE

CROSS-REFERENCE TO RELATED APPLICATIONS

This application is a National Stage entry of International Application No. PCT/JP2010/62956, filed Jul. 30, 2010, which claims priority to Japanese Patent Application Nos. JP 2009-180059, JP 2009-180060 and JP 2009-180062 filed Jul. 31, 2009, the disclosure of the prior application are incorporated in their entirety by reference.

TECHNICAL FIELD

The present invention relates to a drive controller for a vehicle that uses a plurality of drive sources in combination.

BACKGROUND ART

As a vehicle drive unit, a device has been devised in which the left and right axles of a vehicle are connected to a differential apparatus and drive power is transmitted to the differential apparatus via a speed reduction mechanism using an electric motor coaxially disposed on the outer circumferential side of one of the axles (for example, refer to Patent document 1).

This drive unit 100 is, as shown in FIG. 35, equipped with an electric motor 102 for driving axles, a planetary gear reducer 112 for reducing the drive rotation speed of this electric motor 102, and a differential apparatus 113 for distributing the output of this planetary gear reducer 112 to the left and right axles 110A and 110B of a vehicle, wherein the planetary gear reducer 112 and the electric motor 102 are disposed coaxially with each other on the outer circumferential side of the axle 110B, one of the axles connected to the differential apparatus 113. Furthermore, the sun gear 121 and the planetary carrier 123 of the electric motor 112 are connected to the rotor 115 of the electric motor 102 and the differential case 131 of the differential apparatus 113, respectively, the ring gear 124 of the planetary gear reducer 112 is rotatably accommodated in the reducer case 111 that is secured to a vehicle body, and a hydraulic brake 128 for applying a braking force to the ring gear 124 by engaging the ring gear 124 with the reducer case 111 is provided between the ring gear 124 and the reducer case 111.

When the braking force is applied to the ring gear 124 by the hydraulic brake 128, the ring gear 124 is secured to the reducer case 111, and the drive power input from the rotor 115 of the electric motor 102 to the sun gear 121 is transmitted to the differential case 131 of the differential apparatus 113 while speed is reduced by a preset reduction ratio. The drive power transmitted to the differential case 131 is distributed to the left and right axles 110A and 110B of the vehicle by the differential apparatus 113. Moreover, when the braking force applied from the hydraulic brake 128 is shut off, the ring gear 124 rotates freely with respect to the reducer case 111. Hence, for example, when the braking force applied by the hydraulic brake 128 is shut off in a state in which the rotation speed of the axles 110A and 110B is higher than that required for the driving of the electric motor 102, the ring gear 124 idly rotates inside the reducer case 111 depending on extra rotation on the sides of the axles 110A and 110B, and the rotations of the axles 110A and 110B are not input to the electric motor 102. Hence, in the case that the driving and regeneration of the electric motor 102 are not necessary, accompanied rotation of the electric motor 102 can be prevented by shutting off the application of the braking force of the hydraulic brake 128, whereby improvement in fuel consumption is attained.

FIG. 37 is an overall view showing a hybrid vehicle described in Patent document 2. Furthermore, FIG. 38 is a view showing a torque transmission mechanism for use in the hybrid vehicle described in Patent document 2. The hybrid vehicle H shown in FIGS. 37 and 38 can travel by virtue of at least either one of an engine 101 and a motor 102. The hybrid vehicle H is equipped with a clutch mechanism 106, a connection control mechanism 141 and a rotation speed control mechanism 122.

In the clutch mechanism 106, a one-way clutch 105 for transmitting the torque of the motor 102 to the drive side in the case that the vehicle starts traveling from its stop state and a hydraulic clutch 104 for hydraulically connecting the output shaft 121 of the motor 102 to a drive shaft 103 are provided in parallel with the drive shaft 103. The connection control mechanism 141 disengages the hydraulic clutch 104 in the case that the rotation speed of the motor 102 is equal to or more than its allowable rotation speed and reengages the hydraulic clutch 104 in the case that an operation condition in which the rotation of the motor 102 is allowable is obtained. As shown in FIG. 39, at the time of the reengagement, the rotation speed control mechanism 122 performs control in which the rotation speed of the motor 102 is raised sharply to a rotation speed (changeover rotation speed r) lower than a target rotation speed R by a predetermined value and then the rotation speed of the motor 102 is raised gradually to the target rotation speed R.

In this hybrid vehicle H, by virtue of the control performed by the rotation speed control mechanism 122, a phenomenon in which the rotation speed of the motor 102 overshoots the target rotation speed R can be avoided, and the output shaft 121 of the motor 102 is smoothly engaged with the one-way clutch 105. Hence, a mechanical shock that occurs in the case that the output shaft 121 of the motor 102 is suddenly engaged with the one-way clutch 105 can be avoided.

PRIOR ART DOCUMENT

Patent Document

Patent document 1: Japanese Patent Application Laid-open Publication No. 2006-264647
Patent document 2: Japanese Patent Application Laid-open Publication No. 2008-239041

SUMMARY OF THE INVENTION

Problem to be Solved by the Invention

In the case that the driving and regeneration of the motor 102 are necessary, the drive unit 100 shown in FIG. 35 applies the braking force of the hydraulic brake 128 to the ring gear 124. In this state, since the ring gear 124 is secured to the reducer case 111, a drive force is transmitted between the sun gear 121 and the planetary carrier 123 of the electric motor 112. As a result, torque transmission is performed between the axles 110A and 110B and the motor 102.

On the other hand, in the case that the driving and regeneration of the motor 102 are not necessary, the drive unit 100 does not apply the braking force of the hydraulic brake 128 to the ring gear 124. In this state, the ring gear 124 rotates idly inside the reducer case 111, whereby no drive force is transmitted between the sun gear 121 and the planetary carrier 123. Hence, torque transmission is not performed between the axles 110A and 110B and the motor 102.

In the case that the motor 102 is used as an auxiliary drive source for a vehicle and that an internal combustion engine or the like is used as the main drive source, the drive unit 100 selects either one of these two states depending on the travel state of the vehicle. For example, at the time of high speed cruise, the vehicle travels using only the drive force from the internal combustion engine. At this time, when a torque transmission pathway is established between the axles 110A and 110B and the motor 102, the rotor of the motor 102 is forcibly rotated together by the rotation forces on the sides of the axles 110A and 110B. Hence, the drive unit 100 cancels the application of the braking force of the hydraulic brake 128 to the ring gear 124. On the other hand, when the vehicle starts moving or decelerates, the drive force from the motor 102 is used. At this time, the drive unit 100 applies the braking force of the hydraulic brake 128 to the ring gear 124.

As described above, the braking force of the hydraulic brake 128 is applied to the ring gear 124 or the application is canceled depending on the travel state of the vehicle; at each time of the application/canceling, the state lying between the sun gear 121 and the planetary carrier 123 also changes. The torque to be transmitted between the sun gear 121 and the planetary carrier 123 is transmitted via at least two gears opposed to each other. A clearance called "backlash" is provided between the two gears opposed to each other and engaged with each other as shown in FIG. 36. The gears can move freely by virtue of this backlash. However, when a gear rotating in one direction is rotated in the opposite direction or when a gear in a non-rotation state is rotated in a direction in which the backlash is present, a shock occurs. This shock causes vibration and noise and further causes reduction in machine life.

Hence, by virtue of the application of the braking force to the ring gear 124 or the canceling of the application, even if the rotation direction of the gear present between the sun gear 121 and the planetary carrier 123 is changed, it is desired that the shock due to the backlash should be controlled so as to be reducible.

Furthermore, in the hybrid vehicle H shown in FIG. 37, the engine 101 and the motor 102 are provided on the side of the drive shaft 103, and no drive source is provided on the side of the other axle (driven shaft). However, in the case of a configuration in which a motor is also provided on the side of the other axle as an auxiliary drive source other than the engine 101 and the motor 102 and a one-way clutch is provided to transmit the torque of this motor to the axle, when the one-way clutch is engaged while there is a difference in rotation speed between the front and rear wheels, a shock occurs.

In the hybrid vehicle H described above, the mechanical shock occurring at the time of the engagement of the one-way clutch is avoided by controlling the rotation speed of the motor 102. However, methods for avoiding or reducing a shock at the driving time of a motor provided for a drive unit equipped with a plurality of components, such as a one-way clutch and a brake, are not described in Patent document 2.

An object of the present invention is to provide a vehicle drive controller for reducing a shock occurring at a power transmission device provided on a power consumption pathway.

Means for Solving the Problem

For the purpose of solving the above-mentioned problems and attaining the object of the present invention, the drive controller according to claim 1 of the present invention is a drive controller for a vehicle (for example, a vehicle 3 according to an embodiment). The vehicle includes: a drive source (for example, an internal combustion engine 4 and an electric motor 5) configured to output a drive force to a first axle (for example, a main drive shaft 8 according to the embodiment) serving as one of front and rear wheel axles; an electric motor (for example, electric motors 2A and 2B according to the embodiment) configured to output a drive force to a second axle (for example, axles 10A and 10B according to the embodiment) serving as the other of the front and rear wheel axles; a one-way power transmission device (for example, a one-way clutch 50 according to the embodiment) disposed on a power transmission pathway between the second axle and the electric motor so as to transmit a power drive force from the electric motor to the second axle; a two-way power transmission device (for example, hydraulic brakes 60A and 60B according to the embodiment) disposed on the power transmission pathway in parallel with the one-way power transmission device so as to transmit a rotation power from the second axle to the electric motor or transmit the power drive force and a regeneration drive force from the electric motor to the second axle. The drive controller includes: a first detector (for example, a vehicle speed sensor 117 or rotation speed sensors 117a and 117b according to the embodiment) that detects a speed of the vehicle or a rotation speed of the second axle; a target rotation speed determination section (for example, a management ECU 9 according to the embodiment) that determines a target rotation speed of the electric motor based on the speed of the vehicle or the rotation speed of the second axle detected by the first detector; a second detector (for example, resolvers 20A and 20B and the management ECU 9) that detects a rotation speed of the electric motor; and a controller (for example, the management ECU 9 according to the embodiment) that controls the electric motor such that the rotation speed of the electric motor is synchronized with the target rotation speed and that controls an output torque of the electric motor or an activation of the two-way power transmission device, when the electric motor starts power drive or regeneration drive while the vehicle is traveling by the drive force from the drive source.

In addition, in the drive controller according to claim 2 of the present invention, the controller activates the two-way power transmission device, when the electric motor performs regeneration drive and the rotation speed of the electric motor reaches a threshold rotation speed lower than the target rotation speed.

Furthermore, in the drive controller according to claim 3 of the present invention, the controller controls the electric motor such that the electric motor outputs a predetermined torque, when the electric motor performs power drive and the rotation speed of the electric motor reaches the threshold rotation speed lower than the target rotation speed.

Moreover, in the drive controller according to claim 4 of the present invention, the predetermined torque is a constant torque necessary for enabling the rotation speed of the electric motor to be synchronized with the target rotation speed.

Besides, the drive controller according to claim 5 of the present invention further includes: a reducer (for example, planetary gear reducers 12A and 12B according to the embodiment) disposed on the power transmission pathway between the second axle and the electric motor.

Furthermore, in the drive controller according to claim 6 of the present invention, the electric motor, the reducer, the two-way power transmission device and the second axle are provided for each of left and right wheels (for example, a left rear wheel LWr and a right rear wheel RWr according to the embodiment) provided to the second axle, and the controller independently controls the output torque of the electric motor corresponding to each of the left and right wheels or the operation of the two-way power transmission device corresponding to each of the left and right wheels, when the electric motor starts power drive or regeneration drive while the vehicle is turning by the drive force from the drive source.

Additionally, in the drive controller according to claim 7 of the present invention, the controller activates the two-way power transmission device, when the electric motor starts power drive and the rotation speed of the electric motor reaches the threshold rotation speed lower than the target rotation speed; and the controller inactivates the two-way power transmission device, when the rotation speed of the electric motor is synchronized with the target rotation speed.

Further, in the drive controller according to claim 8 of the present invention, the controller activates the two-way power transmission device, when the electric motor starts regeneration drive and the rotation speed of the electric motor reaches the threshold rotation speed lower than the target rotation speed; and the controller maintains the activation of the two-way power transmission device even when the rotation speed of the electric motor is synchronized with the target rotation speed.

Still further, in the drive controller according to claim 9 of the present invention, the controller determines that the rotation speed of the electric motor is synchronized with the target rotation speed, when the rotation speed of the electric motor has exceeded the threshold rotation speed and reached the target rotation speed.

In addition, in the drive controller according to claim 10 of the present invention, the two-way power transmission device transmits power between the second axle and the electric motor using a hydraulic pressure; and the controller determines that the rotation speed of the electric motor is synchronized with the target rotation speed, when the hydraulic pressure of the two-way power transmission device has reached a threshold value.

Furthermore, in the drive controller according to claim 11 of the present invention, the controller determines that the rotation speed of the electric motor is synchronized with the target rotation speed, when a predetermined time has passed after the operation of the two-way power transmission device.

Furthermore, in the drive controller according to claim 12 of the present invention, the controller controls the electric motor such that the electric motor outputs the predetermined torque, when the electric motor performs regeneration drive and the rotation speed of the electric motor reaches the threshold rotation speed lower than the target rotation speed; and the controller operates the two-way power transmission device, when the rotation speed of the electric motor is synchronized with the target rotation speed.

Besides, in the drive controller according to claim 13 of the present invention, the controller controls the electric motor such that the electric motor outputs the predetermined torque, when the electric motor performs power drive and the rotation speed of the electric motor reaches the threshold rotation speed lower than the target rotation speed; and the controller controls the electric motor such that the electric motor outputs a requested torque, when the rotation speed of the electric motor is synchronized with the target rotation speed.

Furthermore, in the drive controller according to claim 14 of the present invention, the controller controls the electric motor such that the output torque of the electric motor is 0, when the rotation speed of the electric motor is synchronized with the target rotation speed.

Additionally, in the drive controller according to claim 15 of the present invention, the controller determines that the rotation speed of the electric motor is synchronized with the target rotation speed, when the rotation speed of the electric motor has exceeded the threshold rotation speed and reached the target rotation speed.

Further, in the drive controller according to claim 16 of the present invention, the controller determines that the rotation speed of the electric motor is synchronized with the target rotation speed, when a predetermined time has passed after the controller controls the electric motor such that the electric motor outputs the predetermined torque.

Still further, in the drive controller according to claim 17 of the present invention, the predetermined torque is a constant torque necessary for enabling the rotation speed of the electric motor to be synchronized with the target rotation speed.

Effect of the Invention

With the drive controller according to claims 1 to 17 of the present invention, a shock occurring in the power transmission device provided on the power transmission pathway can be reduced.

With the drive controller according to claim 5 of the present invention, a shock due to a backlash can be reduced even if the rotation directions of the gears of the reducer on the power transmission pathway are changed.

With the drive controller according to claims 7 and 8 of the present invention, a shock due to the difference in rotation speed between the front wheels (for example, on the side of the first axle) and the rear wheels (for example, on the side of the second axle) can be reduced.

With the drive controller according to claims 12 and 13 of the present invention, when the rotation speed of the electric motor is synchronized with the target rotation speed as a result that the electric motor has outputted the predetermined torque, engagement is performed by the one-way power transmission device, and the brake is engaged in a state in which the rotation speed of the electric motor is synchronized with the target rotation speed. Hence, a shock occurring when the one-way power transmission device or the brake is engaged while the electric motor is driven.

MODES FOR CARRYING OUT THE INVENTION

An embodiment according to the present invention will be described below on the basis of FIGS. 1 to 4.

Figure 1:
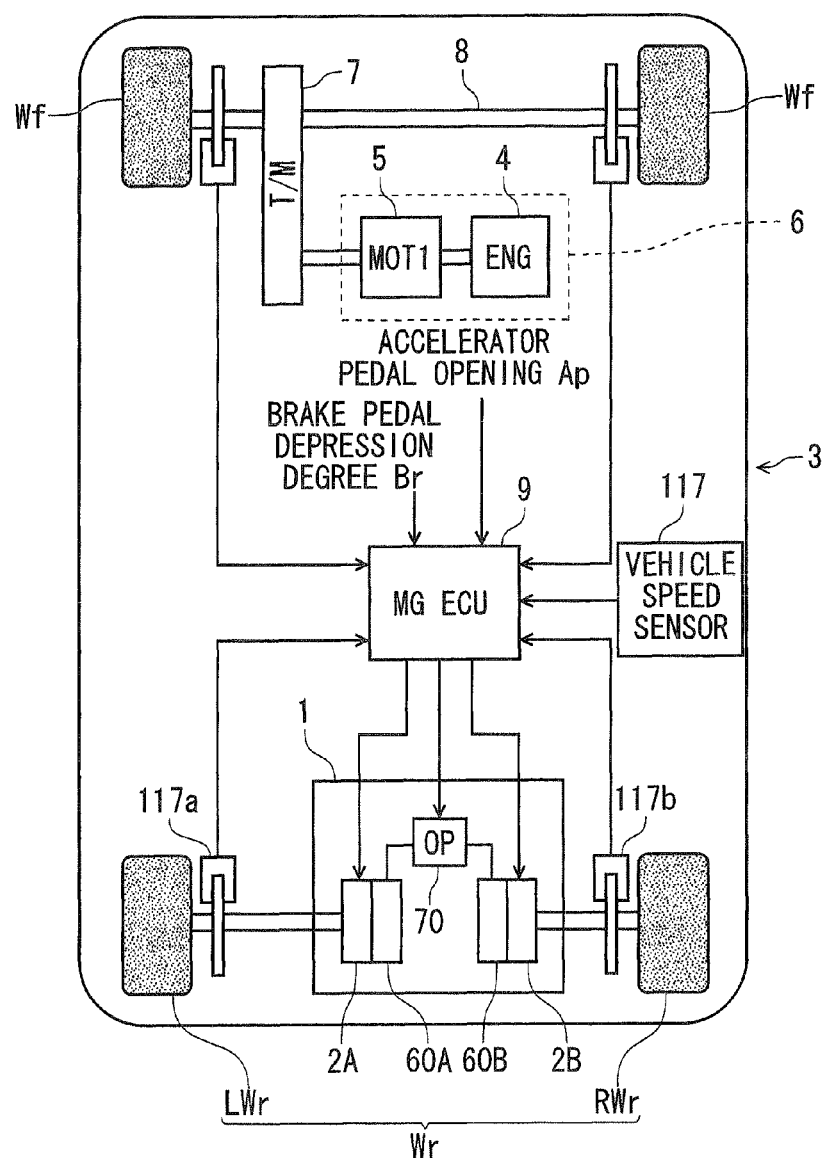
FIG. 1 is a block diagram showing a schematic configuration of a hybrid vehicle according to an embodiment of a vehicle to which a drive unit is applicable.

In a drive unit 1 according to the present invention, electric motors 2A and 2B serve as drive sources for driving axles and are used for a vehicle 3 having a drive system shown in FIG. 1, for example.

The vehicle 3 shown in FIG. 1 is a hybrid vehicle having a drive unit 6 formed of an internal combustion engine 4 and an electric motor 5 connected in series at the front section of the vehicle, and the drive power of this drive unit 6 is transmitted to front wheels Wf via a transmission 7 and a main drive shaft 8; on the other hand, the drive power of the drive unit 1, provided at the rear section of the vehicle and separate from the drive unit 6, is transmitted to rear wheels Wr (RWr and LWr). The electric motor 5 of the drive unit 6 and the electric motors 2A and 2B of the drive unit 1 on the side of the rear wheels Wr are connected to a battery via a PDU (power drive unit) not shown, and electric power supply from the battery and energy regeneration to the battery are carried out via the PDU. Furthermore, a management ECU (MG ECU) 9 controls the operations of the electric motors 2A and 2B and hydraulic brakes 60A and 60B included in the drive unit 1.

Figure 2:
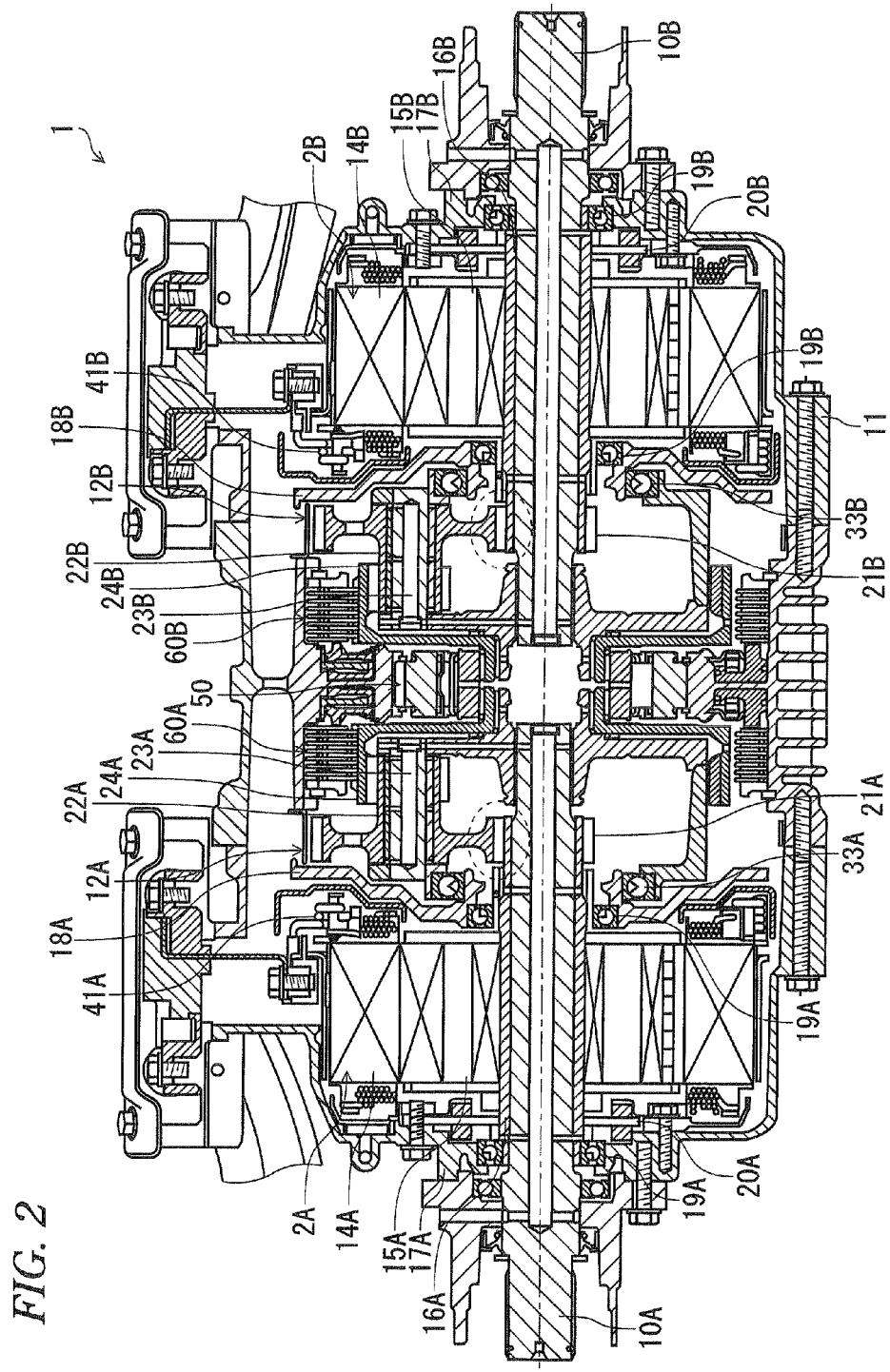
FIG. 2 is a vertical sectional view showing the drive unit.
Figure 4:
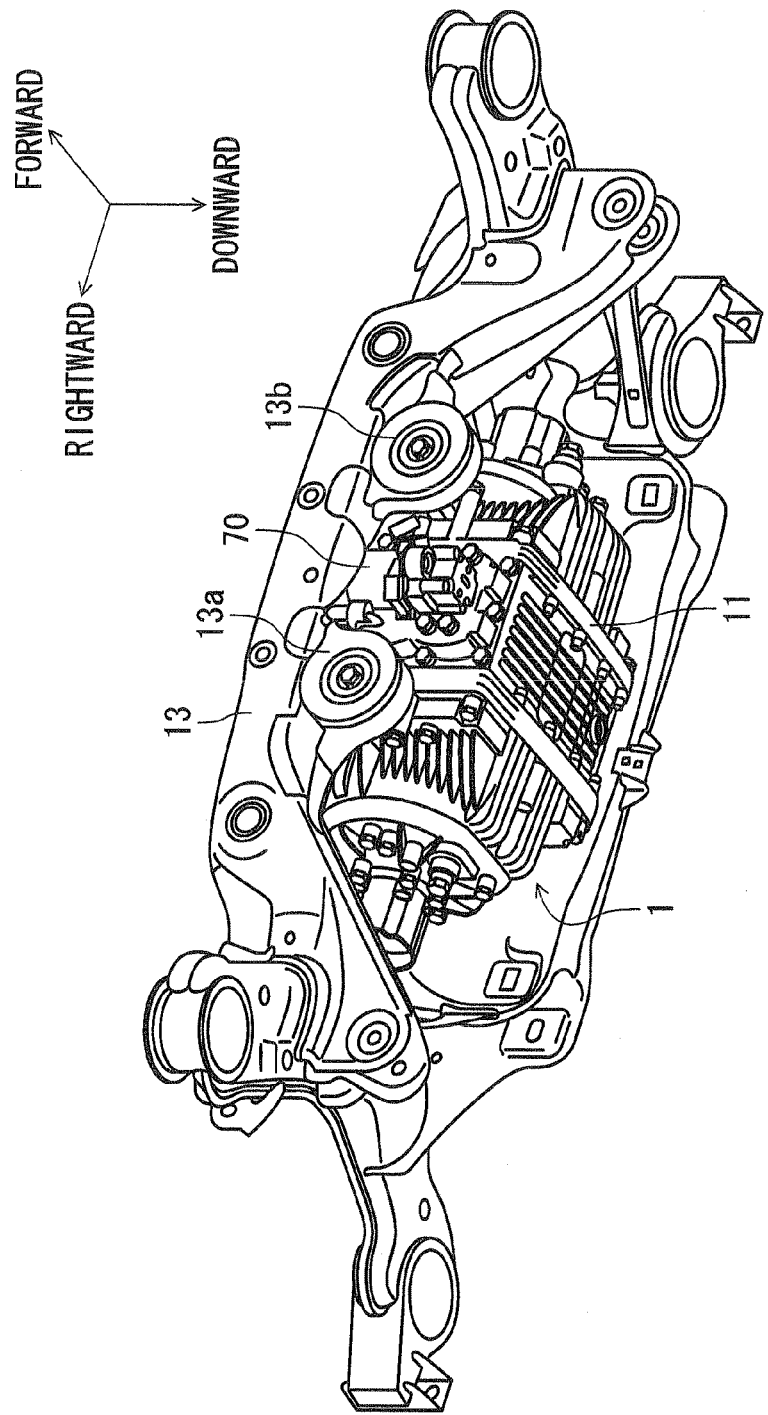
FIG. 4 is a perspective view showing a state in which the drive unit is mounted on a frame.

FIG. 2 is a vertical sectional view showing the whole structure of the drive unit 1; in the figure, 10A and 10B designate left and right axles on the side of the rear wheels Wr of the vehicle 3, and these axles are disposed coaxially in the width direction of the vehicle. The reducer case 11 of the drive unit 1 is wholly formed into an approximately cylindrical shape, and in the interior thereof, the electric motors 2A and 2B for driving the axles and planetary gear reducers 12A and 12B for reducing the drive rotation speeds of the electric motors 2A and 2B are disposed coaxially with the axles 10A and 10B. The electric motor 2A and the planetary gear reducer 12A control the left rear wheel LWr, and the electric motor 2B and the planetary gear reducer 12B control the right rear wheel RWr; furthermore, the electric motor 2A and the planetary gear reducer 12A and the electric motor 2B and the planetary gear reducer 12B are disposed so as to be left-right symmetric in the width direction of the vehicle inside the reducer case 11. In addition, as shown in FIG. 4, the reducer case 11 is supported by the support sections 13a and 13b of a frame member 13 serving as part of a frame used as the framework of the vehicle 3 and by the frame of the drive unit 1 (not shown). The support sections 13a and 13b are provided on the left and right sides with respect to the center of the frame member 13 in the width direction of the vehicle. Arrows in FIG. 4 indicate positional relationships in a state in which the drive unit 1 is mounted in the vehicle 3.

The stators 14A and 14B of the electric motors 2A and 2B are secured to the left and right end side interiors of the reducer case 11, respectively, and ring-shaped rotors 15A and 15B are rotatably disposed on the inner circumferential sides of the stators 14A and 14B. Cylindrical shafts 16A and 16B enclosing the outer circumferences of the axles 10A and 10B are connected to the inner circumferential sections of the rotors 15A and 15B, and these cylindrical shafts 16A and 16B are supported by the end walls 17A and 17B and the intermediate walls 18A and 18B of the reducer case 11 via bearings 19A and 19B so as to be coaxial with the axles 10A and 10B and relatively rotatable therewith. Furthermore, resolvers 20A and 20B for feeding back the rotation position information of the rotors 15A and 15B to the management ECU 9 are provided on the outer circumferences on one end sides of the cylindrical shafts 16A and 16B and on the end walls 17A and 17B of the reducer case 11. The management ECU 9 can detect the rotation speeds of the electric motors 2A and 2B on the basis of signals from the resolvers 20A and 20B.

Moreover, the planetary gear reducers 12A and 12B are equipped with sun gears 21A and 21B, pluralities of planetary gears 22A and 22B engaged with the sun gears 21, planetary carriers 23A and 23B for supporting these planetary gears 22A and 22B, and ring gears 24A and 24B engaged with the outer circumferential sides of the planetary gears 22A and 22B. The drive power of the electric motors 2A and 2B is input from the sun gears 21A and 21B and the drive power obtained after speed reduction is output via the planetary carriers 23A and 23B.

Figure 3:
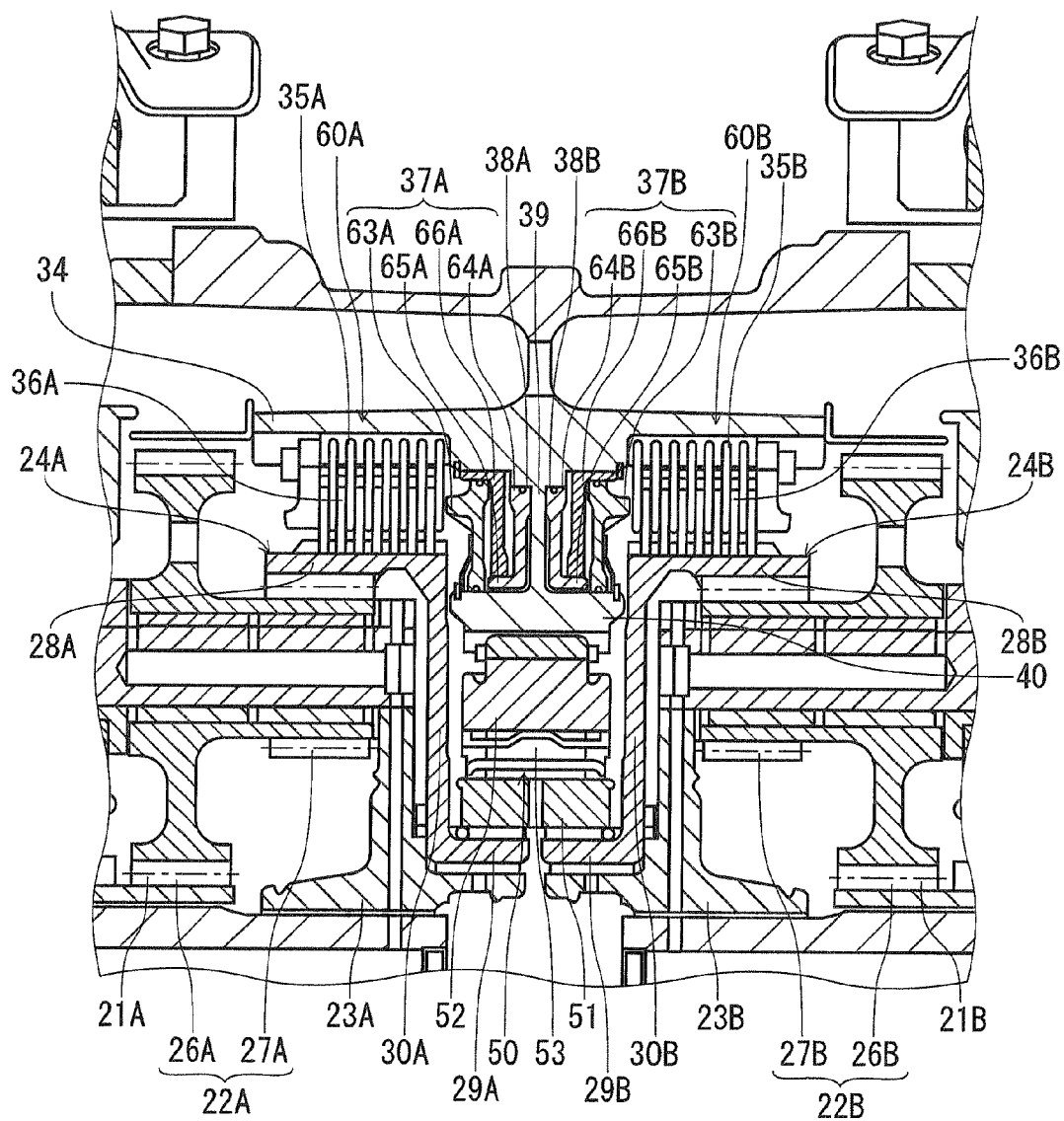
FIG. 3 is a partially enlarged view showing the drive unit shown in FIG. 2.

The sun gears 21A and 21B are integrated with the cylindrical shafts 16A and 16B. In addition, as shown in FIG. 3, for example, the planetary gears 22A and 22B are duplex pinions having large-diameter first pinions 26A and 26B directly engaged with the sun gears 21A and 21B and small-diameter second pinions 27A and 27B being smaller in diameter than the first pinions 26A and 26B, and the first pinions 26A and 26B and the second pinions 27A and 27B are integrated so as to be coaxial and offset in the axial direction. The planetary gears 22A and 22B are supported by the planetary carriers 23A and 23B, and the axially inner end sections of the planetary carriers 23A and 23B are extended inward in the radial direction, spline-fitted in the axles 10A and 10B and supported so as to be integrally rotatable and also supported by the intermediate walls 18A and 18B via bearings 33A and 33B.

The intermediate walls 18A and 18B are configured to separate electric motor accommodating spaces for accommodating the electric motors 2A and 2B from reducer spaces for accommodating the planetary gear reducers 12A and 12B. The intermediate walls 18A and 18B are curved such that the mutual axial distances therebetween are increased from the outer diameter sides to the inner diameter sides thereof. Furthermore, the bearings 33A and 33B for supporting the planetary gears 22A and 22B are disposed on the inner diameter sides of the intermediate walls 18A and 18B and on the sides of the planetary gear reducers 12A and 12B; moreover, bus rings 41A and 41B for the stators 14A and 14B are disposed on the outer diameter sides of the intermediate walls 18A and 18B and on the sides of the electric motors 2A and 2B (see FIG. 2).

The ring gears 24A and 24B are equipped with gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. In this embodiment, the maximum radius of the ring gear 24A, 24B is set so as to be smaller than the maximum distance of the first pinion 26A, 26B from the center of the first pinion 26A, 26B. The small-diameter sections 29A and 29B are respectively spline-fitted in the inner race 51 of a one-way clutch (one-way clutch) 50 described later, and the ring gears 24A and 24B are configured so as to be rotated integrally with the inner race 51 of the one-way clutch 50.

Cylindrical space sections are securely obtained between the reducer case 11 and the ring gears 24A and 24B, and hydraulic brakes 60A and 60B serving as braking means for the ring gears 24A and 24B are disposed inside the space sections so as to overlap the first pinions 26A and 26B in the radial direction and to overlap the second pinions 27A and 27B in the axial direction. In the hydraulic brakes 60A and 60B, pluralities of stationary plates 35A and 35B spline-fitted in the inner circumferential face of a cylindrical outer diameter side support section 34 extending in the axial direction on the inner diameter side of the reducer case 11 and pluralities of rotation plates 36A and 36B spline-fitted in the outer circumferential faces of the ring gears 24A and 24B are disposed alternately in the axial direction, and these plates 35A, 35B, 36A and 36B are engaged and released by ring-shaped pistons 37A and 37B. The pistons 37A and 37B are accommodated so as to be advanced and retracted in ring-shaped cylinder chambers 38A and 38B formed between a left-right partition wall 39 extended from the intermediate position of the reducer case 11 to the inner diameter side thereof and the outer diameter side support section 34 and an inner diameter side support section 40 connected by the left-right partition wall 39. The pistons 37A and 37B are advanced by introducing high-pressure oil into the cylinder chambers 38A and 38B and retracted by discharging the oil from the cylinder chambers 38A and 38B. The hydraulic brakes 60A and 60B are connected to an oil pump 70 disposed between the support sections 13a and 13b of the above-mentioned frame member 13 as shown in FIG. 4.

Furthermore, in more detail, the pistons 37A and 37B have first piston walls 63A and 63B and second piston walls 64A and 64B in the axial front-rear direction, and these piston walls 63A, 63B, 64A and 64B are connected by cylindrical inner circumferential walls 65A and 65B. Hence, ring-shaped spaces being open outward in the radial direction are formed between the first piston walls 63A and 63B and the second piston walls 64A and 64B, and the ring-shaped spaces are partitioned in the axial front-rear direction by partition members 66A and 66B secured to the inner circumferential faces of the outer walls of the cylinder chambers 38A and 38B. The spaces between left-right partition wall 39 of the reducer case 11 and the second piston walls 64A and 64B are used as first actuation chambers into which high-pressure oil is introduced directly, and the spaces between the partition members 66A and 66B and the first piston walls 63A and 63B are used as second actuation chambers communicating with the first actuation chambers via through holes formed in the inner circumferential walls 65A and 65B. The spaces between the second piston walls 64A and 64B and the partition members 66A and 66B communicate with the atmosphere.

In the hydraulic brakes 60A and 60B, high-pressure oil is introduced into the first and second actuation chambers, and the stationary plates 35A and 35B and the rotation plates 36A and 36B can be pressed against each other by the oil pressure acting on the first piston walls 63A and 63B and the second piston walls 64A and 64B. Hence, large pressure-receiving areas can be obtained by the first and second piston walls 63A, 63B, 64A and 64B in the axial front-rear direction. Thus, large pressing forces for the stationary plates 35A and 35B and the rotation plates 36A and 36B can be obtained while the radial areas of the pistons 37A and 37B are suppressed.

In the case of the hydraulic brakes 60A and 60B, the stationary plates 35A and 35B are supported by the outer diameter side support section 34 extended from the reducer case 11, and the rotation plates 36A and 36B are supported by the ring gears 24A and 24B; hence, when the plates 35A and 36A and the plates 35B and 36B are pressed by the pistons 37A and 37B, braking forces are applied to fix the ring gears 24A and 24B by the frictional engagement between the plates 35A and 36A and between the plates 35B and 36B; when the engagement by the pistons 37A and 37B is released from the state, the ring gears 24A and 24B are allowed to rotate freely.

Furthermore, a space section is securely obtained between the connection sections 30A and 30B of the ring gears 24A and 24B opposed in the axial direction, and the one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrally rotated with the small-diameter sections 29A and 29B of the ring gears 24A and 24B by virtue of spline fitting. Moreover, the outer race 52 is positioned by the inner diameter side support section 40 and prevented from being rotated. When the vehicle travels forward, the one-way clutch 50 is configured so as to be engaged, thereby locking the rotations of the ring gears 24A and 24B. More specifically, the one-way clutch 50 is configured so as to lock or disengage the ring gear 24A, 24B depending on the actuation direction of the torque acting on the ring gear 24A, 24B; assuming that the rotation direction of the sun gear 21A, 21B is the forward direction when the vehicle travels forward, in the case that a reverse rotation direction torque is applied to the ring gear 24A, 24B, the rotation of the ring gear 24A, 24B is locked.

Next, the control of the drive unit 1 configured as described above will be now described. FIGS. 5 to 10 are alignment charts in respective states, letters S and C on the left side designate the sun gear 21A of the planetary gear reducer 12A connected to the electric motor 2A and the planetary carrier 23A connected to the axle 10A, respectively, and letters S and C on the right side designate the sun gear 21B of the planetary gear reducer 12B connected to the electric motor 2B and the planetary carrier 23B connected to the axle 10B, respectively; furthermore, letter R designates the ring gears 24A and 24B, BRK designates the hydraulic brakes 60A and 60B, and OWC designates the one-way clutch 50. In the following descriptions, the rotation direction of the sun gears 21A and 21B at the time of forward travel is assumed to be a forward rotation direction. In addition, in each chart, the upper portion thereof represents the rotation in the forward rotation direction from the stop state of the vehicle and the lower portion thereof represents the rotation in the reverse rotation direction; furthermore, an upward arrow indicates a torque in the forward rotation direction and a downward arrow indicates a torque in the reverse rotation direction.

Figure 5:
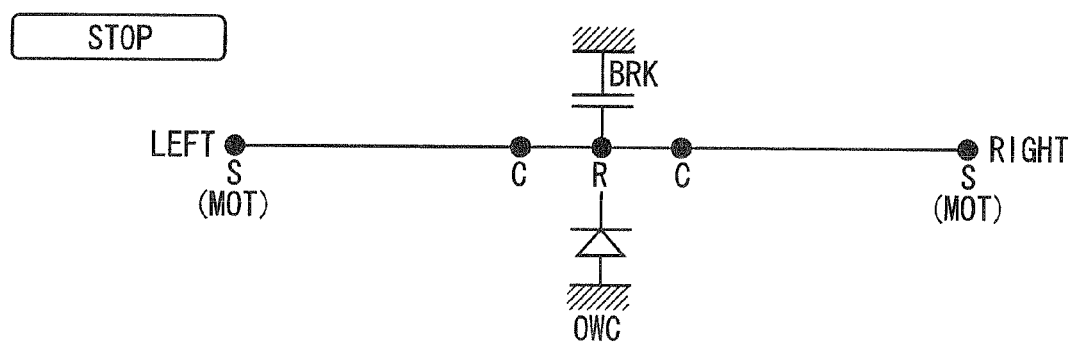
FIG. 5 is an alignment chart for the drive unit at the stop time of the vehicle.

FIG. 5 is an alignment chart at the stop time of the vehicle 3. Since the electric motors 2A and 2B are stopped and the axles 10A and 10B are also stopped at this time, no torque is applied to any components.

Figure 6:
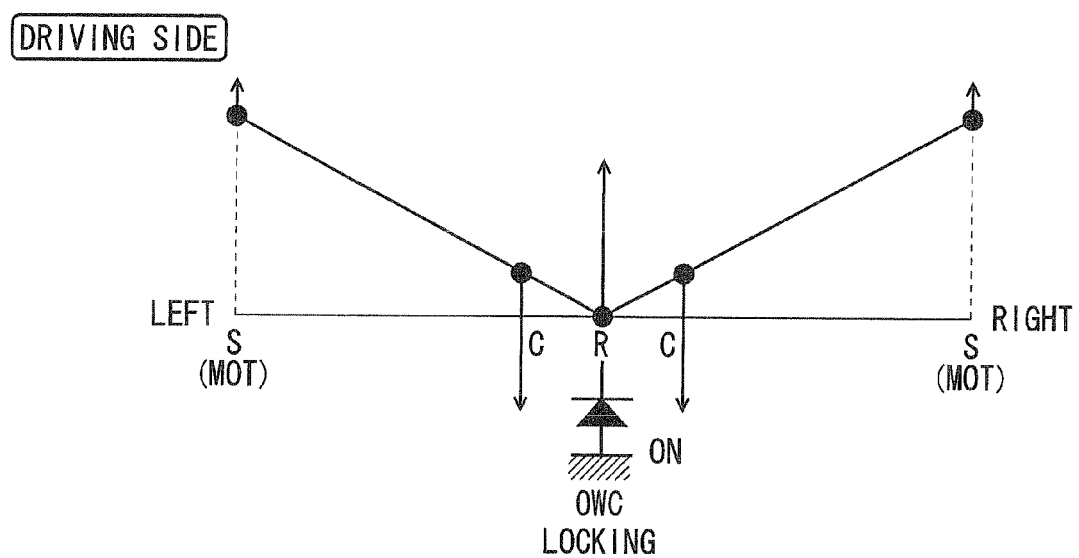
FIG. 6 is an alignment chart for the drive unit in the case that the vehicle travels forward while the drive unit is on the driving side.

FIG. 6 is an alignment chart obtained in the case that the vehicle 3 travels forward by virtue of the motor torques of the electric motors 2A and 2B of the drive unit 1, that is, in the case that the vehicle 3 travels forward while the drive unit 1 is on its driving side. When the electric motors 2A and 2B are driven, forward rotation direction torques are applied to the sun gears 21A and 21B. At this time, as detailed above, the ring gears 24A and 24B are locked by the one-way clutch 50, and forward rotation direction locking torques are applied to the ring gears 24A and 24B trying to rotate in the reverse rotation direction. Hence, the planetary carriers 23A and 23B rotate in the forward rotation direction, and the vehicle travels forward. Travel resistances from the axles 10A and 10B are applied to the planetary carriers 23A and 23B in the reverse rotation direction. In this way, at the travel time of the vehicle, ignition is turned ON and the torques of the electric motors 2A and 2B are raised, whereby the one-way clutch 50 is engaged mechanically and the ring gears 24A and 24B are locked; hence, the vehicle 3 can be started without operating the oil pump 70 for driving the hydraulic brakes 60A and 60B. As a result, the responsiveness at the start time of the vehicle 3 can be improved.

Figure 7:
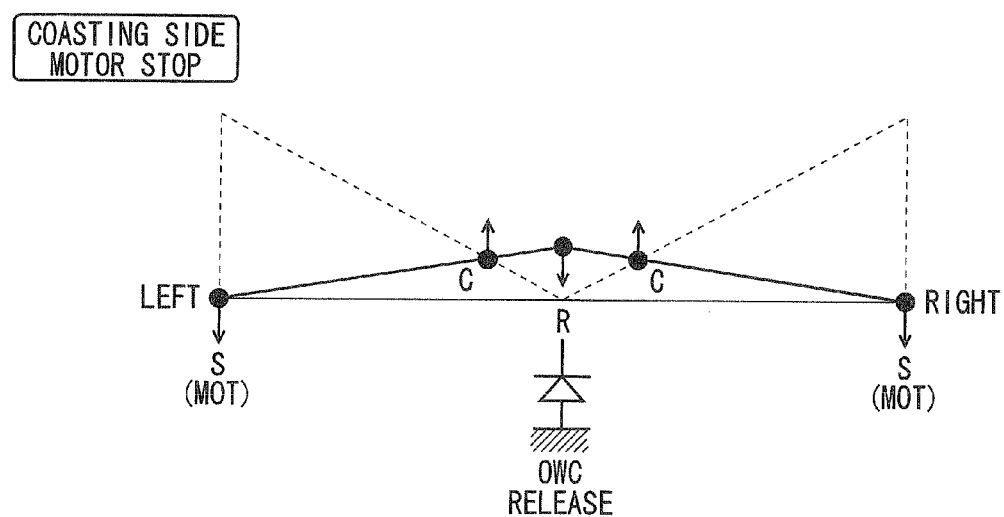
FIG. 7 is an alignment chart for the drive unit in the case that the vehicle travels forward while the drive unit is on the coasting side and electric motors are stopped.

FIG. 7 is an alignment chart obtained in the case that the electric motors 2A and 2B are stopped in a state in which the vehicle 3 is traveling forward by virtue of the drive unit 6, that is, in the case that the drive unit 1 is on its coasting side and the electric motors 2A and 2B are stopped. When the electric motors 2A and 2B are stopped from the state shown in FIG. 6, forward rotation direction torques trying to continue the forward travel are applied from the axles 10A and 10B to the planetary carriers 23A and 23B. Thus, reverse rotation direction torques are applied to the ring gears 24A and 24B and the one-way clutch 50 is released. Hence, the ring gears 24A and 24B rotate idly at a speed higher than that of the planetary carriers 23A and 23B. For this reason, in the case that the regeneration of the electric motors 2A and 2B is not necessary, unless the ring gears 24A and 24B are not locked by the hydraulic brakes 60A and 60B, the electric motors 2A and 2B are stopped, whereby accompanied rotations of the electric motors 2A and 2B can be prevented. At this time, a forward direction cogging torque is applied to the electric motor 2A, 2B, and the total of the cogging torque and the torque balanced with the friction of the ring gear 24A, 24B becomes an axle loss in the axle 10A, 10B.

Figure 8:
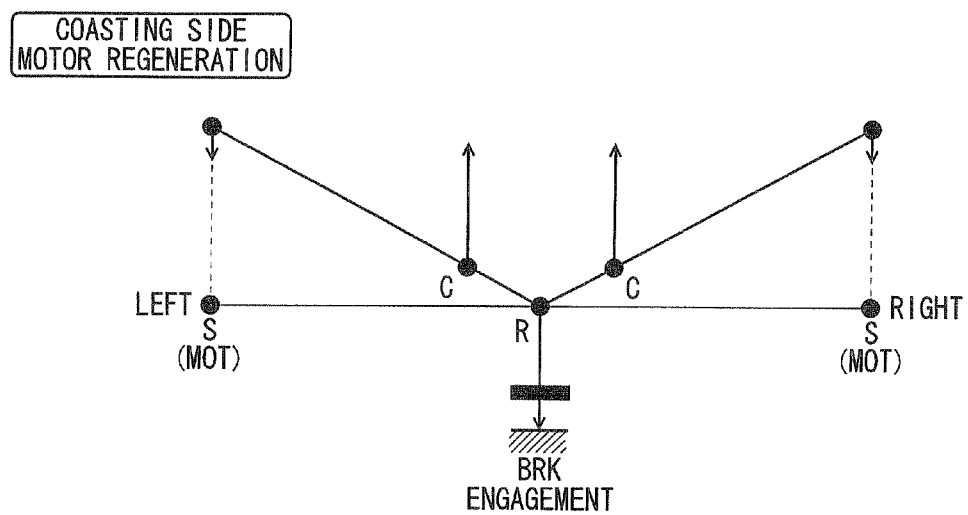
FIG. 8 is an alignment chart for the drive unit in the case that the vehicle travels forward while the drive unit is on the coasting side and the electric motors perform regeneration.

FIG. 8 is an alignment chart obtained in the case that regeneration is carried out by the electric motors 2A and 2B in a state in which the vehicle 3 travels forward by virtue of the drive unit 6 and the vehicle is decelerated spontaneously with the accelerator OFF or in a state in which the vehicle is decelerated by braking using the brake, that is, in the case that the drive unit 1 is on its coasting side and the electric motors 2A and 2B perform regeneration. When the electric motors 2A and 2B perform regeneration from the state shown in FIG. 6, a forward rotation direction torque trying to continue the forward travel is applied from the axle 10A, 10B to the planetary carrier 23A, 23B, whereby a reverse rotation direction torque is applied to the ring gear 24A, 24B and the one-way clutch 50 is released. At this time, the hydraulic brake 60A, 60B is engaged and a reverse rotation direction locking torque is applied to the ring gear 24A, 24B, whereby the ring gear 24A, 24B is locked and a reverse rotation direction regeneration torque is applied to the electric motor 2A, 2B. As a result, regenerative charging can be performed by the electric motor 2A, 2B.

Figure 9:
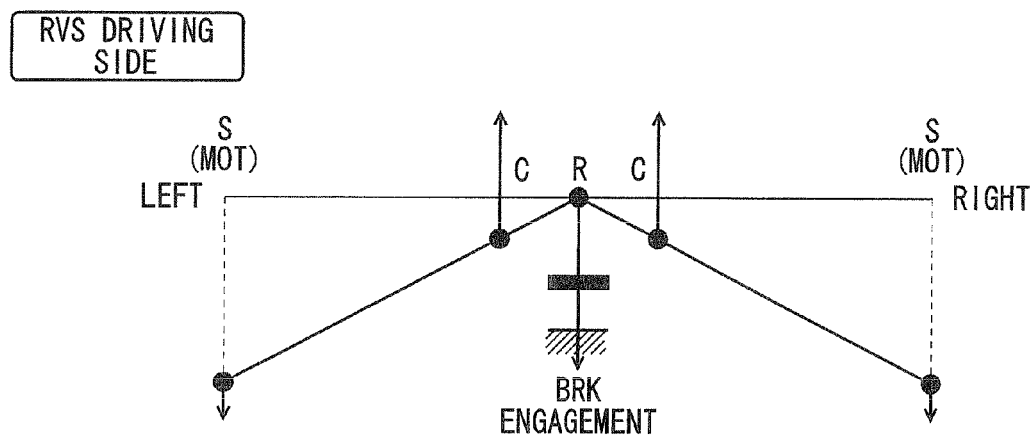
FIG. 9 is an alignment chart for the drive unit in the case that the vehicle travels rearward while the drive unit is on the driving side.

FIG. 9 is an alignment chart obtained in the case that the vehicle 3 travels rearward by virtue of the motor torques of the electric motors 2A and 2B of the drive unit 1, that is, in the case that the vehicle travels rearward while the drive unit 1 is on its driving side. When the electric motor 2A, 2B is driven in the reverse rotation direction, a reverse rotation direction torque is applied to the sun gear 21A, 21B. At this time, a forward rotation direction torque is applied to the ring gear 24A, 24B and the one-way clutch 50 is released. At this time, the hydraulic brake 60A, 60B is engaged and a reverse rotation direction locking torque is applied to the ring gear 24A, 24B, whereby the ring gear 24A, 24B is locked, the planetary carrier 23A, 23B is rotated in the reverse rotation direction, and the vehicle travels rearward. Travel resistance from the axle 10A, 10B is applied to the planetary carrier 23A, 23B in the forward rotation direction.

Figure 10:
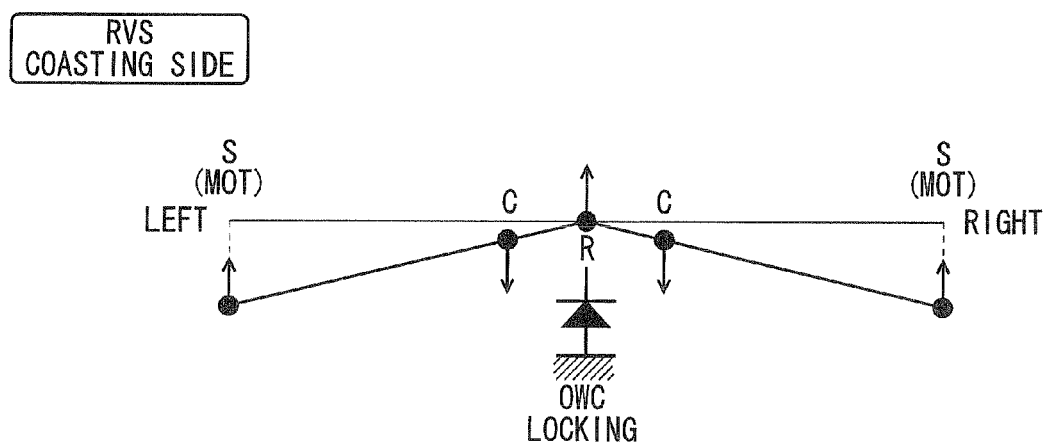
FIG. 10 is an alignment chart for the drive unit in the case that the vehicle travels rearward while the drive unit is on the coasting side.

FIG. 10 is an alignment chart obtained in the case that the vehicle 3 travels rearward by virtue of the drive unit 6 and in the case that the drive unit 1 is on its coasting side. At this time, a reverse rotation direction torque trying to continue the rearward travel is applied from the axle 10A, 10B to the planetary carrier 23A, 23B; hence, the ring gear 24A, 24B is locked by the one-way clutch 50, a forward direction locking torque is applied to the ring gear 24A, 24B trying to rotate in the reverse rotation direction, and a forward rotation direction counter electromotive force is generated in the electric motor 2A, 2B.

FIRST EXAMPLE

Figure 11:
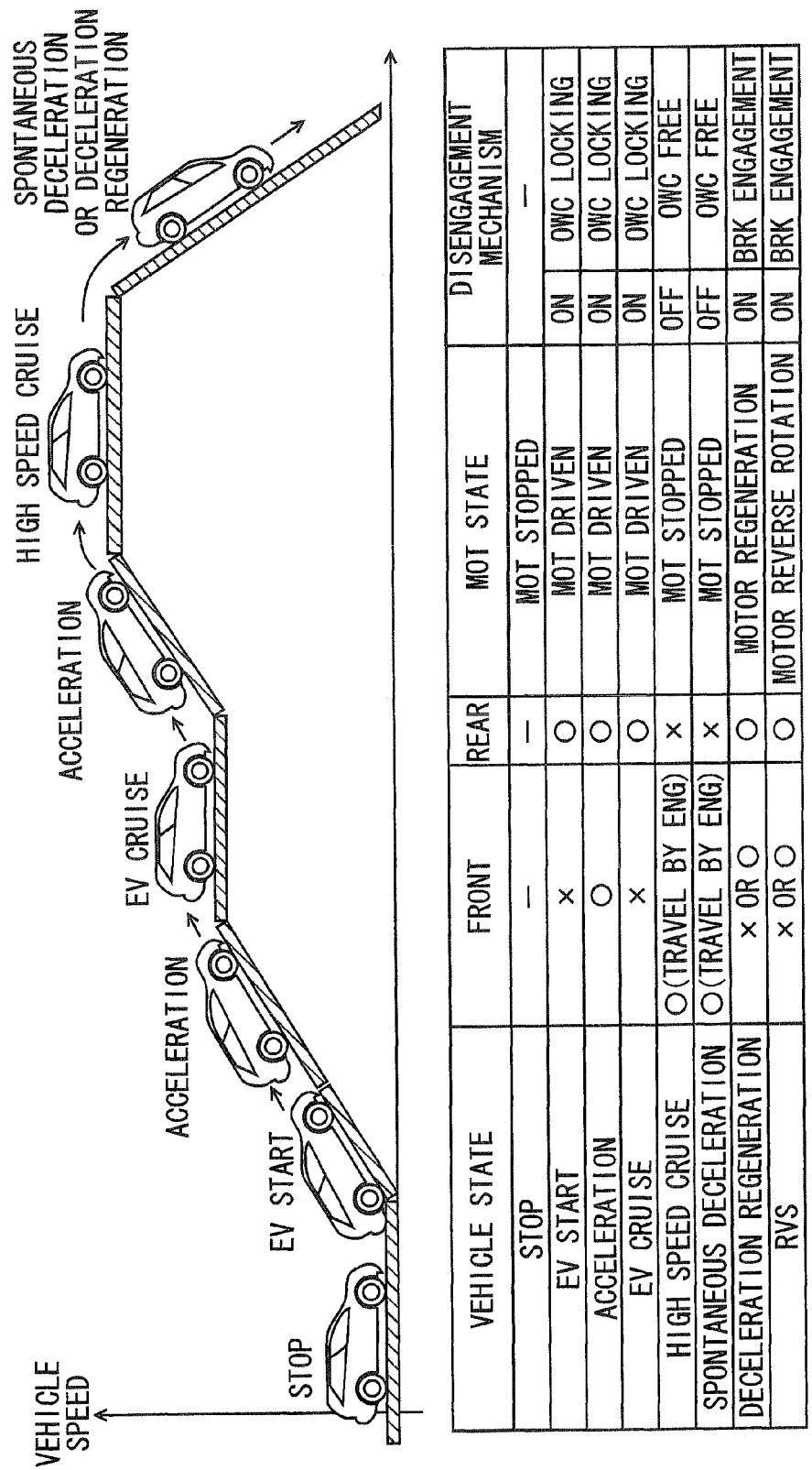
FIG. 11 is a view showing the states of the electric motor 2A, 2B and the states of a disengagement mechanism in the travel state of the vehicle 3.

FIG. 11 is a view showing the states of the electric motor 2A, 2B and the states of a disengagement mechanism (the one-way clutch 50 and the hydraulic brake 60A, 60B) in the travel state of the vehicle 3. "Front" represents the drive unit 6 for driving the front wheels Wf, "rear" represents the drive unit 1 for driving the rear wheels Wr, "○" indicates active (including drive and regeneration), and "×" indicates inactive (stop). Furthermore, "MOT state" represents the state of the electric motor 2A, 2B of the drive unit 1. Moreover, "OWC" represents the one-way clutch 50, and "BRK" represents the hydraulic brake 60A, 60B.

At the stop time of the vehicle, the electric motors 2A and 2B of the drive unit 1 are stopped, both the drive unit 6 on the side of the front wheels Wf and the drive unit 1 on the side of the rear wheels Wr are stopped, and the disengagement mechanism is also in an inactive state as described referring to FIG. 5.

Next, after the ignition is turned ON, at the time of EV start, the electric motors 2A and 2B of the drive unit 1 for the rear wheels Wr are driven. At this time, as described referring to FIG. 6, the disengagement mechanism is locked by the one-way clutch 50, and the drive power of the electric motors 2A and 2B is transmitted to the axles 10A and 10B.

Then, at the time of acceleration, four-wheel driving is carried out using the drive unit 6 on the side of the front wheels Wf and the drive unit 1 on the side of the rear wheels Wr; at this time, as described referring to FIG. 6, the disengagement mechanism is locked by the one-way clutch 50 and the drive power of the electric motors 2A and 2B is transmitted to the axles 10A and 10B.

At the time of EV cruise at low and medium speed ranges, since the efficiency of the motors is high, the drive unit 6 on the side of the front wheels Wf is inactive and rear-wheel driving is carried out using the drive unit 1 on the side of the rear wheels Wr. At this time, as described referring to FIG. 6, the disengagement mechanism is locked by the one-way clutch 50 and the drive power of the electric motors 2A and 2B is transmitted to the axles 10A and 10B.

On the other hand, at the time of high speed cruise at a high speed range, since the efficiency of the engine is high, front-wheel driving is carried out using the drive unit 6 on the side of the front wheels Wf. At this time, as described referring to FIG. 7, the one-way clutch 50 of the disengagement mechanism is released (OWC free) and the hydraulic brakes 60A and 60B are inactive, whereby the electric motors 2A and 2B are stopped.

Furthermore, also in the case of spontaneous deceleration, as described referring to FIG. 7, the one-way clutch 50 of the disengagement mechanism is released (OWC free) and the hydraulic brakes 60A and 60B are inactive, whereby the electric motors 2A and 2B are stopped.

On the other hand, in the case of deceleration regeneration, for example, in the case that driving is carried out by the drive power of the drive unit 6 on the side of the front wheels Wf, as detailed above referring to FIG. 8, the one-way clutch 50 of the disengagement mechanism is released (OWC free), but the hydraulic brakes 60A and 60B are engaged, whereby regenerative charging is performed by the electric motors 2A and 2B.

In the case of rearward traveling (RVS), the drive unit 6 on the side of the front wheels Wf is stopped and the drive unit 1 on the side of the rear wheels Wr is driven and rear-wheel driving is carried out, or four-wheel driving is carried out using the drive unit 6 on the side of the front wheels Wf and the drive unit 1 on the side of the rear wheels Wr. In the case of rear-wheel driving, as described referring to FIG. 9, the electric motors 2A and 2B are rotated in the reverse rotation direction, and the one-way clutch 50 of the disengagement mechanism is released (OWC free); however, by the engagement of the hydraulic brakes 60A and 60B, the drive power of the electric motors 2A and 2B is transmitted to the axles 10A and 10B. On the other hand, in the case of four-wheel driving, as described referring to FIG. 10, the disengagement mechanism is locked by the one-way clutch 50, and the drive power of the electric motors 2A and 2B is transmitted to the axles 10A and 10B.

Figure 12:
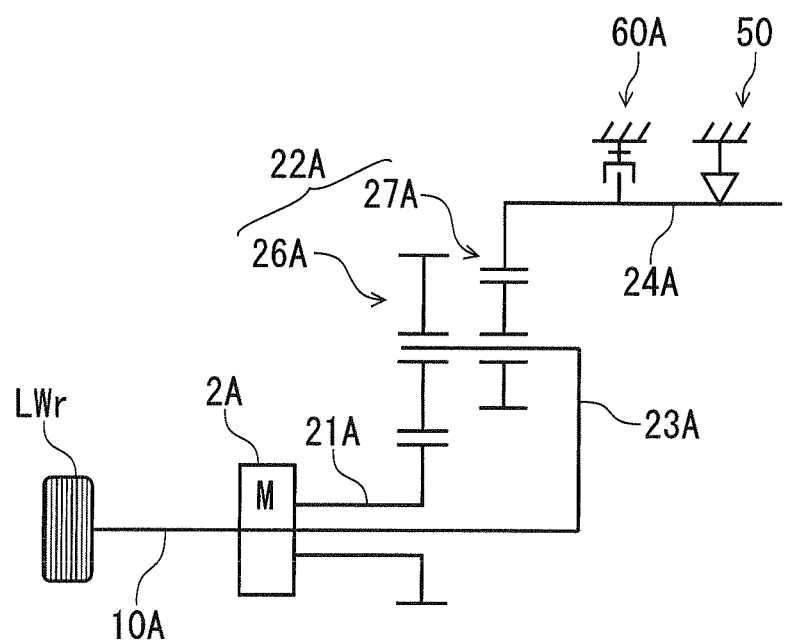
FIG. 12 is a view showing the schematic configuration of the drive unit 1 on the side of the left rear wheel LWr.

Four kinds of states, "MOT drive," "MOT reverse rotation," "MOT stop" and "MOT regeneration," are available as the states of the electric motors 2A and 2B of the drive unit 1 shown in FIG. 11. A torque transmission pathway in each state will be described below. The schematic configuration of the drive unit 1 described above on the side of the left rear wheel LWr is shown in FIG. 12.

(A) When the Electric Motor 2A, 2B is in the "MOT Drive" State or the "MOT Reverse Rotation" State When the electric motor 2A, 2B is in the "MOT drive" state, the ring gear 24A, 24B is locked by the one-way clutch 50 as shown in FIGS. 6 and 10. Furthermore, when the electric motor 2A, 2B is in the "MOT reverse rotation" state, the ring gear 24A, 24B is locked by the hydraulic brake 60A, 60B as shown in FIG. 9. Hence, the torque (drive torque) from the electric motor 2A, 2B is transmitted along the pathway described below. The pathway inside parentheses in the pathway described below indicates a reaction force (counteraction) that is generated because the ring gear 24A, 24B is locked.

"Electric motor 2A, 2B→sun gear 21A, 21B→first pinion 26A, 26B of planetary gear 22A, 22B→second pinion 27A, 27B→ring gear 24A, 24B (→second pinion 27A, 27B)→planetary gear 23A, 23B→axle 10A, 10B→rear wheel Wr"

In this way, at the time of the "MOT drive" state or the "MOT reverse rotation" state, the torque is transmitted from the sun gear 21A, 21B to the first pinion 26A, 26B of the planetary gear 22A, 22B.

(B) When the Electric Motor 2A, 2B is in the "MOT Stop" State

When the electric motor 2A, 2B is in the "MOT stop" state, the ring gear 24A, 24B is not locked by the one-way clutch 50 or by the hydraulic brake 60A, 60B as shown in FIGS. 5 and 7. Hence, the torque from the rear wheel Wr of the vehicle 3 is transmitted along the pathway described below.

"Rear wheel Wr→axle 10A, 10B→planetary gear 23A, 23B→second pinion 27A, 27B of planetary gear 22A, 22B→ring gear 24A, 24B"

Since the ring gear 24A, 24B is not locked, the ring gear 24A, 24B is rotated by a very small force. Hence, the most part of the torque from the rear wheel Wr is not transmitted to the first pinion 26A, 26B of the planetary gear 22A, 22B, but transmitted to the ring gear 24A, 24B.

In this way, at the time of the "MOT stop" state, the torque from the rear wheel Wr is not transmitted to the electric motor 2A, 2B. Hence, a torque-free state is attained between the sun gear 21A, 21B and the first pinion 26A, 26B of the planetary gear 22A, 22B.

(C) When the Electric Motor 2A, 2B is in the "MOT Regeneration" State

When the electric motor 2A, 2B is in the "MOT regeneration" state, as shown in FIG. 8, the ring gear 24A, 24B is locked by the hydraulic brake 60A, 60B. Hence, the torque (regeneration torque) from the electric motor 2A, 2B is transmitted along the pathway described below. The pathway inside parentheses in the pathway described below indicates a reaction force (counteraction) that is generated because the ring gear 24A, 24B is locked.

"Rear wheel Wr→axle 10A, 10B→planetary gear 23A, 23B→second pinion 27A, 27B of planetary gear 22A, 22B→ring gear 24A, 24B (→second pinion 27A, 27B)→first pinion 26A, 26B→sun gear 21A, 21B→electric motor 2A, 2B"

In this way, at the time of the "MOT regeneration" state, the torque is transmitted from the first pinion 26A, 26B of the planetary gear 22A, 22B to the sun gear 21A, 21B.

As described above, when the state of the electric motor 2A, 2B is changed from the "MOT stop" state to the "MOT drive" state, the "MOT reverse rotation" state or the "MOT regeneration" state, the torque is transmitted in either direction between the sun gear 21A, 21B and the first pinion 26A, 26B having been in the torque-free state. Furthermore, when the state of the electric motor 2A, 2B is changed from the "MOT drive" state or the "MOT reverse rotation" state to the "MOT regeneration" state, the direction of the torque transmission between the sun gear 21A, 21B and the first pinion 26A, 26B is changed to the reverse direction. Similarly, when the state of the electric motor 2A, 2B is changed from the "MOT regeneration" state to the "MOT drive" state or the "MOT reverse rotation" state, the direction of the torque transmission between the sun gear 21A, 21B and the first pinion 26A, 26B is changed to the reverse direction.

Figure 23:
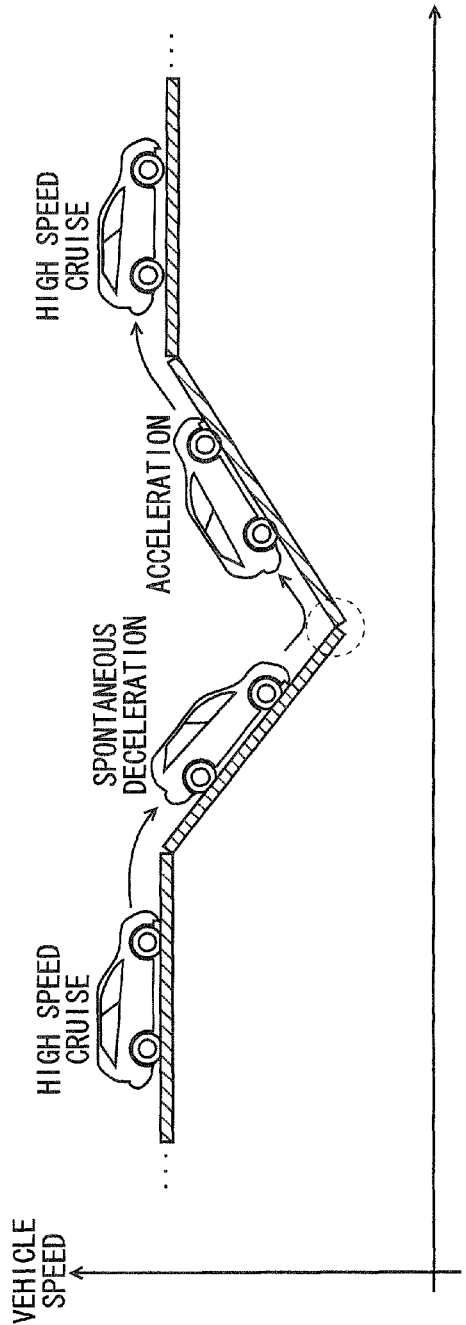
FIG. 23 is a view showing the states of the electric motor 2A, 2B and the states of the disengagement mechanism in the travel state of the vehicle 3.

The engagement between the sun gear 21A, 21B and the first pinion 26A, 26B indicated by elliptical broken lines in FIG. 2 is achieved by the gears opposed to each other. As described above, a clearance called "backlash" is provided between the two gears opposed to each other as shown in FIG. 23. When the transmission direction of the torque is changed or when the torque is transmitted in either direction from the torque-free state, the drive unit 1 according to the embodiment performs control so that no shock occurs due to the backlash. This control is not required since the torque is transmitted between the second pinion 27A, 27B of the planetary gear 22A, 22B and the ring gear 24A, 24B in the same direction (second pinion 27A, 27B→ring gear 24A, 24B) regardless of the state.

Control performed by the drive unit 1 when the state of the electric motor 2A, 2B is changed from the "MOT stop" state to the "MOT drive" state will be described below. The state of the electric motor 2A, 2B is changed from the "MOT stop" state to the "MOT drive" state at the time (a) when the vehicle 3, having stopped, performs EV start, at the time (b) when the vehicle 3, having been performing high speed cruise, further accelerates or at the time (c) when the vehicle 3, having been performing spontaneous deceleration, accelerates. The drive unit 1 according to the embodiment performs control as described below when the vehicle 3 travels as described above in (b) and (c).

Figure 13:
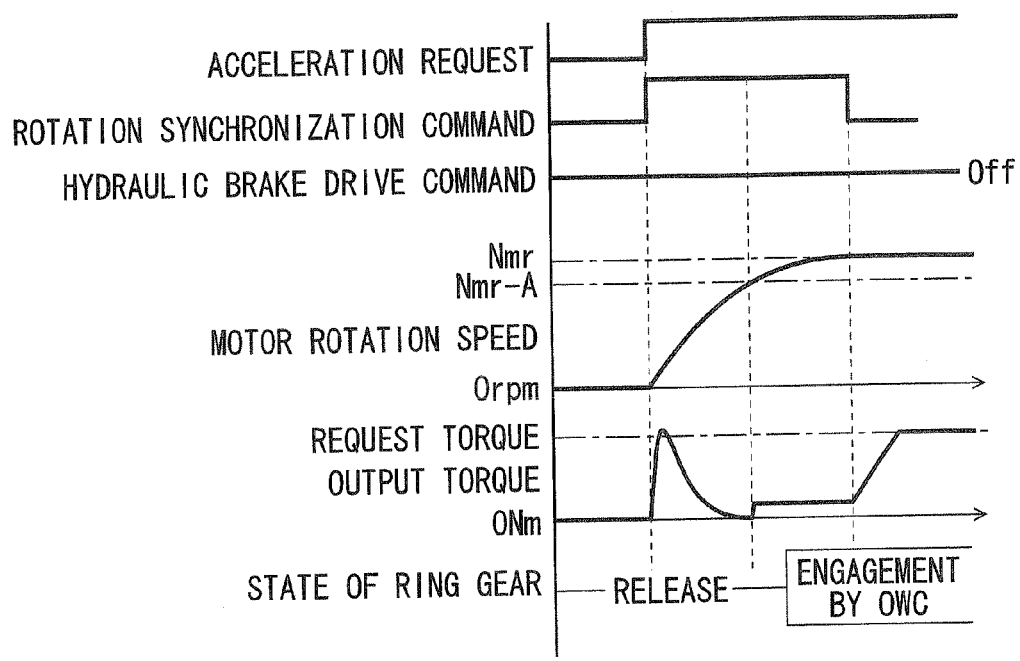
FIG. 13 is a timing chart showing various parameters used when the vehicle 3, having been performing high speed cruise or spontaneous deceleration, accelerates.

FIG. 13 is a timing chart showing various parameters used when the vehicle 3, having been performing high speed cruise or spontaneous deceleration, accelerates. As shown in FIG. 11, when the vehicle 3 performs high speed cruise or spontaneous deceleration, the electric motor 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. When the driver makes an acceleration request in this state, the management ECU 9 issues a command (rotation speed synchronization command) for raising the rotation speeds (motor rotation speeds) of the electric motors 2A and 2B to a target rotation speed Nmr.

The management ECU 9 judges whether the acceleration request by the driver is present on the basis of the accelerator pedal opening Ap shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of a signal from the vehicle speed sensor 117 shown in FIG. 1, and the management ECU 9 judges the rotation speeds of the axles 10A and 10B on the basis of signals from the rotation speed sensors 117$a$ and 117$b$ shown in FIG. 1.

When the motor rotation speed rises to a value (Nmr−A) lower than the target rotation speed Nmr by a predetermined value, the management ECU 9 controls the electric motor 2A, 2B so that the electric motor outputs a constant torque. After starting the control so that the electric motor 2A, 2B outputs the constant torque, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr or a time point at which a predetermined time has passed after the control of the electric motor 2A, 2B was started so that the constant torque was output.

Before the management ECU 9 judges that the rotation speed synchronization of the electric motor 2A, 2B is completed, the ring gear 24A, 24B of the planetary gear reducer 12A, 12B is locked by the one-way clutch 50. At this time, the electric motor 2A, 2B outputs a drive torque in a direction in which the one-way clutch 50 is engaged. Upon judging that the rotation speed synchronization of the electric motor 2A, 2B is completed, the management ECU 9 controls the electric motor 2A, 2B so that the electric motor output a request torque. Hence, the output torque from the electric motor 2A, 2B is transmitted to the rear wheel Wr, and the vehicle 3 accelerates.

Figure 14:
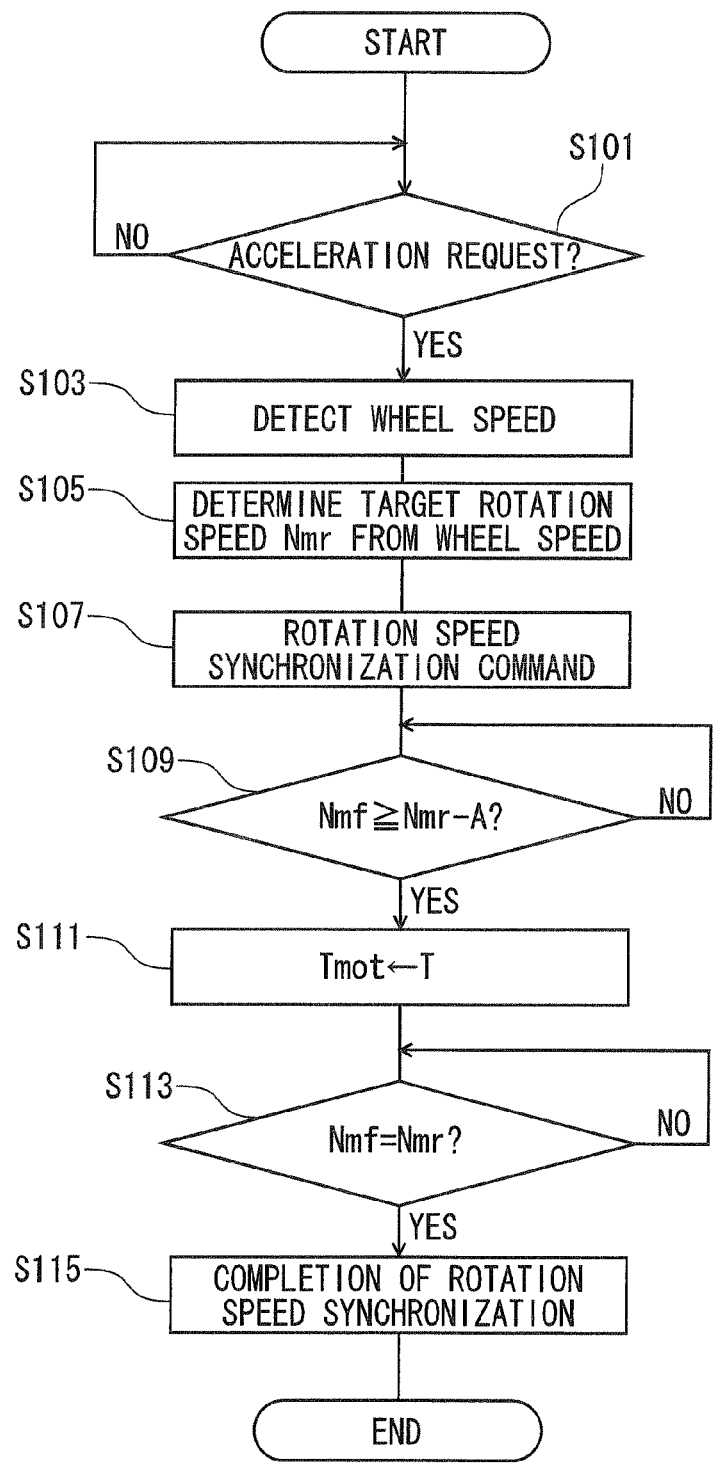
FIG. 14 is a flowchart showing the content of a sequence of control performed by a management ECU 9 when an acceleration request is made.

The above-mentioned control performed for the electric motor 2A, 2B of the drive unit 1 by the management ECU 9 will be described on the basis of a flowchart. FIG. 14 is a flowchart showing the content of the control performed by the management ECU 9 when an acceleration request is made. As shown in FIG. 14, the management ECU 9 judges whether an acceleration request from the driver is present on the basis of the accelerator pedal opening Ap (at step S101). In the case that the acceleration request is present, the processing advances to step S103.

At step S103, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S105). Then, the management ECU 9 issues a command (rotation speed synchronization command) for raising the rotation speed (motor rotation speed) Nmf of the electric motor 2A, 2B to the target rotation speed Nmr (at step S107). The management ECU 9 judges whether the motor rotation speed Nmf has reached the value (Nmr−A) lower than the target rotation speed Nmr by the predetermined value (at step S109).

When the relationship Nmf≥Nmr−A is satisfied, the management ECU 9 controls the electric motor 2A, 2B so that the electric motor outputs a constant torque T (at step S111). Next, the management ECU 9 judges whether the motor rotation speed Nmf has reached the target rotation speed Nmr (at step S113). When the relationship Nmf=Nmr is satisfied, the management ECU 9 judges that the rotation speed synchronization of the electric motor 2A, 2B is completed (at step S115). Upon judging that the rotation speed synchronization of the electric motor 2A, 2B is completed, the management ECU 9 controls the electric motor 2A, 2B so that the electric motor outputs the request torque. Hence, the output torque from the electric motor 2A, 2B is transmitted to the rear wheel Wr, and the vehicle 3 accelerates.

Figure 15:
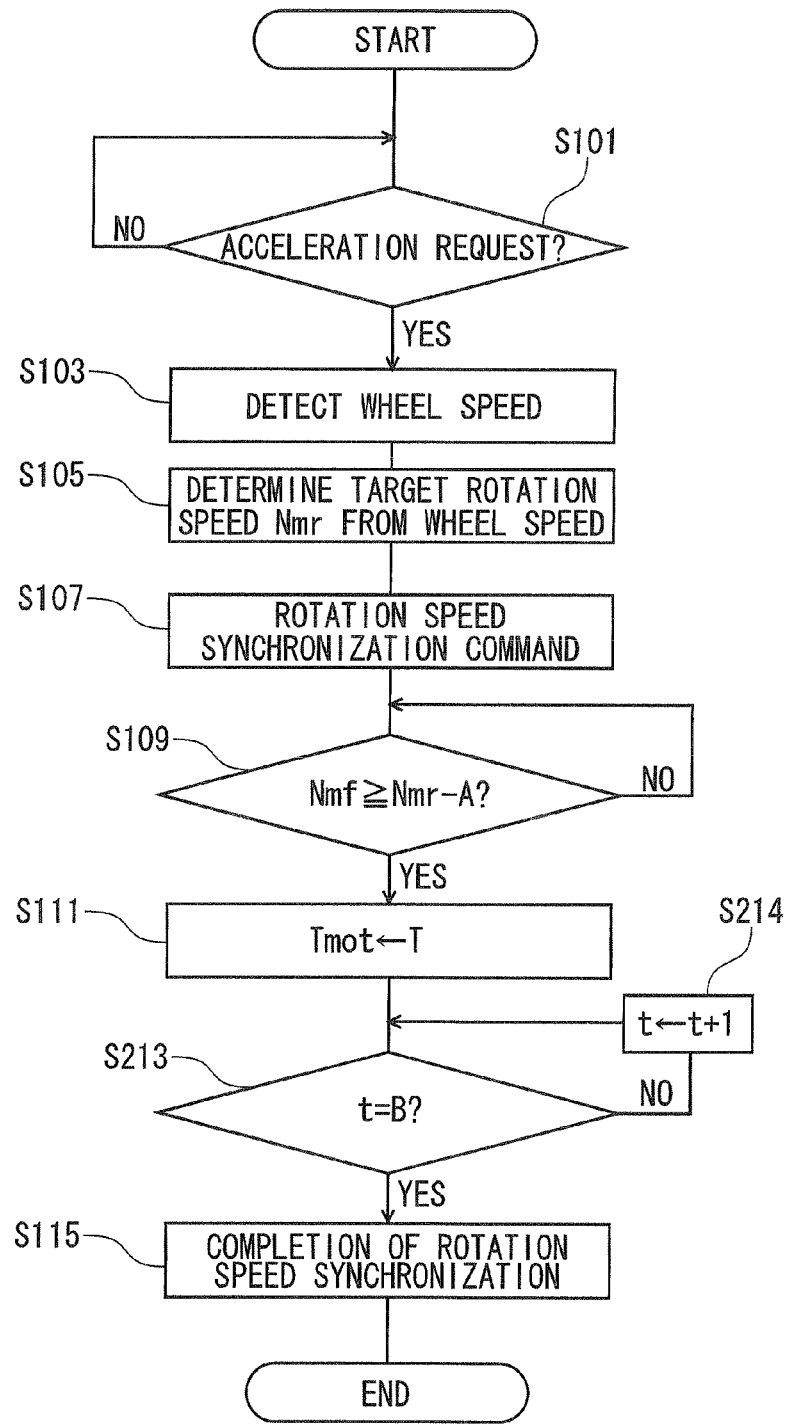
FIG. 15 is a flowchart showing the content of another sequence of control performed by the management ECU 9 when an acceleration request is made.

In the flowchart described above and shown in FIG. 14, the management ECU 9 judges whether the motor rotation speed Nmf has reached the target rotation speed Nmr at step S113. However, as shown in FIG. 15, it may be possible that the management ECU 9 counts the time t elapsed from the start of the control (at step S111) in which the electric motor 2A, 2B outputs the constant torque T (at step S114) and judges whether the elapsed time t has reached a predetermined time B (at step S213), instead of executing step S113.

As described above, in the first example of the embodiment, the rotation speed synchronization control of the electric motor 2A, 2B is performed when the electric motor 2A, 2B having been stopped performs power-driving while the vehicle is traveling, and the ring gear 24A, 24B is locked by the one-way clutch 50 while the electric motor 2A, 2B is outputting the constant torque. When the ring gear 24A, 24B is locked while the output torque of the electric motor 2A, 2B is increasing, the torque (drive torque) is suddenly transmitted from the sun gear 21A, 21B to the first pinion 26A, 26B of the planetary gear 22A, 22B. In this case, the shock due to the backlash between the sun gear 21A, 21B and the first pinion 26A, 26B is large. However, as described above, in the embodiment, since the output torque of the electric motor 2A, 2B at the time when the ring gear 24A, 24B is locked by the one-way clutch 50 is constant, the shock due to the backlash between the sun gear 21A, 21B and the first pinion 26A, 26B is very small. In other words, the shock due to the backlash can be reduced even if the rotation directions of the gears of the reducer along the power consumption pathway are changed.

When the state of the electric motor 2A, 2B is changed from the "MOT regeneration" state to the "MOT drive" state, the locking of the ring gear 24A, 24B using the hydraulic brake 60A, 60B is switched to the locking using the one-way clutch 50, and the direction of torque transmission between the sun gear 21A, 21B and the first pinion 26A, 26B is reversed. Even at this time, the drive unit 1 according to the embodiment performs the control shown in FIG. 13.

Furthermore, when the vehicle, having stopped, travels rearward, the state of the electric motor 2A, 2B is changed from the "MOT stop" state to the "MOT reverse rotation" state. At this time, the shock due to the backlash may occur. However, as described above, the above-mentioned control performed by the drive unit 1 according to the embodiment is performed when the vehicle travels. Hence, when the vehicle, having stopped, travels rearward, the drive unit 1 does not perform the control.

Next, the control performed by the drive unit 1 when the state of the electric motor 2A, 2B is changed from the "MOT stop" state to the "MOT regeneration" state will be described. The state of the electric motor 2A, 2B is changed from the "MOT stop" state to the "MOT regeneration" state at the time (a) when the vehicle, having performing high speed cruise, performs deceleration regeneration or at the time (b) when the vehicle, having been performing spontaneous deceleration, performs deceleration regeneration.

Figure 16:
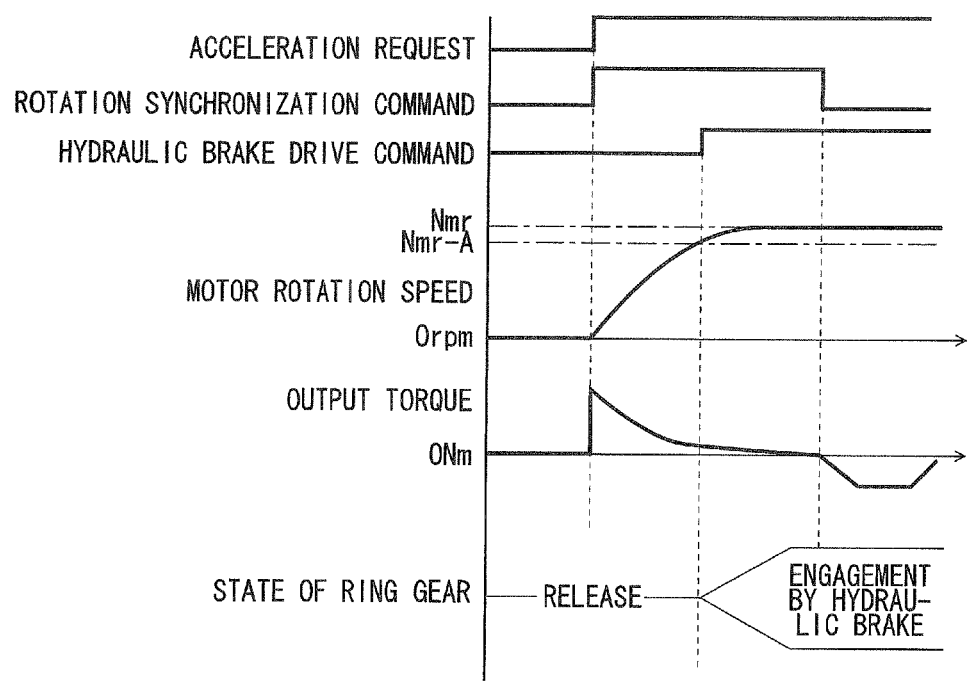
FIG. 16 is a timing chart showing various parameters used when the vehicle 3, having been performing high speed cruise or spontaneous deceleration, performs deceleration regeneration.

FIG. 16 is a timing chart showing various parameters used when the state of the vehicle 3 is changed from spontaneous deceleration or spontaneous deceleration to deceleration regeneration. As shown in FIG. 11, when the vehicle 3 performs high speed cruise or spontaneous deceleration, the electric motors 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. When the driver makes a deceleration request in this state, the management ECU 9 issues a command (rotation speed synchronization command) for raising the rotation speeds (motor rotation speeds) of the electric motors 2A and 2B to the target rotation speed Nmr.

The management ECU 9 judges whether the deceleration request by the driver is present on the basis of the brake pedal depression force Br shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of the signal from the vehicle speed sensor 117 shown in FIG. 1, and the management ECU 9 judges the rotation speeds of the axles 10A and 10B on the basis of the signals from the rotation speed sensors 117a and 117b shown in FIG. 1.

When the motor rotation speed rises to the value (Nmr−A) lower than the target rotation speed Nmr by the predetermined value, the management ECU 9 issues a drive command for driving the hydraulic brake 60A, 60B. According to the drive command, oil is supplied from the oil pump 70 to the hydraulic brake 60A, 60B, and the ring gear 24A, 24B of the planetary gear reducer 12A, 12B is locked by the hydraulic brake 60A, 60B.

The timing of the drive command issued by the management ECU 9 to drive the hydraulic brake 60A, 60B is not the same as the timing when the ring gear 24A, 24B is locked by the hydraulic brake 60A, 60B. In other words, a certain period of time is required until the ring gear 24A, 24B is locked due to the time required to supply oil from the oil pump 70 to the hydraulic brake 60A, 60B, the viscosity of the oil, etc. Hence, after issuing the drive command for driving the hydraulic brake 60A, 60B, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr, a time point at which the hydraulic pressure of the hydraulic brake 60A, 60B has reached a predetermined value or a time point at which a predetermined time has passed after the drive command for driving the hydraulic brake 60A, 60B was issued.

When the management ECU 9 judges that the rotation speed synchronization of the electric motor 2A, 2B is completed, a regeneration torque is applied to the electric motor 2A, 2B in a direction in which the one-way clutch 50 is not engaged. Hence, the management ECU 9 keeps issuing the drive command for driving the hydraulic brake 60A, 60B even after the judgment to maintain the locking of the ring gear 24A, 24B. Since the locking of the ring gear 24A, 24B is maintained using the hydraulic brake 60A, 60B as described above, regenerative braking using the electric motor 2A, 2B is performed, and the vehicle 3 decelerates.

Figure 17:
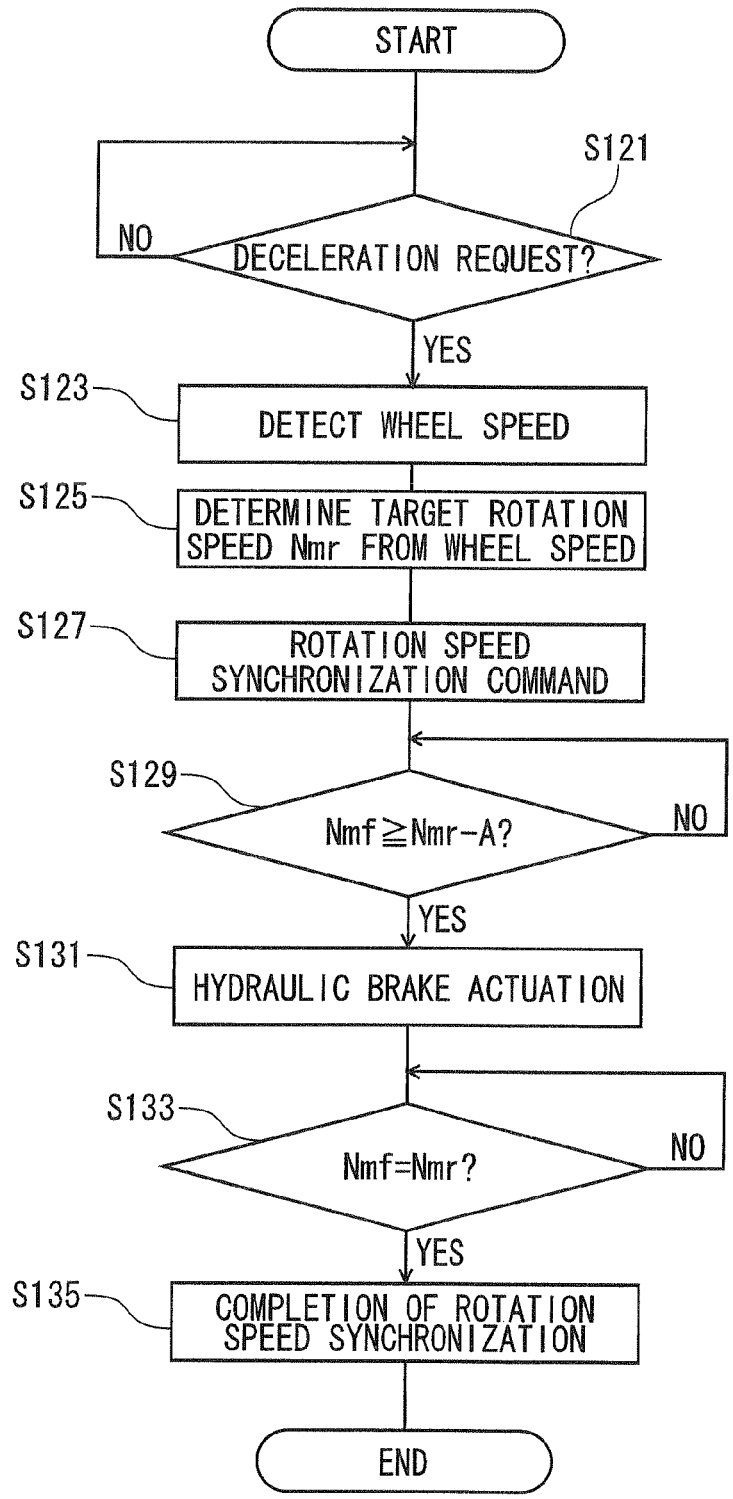
FIG. 17 is a flowchart showing the content of a sequence of control performed by the management ECU 9 when a deceleration request is made.

The above-mentioned control performed for the electric motor 2A, 2B and the hydraulic brake 60A, 60B of the drive unit 1 by the management ECU 9 will be described on the basis of a flowchart. FIG. 17 is a flowchart showing the content of the control performed by the management ECU 9. As shown in FIG. 17, the management ECU 9 judges whether a deceleration request from the driver is present on the basis of the brake pedal depression force Br (at step S121). In the case that the deceleration request is present, the processing advances to step S123.

At step S123, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S125). Then, the management ECU 9 issues a command (rotation speed synchronization command) for raising the rotation speed (motor rotation speed) Nmf of the electric motor 2A, 2B to the target rotation speed Nmr (at step S127). The management ECU 9 judges whether the motor rotation speed Nmf has reached the value (Nmr−A) lower than the target rotation speed Nmr by the predetermined value (at step S129). When the relationship Nmf≥Nmr−A is satisfied, the management ECU 9 issues the drive command for driving the hydraulic brake 60A, 60B (at step S131).

Next, the management ECU 9 judges whether the motor rotation speed Nmf has reached the target rotation speed Nmr (at step S133). When the relationship Nmf=Nmr is satisfied, the management ECU 9 judges that the rotation speed synchronization of the electric motor 2A, 2B is completed (at step S135). When the management ECU 9 judges that the rotation speed synchronization is completed at step S135, the regeneration torque is applied to the electric motor 2A, 2B in a direction in which the one-way clutch 50 is not engaged. Hence, the management ECU 9 keeps issuing the drive command for driving the hydraulic brake 60A, 60B even after the judgment. Accordingly, regenerative braking using the electric motor 2A, 2B is performed, and the vehicle 3 decelerates.

Figure 18:
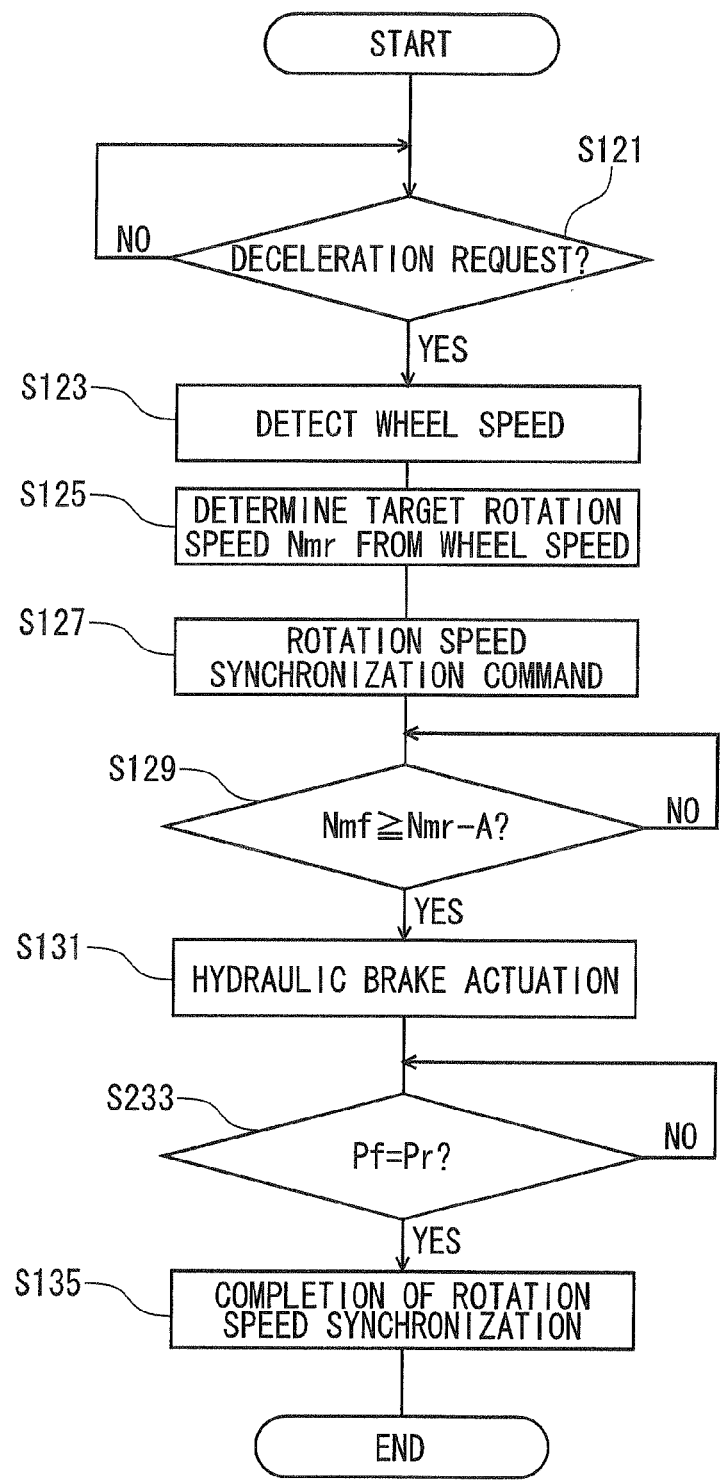
FIG. 18 is a flowchart showing the content of another sequence of control performed by the management ECU 9 when a deceleration request is made.
Figure 19:
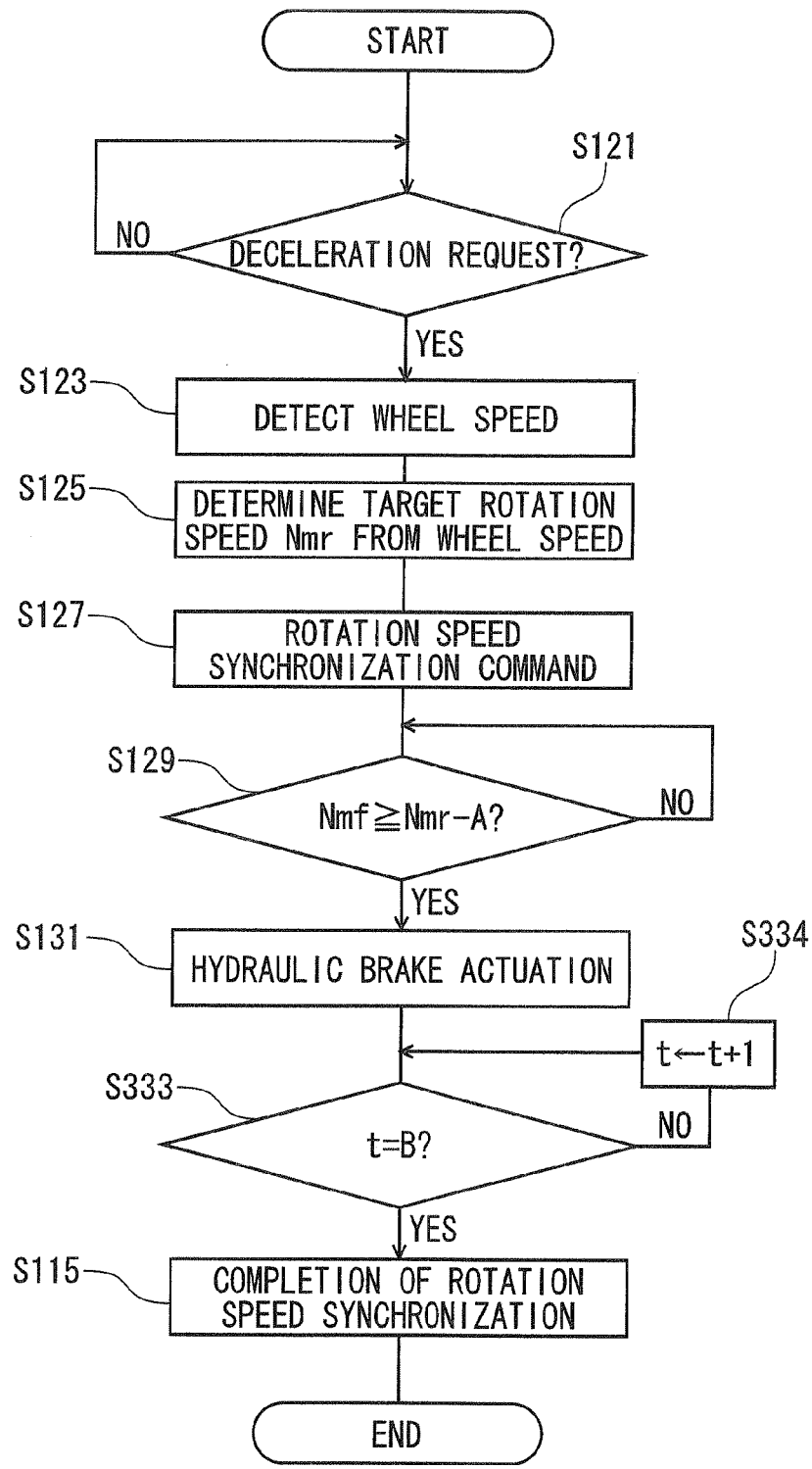
FIG. 19 is a flowchart showing the content of still another sequence of control performed by the management ECU 9 when a deceleration request is made.

In the flowchart described above and shown in FIG. 17, the management ECU 9 judges whether the motor rotation speed Nmf has reached the target rotation speed Nmr at step S133. However, as shown in FIG. 18, it may be possible that the management ECU 9 judges whether the hydraulic pressure Pf of the hydraulic brake 60A, 60B has reached a predetermined value Pr (at step S233), instead of executing step S133. Furthermore, as shown in FIG. 19, it may also be possible that the management ECU 9 counts the time t elapsed from the issue of the drive command (at step S131) for driving the hydraulic brake 60A, 60B (at step S334) and judges whether the elapsed time t has reached the predetermined time B (at step 333), instead of executing step S113.

As described above, in the first example of the embodiment, the rotation speed synchronization control of the electric motor 2A, 2B is performed when the electric motor 2A, 2B having been stopped performs regeneration-driving while the vehicle is traveling, and the ring gear 24A, 24B is gradually locked by the hydraulic brake 60A, 60B. Hence, the regeneration torque is gradually transmitted from the first pinion 26A, 26B of the planetary gear 22A, 22B to the sun gear 21A, 21B. The shock due to the backlash between the first pinion 26A, 26B and the sun gear 21A, 21B is very small. In other words, the shock due to the backlash can be reduced even if the rotation directions of the gears of the reducer along the power consumption pathway are changed.

When the state of the electric motor 2A, 2B is changed from the "MOT drive" state to the "MOT regeneration" state, the locking of the ring gear 24A, 24B using the one-way clutch 50 is switched to the locking using the hydraulic brake 60A, 60B, and the direction of torque transmission between the sun gear 21A, 21B and the first pinion 26A, 26B is reversed. Even at this time, the drive unit 1 according to the embodiment performs the control shown in FIG. 16.

In the embodiment, the electric motor 2A and the planetary gear reducer 12A of the drive unit 1 control the left rear wheel LWr, and the electric motor 2B and the planetary gear reducer 12B of the drive unit 1 control the right rear wheel RWr. Hence, in the case that the electric motors 2A and 2B are required to be driven while the vehicle 3 is turning, the management ECU 9 makes torque requests being different from each other for the left and right electric motors 2A and 2B. In other words, the management ECU 9 calculates a request torque for each of the left and right electric motors 2A and 2B on the basis of the travel state of the vehicle 3 at this time.

However, when the vehicle 3 turns, one of the request torques for the left and right electric motors 2A can be a drive torque and the other can be a regeneration torque. In this case, the management ECU 9 performs the control shown in FIG. 13 for the electric motor for which the drive torque is requested and performs the control shown in FIG. 16 for the electric motor for which the regeneration torque is requested. Furthermore, upon judging that the rotation speed synchronization of the electric motor 2A, 2B is completed, the management ECU 9 judges whether the total value of the two request torques is equal to 0 or more.

In the case that the total value is equal to 0 or more, the management ECU 9 stops issuing the drive command for driving the hydraulic brake on the side of the electric motor for which the regeneration torque is requested. At this time, the regeneration torque is applied to the electric motor in a direction in which the one-way clutch 50 is engaged. For this reason, the ring gear is locked by the one-way clutch 50 even after the locking using the hydraulic brake is released. Hence, the output torque from the electric motor 2A, 2B is transmitted to the rear wheel Wr, and the vehicle 3 accelerates. On the other hand, in the case that the total value is less than 0, the management ECU 9 maintains the drive command for driving the hydraulic brake on the side of the electric motor for which the regeneration torque is requested to maintain the locking of the ring gear.

Figure 20:
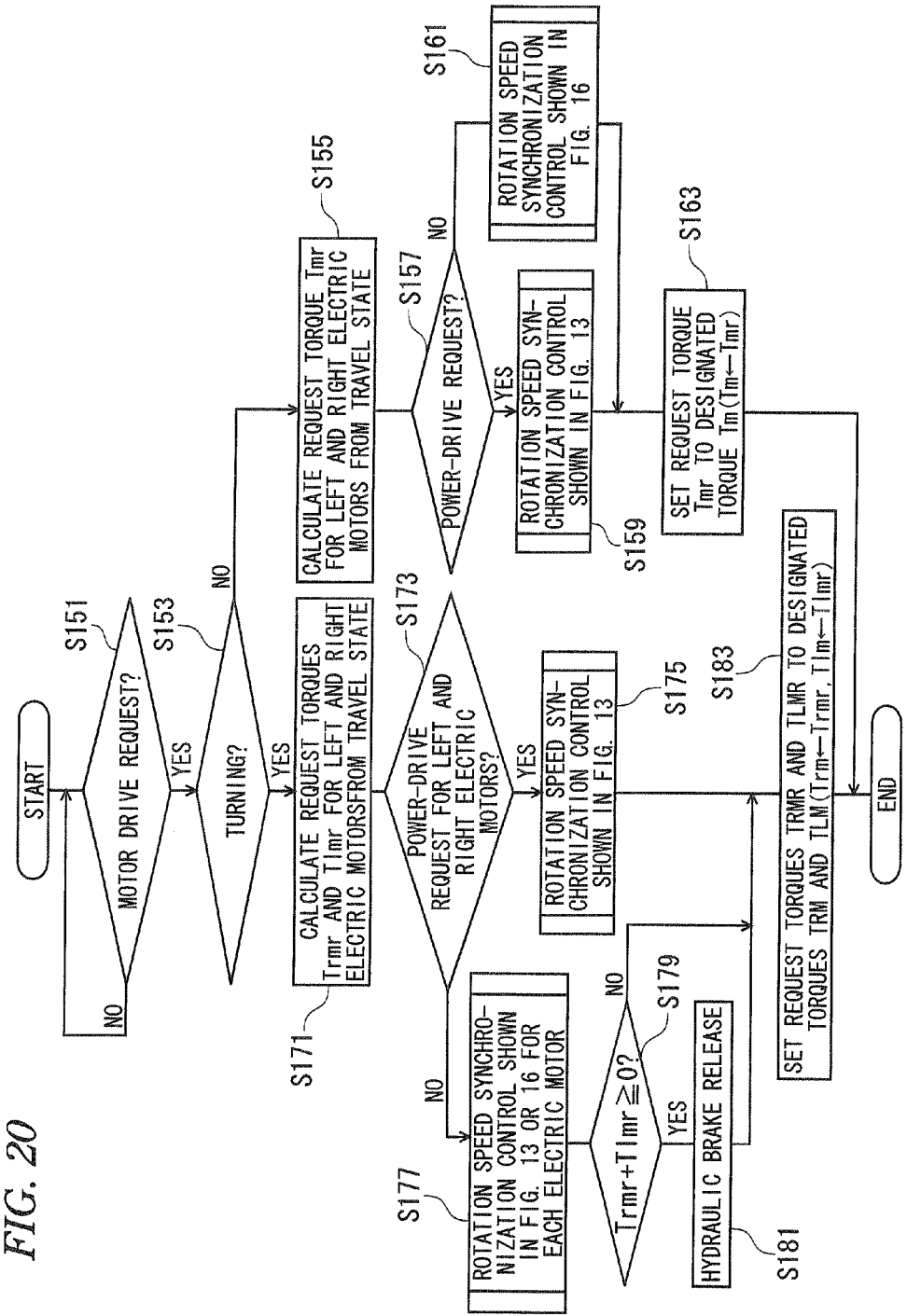
FIG. 20 is a flowchart showing the control performed by the drive unit 1.

FIG. 20 is a flowchart showing the control performed by the drive unit 1. As shown in FIG. 20, the management ECU 9 judges whether a drive request for the electric motor 2A, 2B is present (at step S151). In the case that the drive request is present, the processing advances to step S153. At step S153, on the basis of the steering operation information of the vehicle 3, the management ECU 9 judges whether the vehicle 3 being traveling is turning. In the case of turning, the processing advances to step S171; in the case of going straight instead of turning, the processing advances to step S155.

At step S155, the management ECU 9 calculates a request torque Tmr for each of the left and right electric motors 2A and 2B on the basis of the travel state of the vehicle 3. Next, the management ECU 9 judges whether the request torque Tmr is a power-drive request for the electric motor 2A, 2B (at step S157). In the case of the power-drive request, the processing advances to step S159; in the case of a regeneration-drive request instead of the power-drive request, the processing advances to step S161. At step S159, the management ECU 9 performs the control described in FIG. 13. On the other hand, at step S161, the management ECU 9 performs the control described in FIG. 16. In the end, the management ECU 9 sets the request torque Tmr to a designated torque Tm (at step S163).

On the other hand, at step S171, the management ECU 9 calculates the request torques Trmr and Tlmr for the left and right electric motors 2A and 2B on the basis of the travel state of the vehicle 3. Next, the management ECU 9 judges whether both the request torques Trmr and Tlmr are a power-drive request (at step S173). In the case that both the request torques Trmr and Tlmr are the power-drive request, the processing advances to step S175; in the case that at least one of them is the regeneration-drive request instead of the power-drive request, the processing advances to step S179.

At step S175, the management ECU 9 performs the control described in FIG. 13. On the other hand, at step S177, the management ECU 9 performs the control described in FIG. 13 or the control described in FIG. 16 depending on the request torque of each electric motor. Next, at step S179, the management ECU 9 judges whether the sum of the request torques Trmr and Tlmr is equal to or more than 0; in the case that the total is equal to or more than 0, the processing advances to step S181, and in the case that the total is less than 0, the processing advances to step S183. At step S181, the management ECU 9 releases the locking of the hydraulic brakes. In the end, at step S183, the management ECU 9 sets the respective request torques Trmr and Tlmr to designated torques Trm and Tim.

SECOND EXAMPLE

Figure 21:
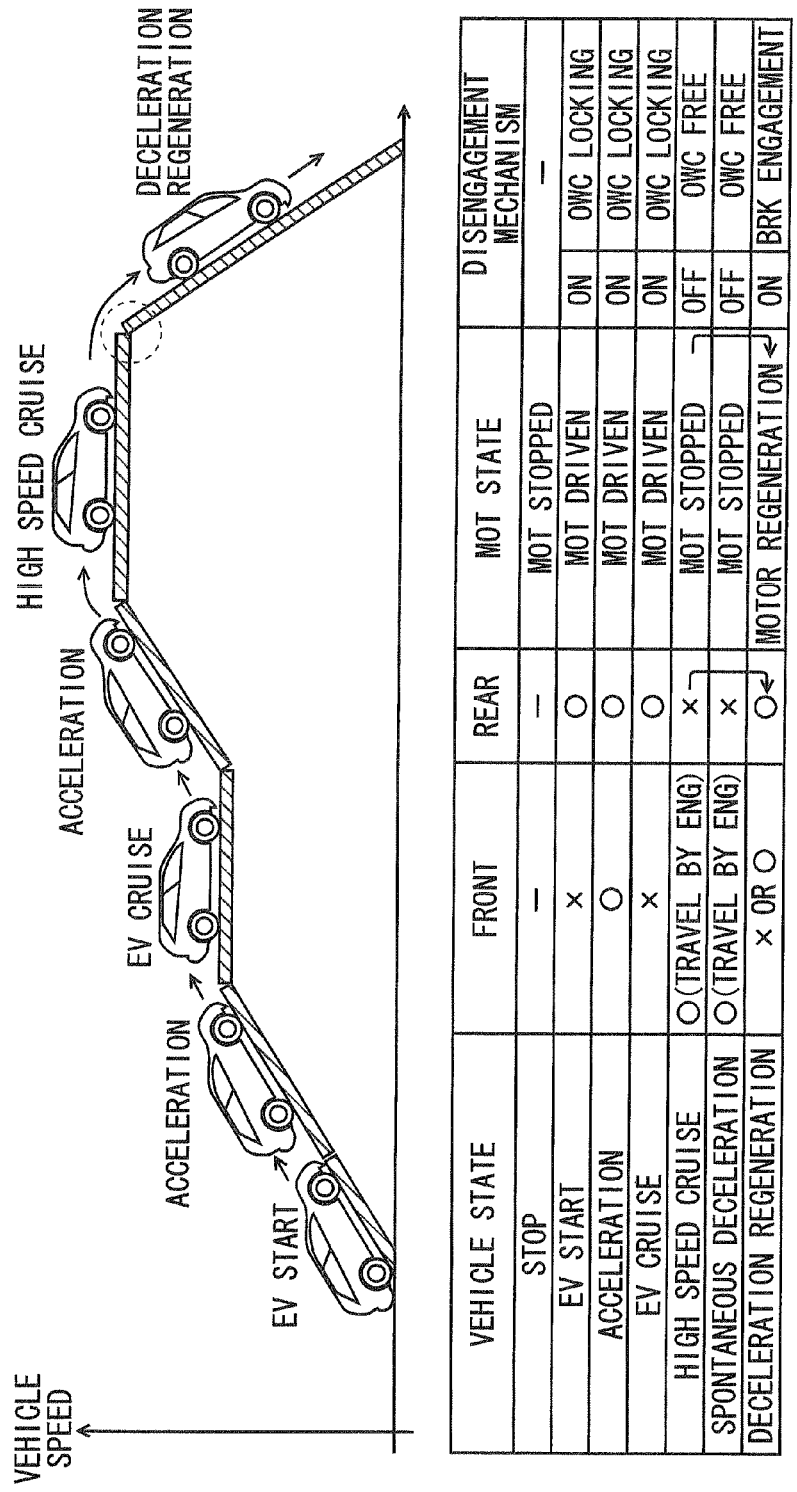
FIG. 21 is a view showing the states of the electric motor 2A, 2B and the states of the disengagement mechanism in the travel state of the vehicle 3.

FIG. 21 is a view showing the states of the electric motor 2A, 2B and the states of the disengagement mechanism (the one-way clutch 50 and the hydraulic brake 60A, 60B) in the travel state of the vehicle 3. "Front" represents the drive unit 6 for driving the front wheels Wf, "rear" represents the drive unit 1 for driving the rear wheels Wr, o indicates active (including drive and regeneration), and × indicates inactive (stop). Furthermore, "MOT state" represents the state of the electric motor 2A, 2B of the drive unit 1. Moreover, "OWC" represents the one-way clutch 50, and "BRK" represents the hydraulic brake 60A, 60B.

At the stop time of the vehicle, the electric motors 2A and 2B of the drive unit 1 are stopped, both the drive unit 6 on the side of the front wheels Wf and the drive unit 1 on the side of the rear wheels Wr are stopped, and the disengagement mechanism is also in an inactive state as described referring to FIG. 5.

Next, after the ignition is turned ON, at the time of EV start, the electric motors 2A and 2B of the drive unit 1 for the rear wheels Wr are driven. At this time, as described referring to FIG. 6, the disengagement mechanism is locked by the one-way clutch 50, and the drive power of the electric motors 2A and 2B is transmitted to the axles 10A and 10B.

Then, at the time of acceleration, four-wheel driving is carried out using the drive unit 6 on the side of the front wheels Wf and the drive unit 1 on the side of the rear wheels Wr; at this time, as described referring to FIG. 6, the disengagement mechanism is locked by the one-way clutch 50 and the drive power of the electric motors 2A and 2B is transmitted to the axles 10A and 10B.

At the time of EV cruise at low and medium speed ranges, since the efficiency of the motors is high, the drive unit 6 on the side of the front wheels Wf is inactive and rear-wheel driving is carried out using the drive unit 1 on the side of the rear wheels Wr. At this time, as described referring to FIG. 6, the disengagement mechanism is locked by the one-way clutch 50 and the drive power of the electric motors 2A and 2B is transmitted to the axles 10A and 10B.

On the other hand, at the time of high speed cruise at a high speed range, since the efficiency of the engine is high, front-wheel driving is carried out using the drive unit 6 on the side of the front wheels Wf. At this time, as described referring to FIG. 7, the one-way clutch 50 of the disengagement mechanism is released (OWC free) and the hydraulic brakes 60A and 60B are inactive, whereby the electric motors 2A and 2B are stopped.

Furthermore, also in the case of spontaneous deceleration, as described referring to FIG. 7, the one-way clutch 50 of the disengagement mechanism is released (OWC free) and the hydraulic brakes 60A and 60B are inactive, whereby the electric motors 2A and 2B are stopped.

On the other hand, in the case of deceleration regeneration, for example, in the case that driving is carried out by the drive power of the drive unit 6 on the side of the front wheels Wf, as detailed above referring to FIG. 8, the one-way clutch 50 of the disengagement mechanism is released (OWC free), but the hydraulic brakes 60A and 60B are engaged, whereby regenerative charging is performed by the electric motors 2A and 2B.

Figure 22:
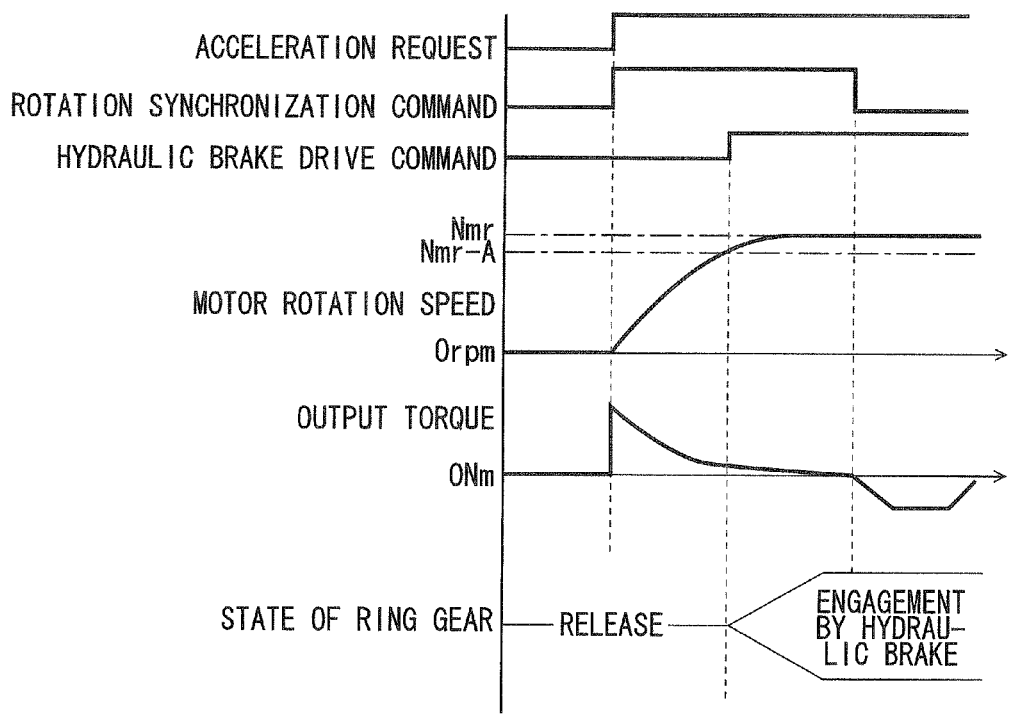
FIG. 22 is a timing chart showing various parameters used when the state of the vehicle 3 is changed from high speed cruise to deceleration regeneration.

Referring to FIGS. 21 and 22, the control performed for the electric motors 2A and 2B and the hydraulic brakes 60A and 60B of the drive unit 1 by the management ECU 9 when the state of the vehicle 3 is changed from high speed cruise to deceleration regeneration will be described below. The timing at which the state of the vehicle 3 is changed from high speed cruise to deceleration regeneration is indicated by an elliptical broken line in FIG. 21. FIG. 22 is a timing chart showing various parameters used when the state of the vehicle 3 is changed from high speed cruise to deceleration regeneration.

As shown in FIG. 21, when the state of the vehicle 3 is high speed cruise, the traveling using the drive unit 6 on the side of the front wheels Wf is performed, and the electric motors 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. Hence, the vehicle 3 is traveling using front-wheel drive. When the driver makes an deceleration request in this state, the management ECU 9 issues a command (rotation speed synchronization command) for raising the rotation speeds (motor rotation speeds) of the electric motors 2A and 2B to the target rotation speed Nmr.

The management ECU 9 judges whether the deceleration request by the driver is present on the basis of the brake pedal depression force Br shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of the signal from the vehicle speed sensor 117 shown in FIG. 1, and the management ECU 9 judges the rotation speeds of the axles 10A and 10B on the basis of the signals from the rotation speed sensors 117a and 117b shown in FIG. 1.

When the motor rotation speed rises to the value (Nmr−A) lower than the target rotation speed Nmr by the predetermined value, the management ECU 9 issues a drive command for driving the hydraulic brake 60A, 60B. According to the drive command, oil is supplied from the oil pump 70 to the hydraulic brake 60A, 60B, and the ring gear 24A, 24B of the planetary gear reducer 12A, 12B is locked by the hydraulic brake 60A, 60B.

The timing of the drive command issued by the management ECU 9 to drive the hydraulic brake 60A, 60B is not the same as the timing when the ring gear 24A, 24B is locked by the hydraulic brake 60A, 60B. In other words, a certain period of time is required until the ring gear 24A, 24B is locked due to the time required to supply oil from the oil pump 70 to the hydraulic brake 60A, 60B, the viscosity of the oil, etc. Hence, after issuing the drive command for driving the hydraulic brake 60A, 60B, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr, a time point at which the hydraulic pressure of the hydraulic brake 60A, 60B has reached a predetermined value or a time point at which a predetermined time has passed after the drive command for driving the hydraulic brake 60A, 60B was issued.

When the management ECU 9 judges that the rotation speed synchronization of the electric motor 2A, 2B is completed, a regeneration torque is applied to the electric motor 2A, 2B in a direction in which the one-way clutch 50 is not engaged. Hence, the management ECU 9 keeps issuing the drive command for driving the hydraulic brake 60A, 60B even after the judgment to maintain the locking of the ring gear 24A, 24B. Since the locking of the ring gear 24A, 24B is maintained using the hydraulic brake 60A, 60B as described above, regenerative braking using the electric motor 2A, 2B is performed, and the vehicle 3 decelerates.

As described above, the deceleration regeneration of the vehicle 3 is started when the predetermined time has passed after the deceleration request was made by the driver. However, since the ring gear 24A, 24B is locked gradually by the hydraulic brake 60A, 60B, a shock due to the difference in rotation speed between the front wheels Wf and the rear wheels Wr does not occur.

Figure 24:
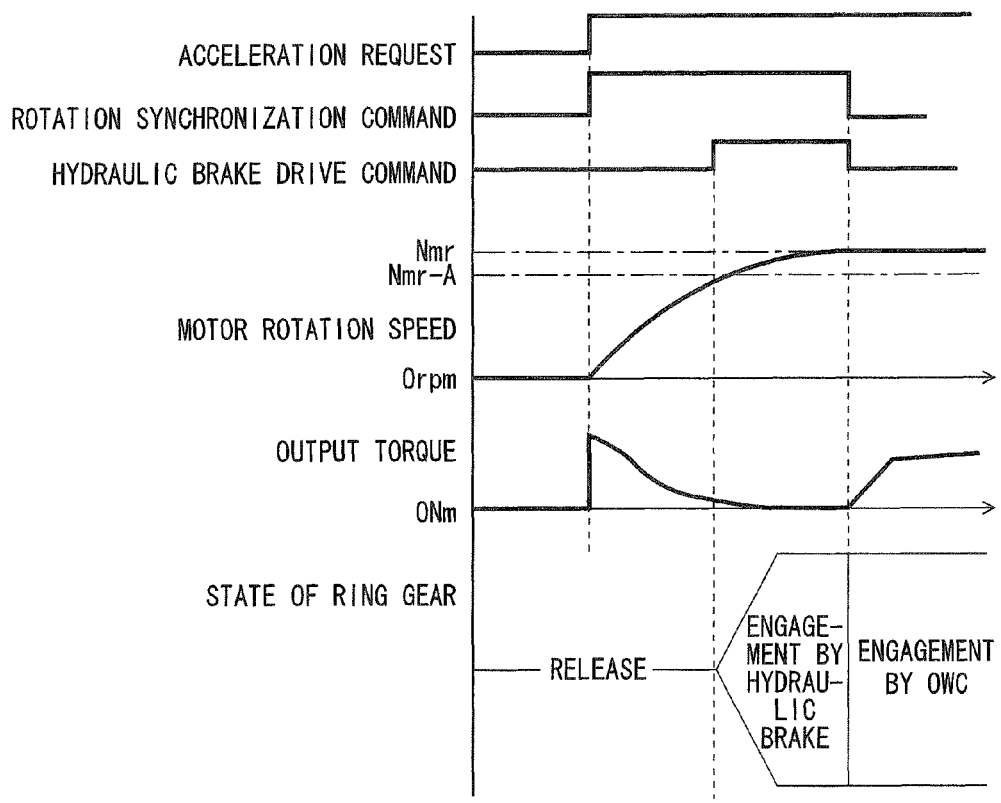
FIG. 24 is a timing chart showing various parameters used when the vehicle 3, having performing spontaneous deceleration, accelerates.

Next, referring to FIGS. 23 and 24, the control performed for the electric motors 2A and 2B and the hydraulic brakes 60A and 60B of the drive unit 1 by the management ECU 9 when the state of the vehicle 3 is changed from spontaneous deceleration to acceleration will be described. FIG. 23 is a view showing the states of the electric motor 2A, 2B and the states of the disengagement mechanism (the one-way clutch 50 and the hydraulic brake 60A, 60B) in the travel state of the vehicle 3. The timing at which the vehicle 3, having been performing spontaneous deceleration, accelerates is indicated by an elliptical broken line in FIG. 23. FIG. 24 is a timing chart showing various parameters used when the vehicle 3, having been performing spontaneous deceleration, accelerates.

As shown in FIG. 23, when the state of the vehicle 3 is spontaneous deceleration, the electric motors 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. When the driver makes an acceleration request in this state, the management ECU 9 issues a command (rotation speed synchronization command) for raising the rotation speeds (motor rotation speeds) of the electric motors 2A and 2B to a target rotation speed Nmr.

The management ECU 9 judges whether the acceleration request by the driver is present on the basis of the accelerator pedal opening Ap shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of the signal from the vehicle speed sensor 117 shown in FIG. 1, and the management ECU 9 judges the rotation speeds of the axles 10A and 10B on the basis of the signals from the rotation speed sensors 117a and 117b shown in FIG. 1.

When the motor rotation speed rises to the value (Nmr−A) lower than the target rotation speed Nmr by the predetermined value, the management ECU 9 issues the drive command for driving the hydraulic brake 60A, 60B. According to the drive command, oil is supplied from the oil pump 70 to the hydraulic brake 60A, 60B, and the ring gear 24A, 24B of the planetary gear reducer 12A, 12B is locked by the hydraulic brake 60A, 60B.

As described above, a certain period of time is required until the ring gear 24A, 24B is locked due to the time required to supply oil from the oil pump 70 to the hydraulic brakes 60A and 60B, the viscosity of the oil, etc. Hence, after issuing the drive command for driving the hydraulic brake 60A, 60B, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr, a time point at which the hydraulic pressure of the hydraulic brake 60A, 60B has reached a predetermined value or a time point at which a predetermined time has passed after the drive command for driving the hydraulic brake 60A, 60B was issued.

When the management ECU 9 judges that the rotation speed synchronization of the electric motor 2A, 2B is completed, the management ECU 9 stops issuing the drive command for driving the hydraulic brake 60A, 60B. At this time, the regeneration torque is applied to the electric motor 2A, 2B in a direction in which the one-way clutch 50 is engaged. For this reason, the ring gear 24A, 24B is locked by the one-way clutch 50 even after the locking using the hydraulic brake 60A, 60B is released. Hence, the output torque from the electric motor 2A, 2B is transmitted to the rear wheel Wr, and the vehicle 3 accelerates.

As described above, the acceleration of the vehicle 3 is started when the predetermined time has passed after the acceleration request was made by the driver. However, since the ring gear 24A, 24B is locked gradually by the hydraulic brake 60A, 60B and then the ring gear 24A, 24B is locked by the one-way clutch 50, a shock due to the difference in rotation speed between the front wheels Wf and the rear wheels Wr does not occur. The above-mentioned description provides an example in which the vehicle 3, having performing spontaneous deceleration, accelerates; however, similar control is also performed when the vehicle 3, having performing high speed cruise, further accelerates.

Figure 25:
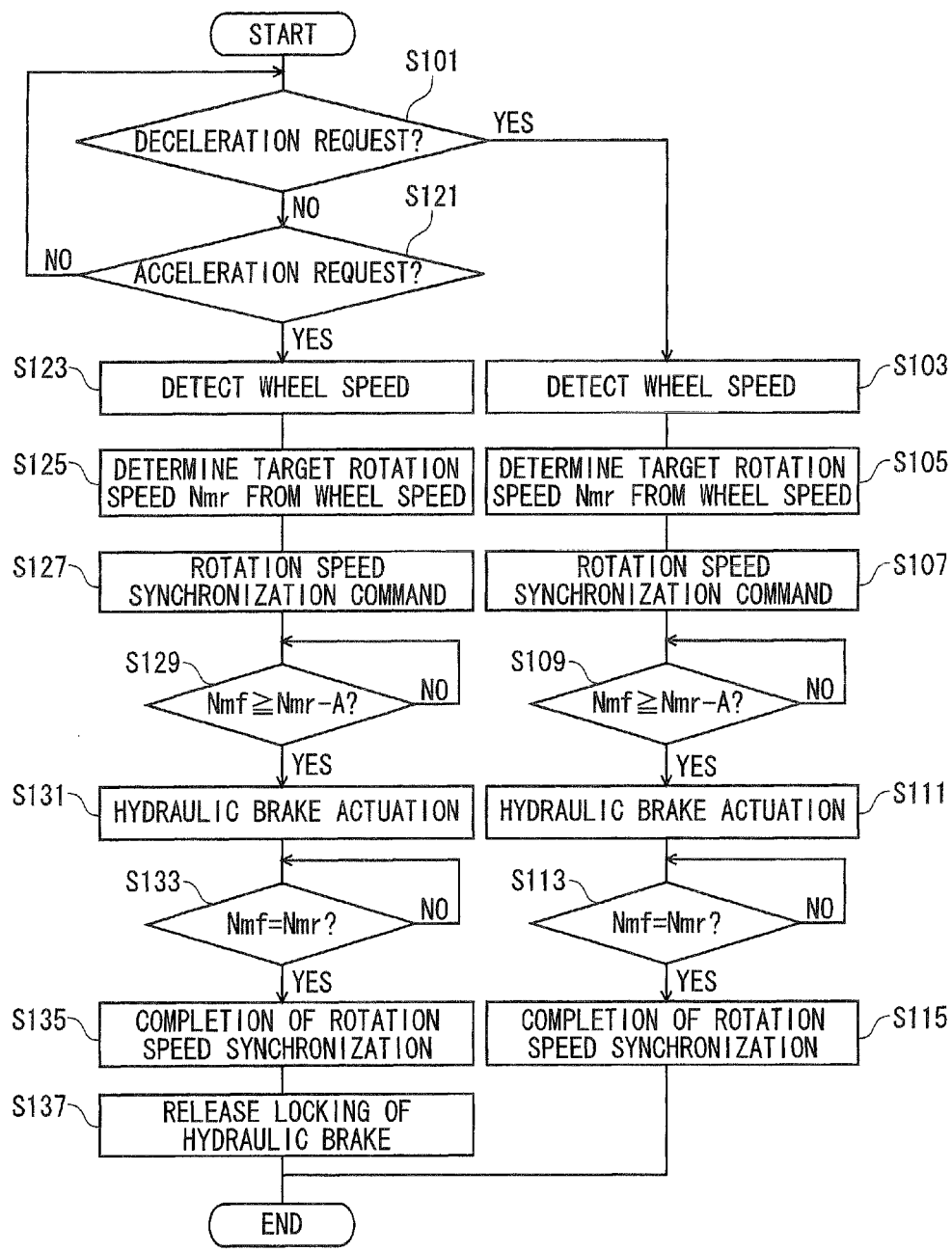
FIG. 25 is a flowchart showing the content of a sequence of control performed by the management ECU 9.

The above-mentioned control performed for the electric motor 2A, 2B and the hydraulic brake 60A, 60B of the drive unit 1 by the management ECU 9 will be described on the basis of a flowchart. FIG. 25 is a flowchart showing the content of the control performed by the management ECU 9. As shown in FIG. 25, the management ECU 9 judges whether a deceleration request from the driver is present on the basis of the brake pedal depression force Br (at step S101). In the case that the deceleration request is present, the processing advances to step S103; in the case that no deceleration request is present, the processing advances to step S121.

At step S103, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S105). Then, the management ECU 9 issues a command (rotation speed synchronization command) for raising the rotation speed (motor rotation speed) Nmf of the electric motor 2A, 2B to the target rotation speed Nmr (at step S107). The management ECU 9 judges whether the motor rotation speed Nmf has reached the value (Nmr−A) lower than the target rotation speed Nmr by the predetermined value (at step S109). When the relationship Nmf≥Nmr−A is satisfied, the management ECU 9 issues a drive command for driving the hydraulic brake 60A, 60B (at step S111).

Next, the management ECU 9 judges whether the motor rotation speed Nmf has reached the target rotation speed Nmr (at step S113). When the relationship Nmf=Nmr is satisfied, the management ECU 9 judges that the rotation speed synchronization of the electric motor 2A, 2B is completed (at step S115). When the management ECU 9 judges that the rotation speed synchronization is completed at step S115, the regeneration torque is applied to the electric motor 2A, 2B in a direction in which the one-way clutch 50 is not engaged. Hence, the management ECU 9 keeps issuing the drive command for driving the hydraulic brake 60A, 60B even after the judgment. Accordingly, regenerative braking using the electric motor 2A, 2B is performed, and the vehicle 3 decelerates.

On the other hand, in the case that no deceleration request is present and the processing advances to step S121, the management ECU 9 judges whether an acceleration request from the driver is present on the basis of the accelerator pedal opening Ap. In the case that the acceleration request is present, the processing advances to step S123; in the case that no acceleration request is present, the processing returns to step S101.

At step S123, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S125). Then, the management ECU 9 issues a command (rotation speed synchronization command) for raising the rotation speed (motor rotation speed) Nmf of the electric motor 2A, 2B to the target rotation speed Nmr (at step S127). The management ECU 9 judges whether the motor rotation speed Nmf has reached the value (Nmr−A) lower than the target rotation speed Nmr by the predetermined value (at step S129). When the relationship Nmf≥Nmr−A is satisfied, the management ECU 9 issues the drive command for driving the hydraulic brake 60A, 60B (at step S131).

Next, the management ECU 9 judges whether the motor rotation speed Nmf has reached the target rotation speed Nmr (at step S133). When the relationship Nmf=Nmr is satisfied, the management ECU 9 judges that the rotation speed synchronization of the electric motor 2A, 2B is completed (at step S135). Next, the management ECU 9 stops issuing the drive command for driving the hydraulic brake 60A, 60B, and releases the locking of the ring gear 24A, 24B using the hydraulic brake 60A, 60B (at step S137). At this time, the electric motor 2A, 2B outputs a drive torque in a direction in which the one-way clutch 50 is engaged. For this reason, the ring gear 24A, 24B is locked by the one-way clutch 50 even after the locking using the hydraulic brake is released. Hence, the output torque from the electric motor 2A, 2B is transmitted to the rear wheel Wr, and the vehicle 3 accelerates.

Figure 26:
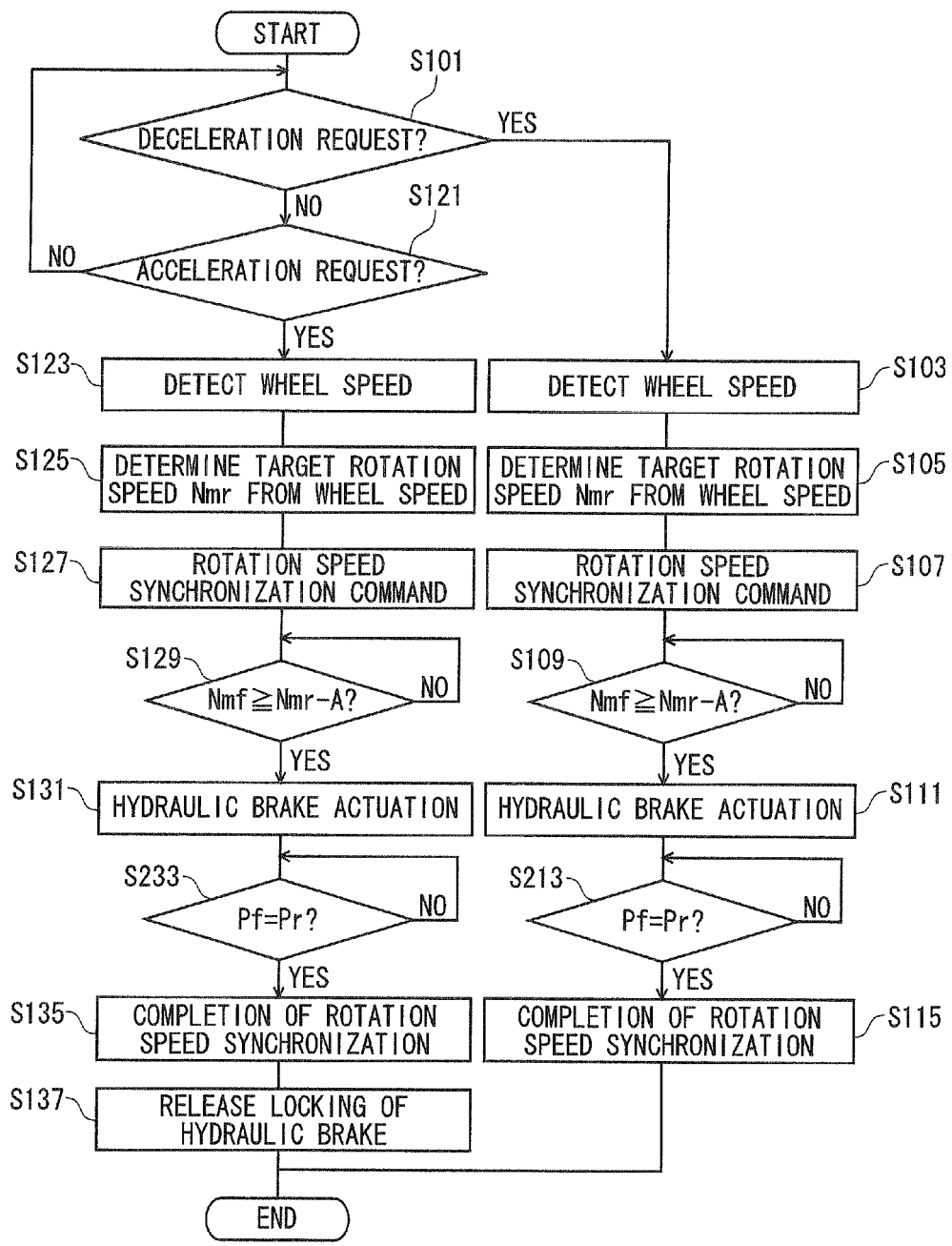
FIG. 26 is a flowchart showing the content of another sequence of control performed by the management ECU 9.
Figure 27:
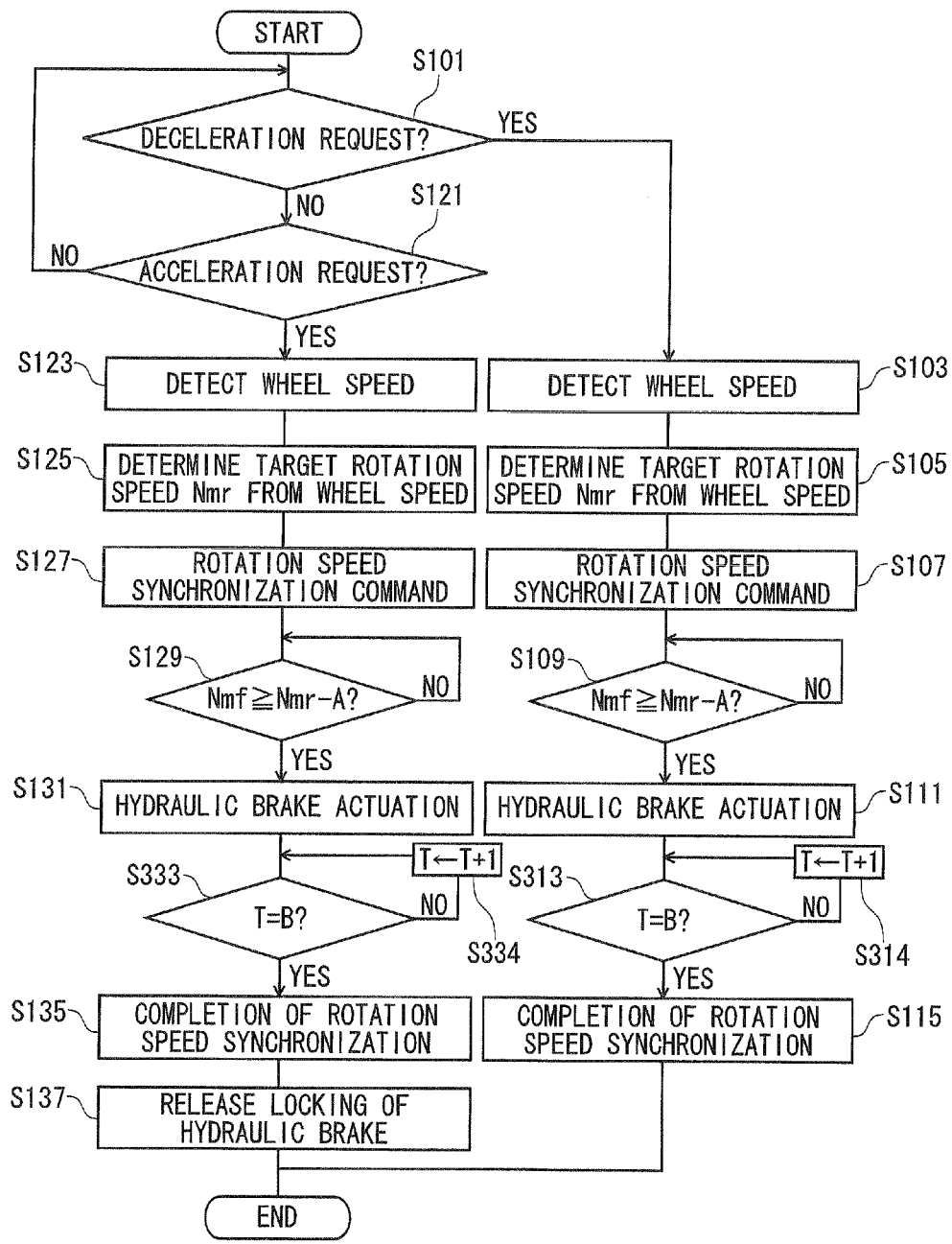
FIG. 27 is a flowchart showing the content of still another sequence of control performed by the management ECU 9.

In the flowchart described above and shown in FIG. 25, the management ECU 9 judges whether the motor rotation speed Nmf has reached the target rotation speed Nmr at steps S113 and S133. However, as shown in FIG. 26, it may be possible that the management ECU 9 judges whether the hydraulic pressure Pf of the hydraulic brake 60A, 60B has reached a predetermined value Pr (at steps S213 and S233), instead of executing steps S113 and S133. Furthermore, as shown in FIG. 27, it may also be possible that the management ECU 9 counts the time T elapsed from the issue of the drive command (at steps S111 and S131) for driving the hydraulic brake 60A, 60B (at steps S314 and S334) and judges whether the elapsed time T has reached the predetermined time B (at steps S313 and S333), instead of executing steps S113 and S133.

As described above, in the second example of the embodiment, when the state of the vehicle 3 is changed from high speed cruise to deceleration regeneration, since the ring gear 24A, 24B is locked gradually by the hydraulic brake 60A, 60B, a shock due to the difference in rotation speed between the front wheels Wf and the rear wheels Wr does not occur. Furthermore, when the vehicle 3, having performing spontaneous deceleration or high speed cruise, accelerates, since the ring gear 24A, 24B is locked gradually by the hydraulic brake 60A, 60B and then the ring gear 24A, 24B is locked by the one-way clutch 50, the shock due to the difference in rotation speed between the front wheels Wf and the rear wheels Wr does not occur. In other words, when the one-way power transmission device is engaged, the shock due to the difference in rotation speed between the front wheels Wf and the rear wheels Wr can be reduced.

The hydraulic pressure applied from the oil pump 70 to the hydraulic brake 60A, 60B when the management ECU 9 issued the drive command for driving the hydraulic brake 60A, 60B may be a high pressure at all times or may be changed from a low pressure to the high pressure. Even in the case that the hydraulic pressure is the high pressure at all times, the ring gear 24A, 24B is locked gradually by the hydraulic brake 60A, 60B. However, the time required until the ring gear 24A, 24B is completely locked is longer in the case that the hydraulic pressure is the high pressure at all times than in the case that the hydraulic pressure changes to the low pressure to the high pressure. Hence, in the case that the flowchart shown in FIG. 27 is used for the control performed by the management ECU 9, the predetermined time B to be compared with the elapsed time T at steps S313 and S333 is longer in the case that the hydraulic pressure is the high pressure at all times than in the case that the hydraulic pressure changes to the low pressure to the high pressure.

Moreover, in the embodiment, the electric motor 2A and the planetary gear reducer 12A of the drive unit 1 control the left rear wheel LWr, and the electric motor 2B and the planetary gear reducer 12B of the drive unit 1 control the right rear wheel RWr. Hence, in the case that the electric motors 2A and 2B are required to be driven while the vehicle 3 is turning, the management ECU 9 makes torque requests being different from each other for the left and right electric motors 2A and 2B. In other words, the management ECU 9 calculates a request torque for each of the left and right electric motors 2A and 2B on the basis of the travel state of the vehicle 3 at this time. The management ECU 9 judges whether the total value of the two request torques is equal to 0 or more. In the case that the total value is equal to 0 or more, the management ECU 9 executes steps S103 to S115 shown in FIGS. 25 to 27. On the other hand, in the case that the total value is less than 0, the management ECU 9 executes steps S123 to S137 shown in FIGS. 25 to 27.

THIRD EXAMPLE

Figure 28:
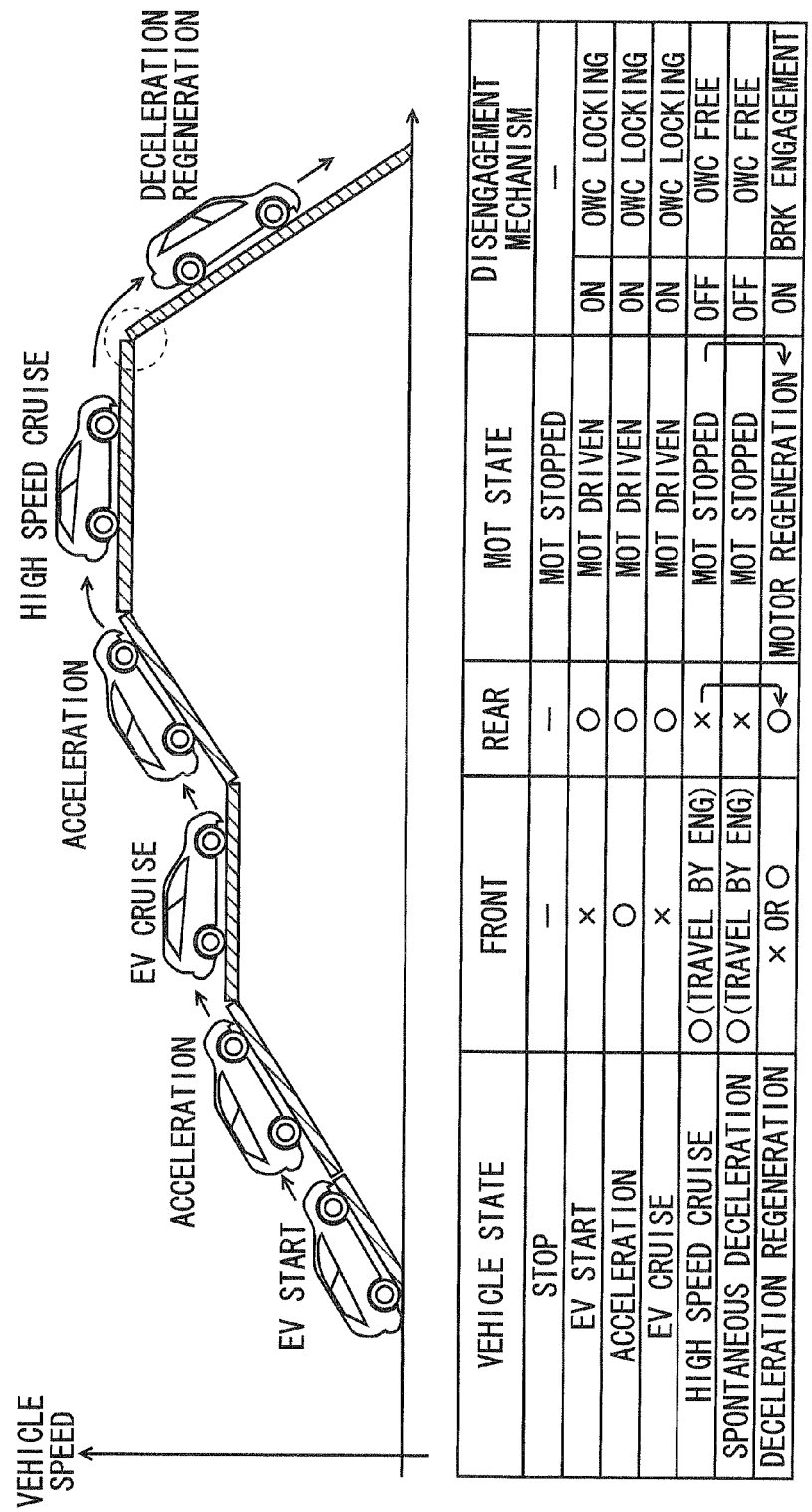
FIG. 28 is a view showing the states of the electric motor 2A, 2B and the states of the disengagement mechanism in the travel state of the vehicle 3.

FIG. 28 is a view showing the states of the electric motor 2A, 2B and the states of the disengagement mechanism (the one-way clutch 50 and the hydraulic brake 60A, 60B) in the travel state of the vehicle 3. "Front" represents the drive unit 6 for driving the front wheels Wf, "rear" represents the drive unit 1 for driving the rear wheels Wr, o indicates active (including drive and regeneration), and x indicates inactive (stop). Furthermore, "MOT state" represents the state of the electric motor 2A, 2B of the drive unit 1. Moreover, "OWC" represents the one-way clutch 50, and "BRK" represents the hydraulic brake 60A, 60B.

At the stop time of the vehicle, the electric motors 2A and 2B of the drive unit 1 are stopped, both the drive unit 6 on the sides of the front wheels Wf and the drive unit 1 on the sides of the rear wheels Wr are stopped, and the disengagement mechanism is also in an inactive state as described referring to FIG. 5.

Next, after the ignition is turned ON, at the time of EV start, the electric motors 2A and 2B of the drive unit 1 for the rear wheels Wr are driven. At this time, as described referring to FIG. 6, the disengagement mechanism is locked by the one-way clutch 50, and the drive power of the electric motors 2A and 2B is transmitted to the axles 10A and 10B.

Then, at the time of acceleration, four-wheel driving is carried out using the drive unit 6 on the side of the front wheels Wf and the drive unit 1 on the side of the rear wheels Wr; at this time, as described referring to FIG. 6, the disengagement mechanism is locked by the one-way clutch 50 and the drive power of the electric motors 2A and 2B is transmitted to the axles 10A and 10B.

At the time of EV cruise at low and medium speed ranges, since the efficiency of the motors is high, the drive unit 6 on the side of the front wheels Wf is inactive and rear-wheel driving is carried out using the drive unit 1 on the side of the rear wheels Wr. At this time, as described referring to FIG. 6, the disengagement mechanism is locked by the one-way clutch 50 and the drive power of the electric motors 2A and 2B is transmitted to the axles 10A and 10B.

On the other hand, at the time of high speed cruise at a high speed range, since the efficiency of the engine is high, front-wheel driving is carried out using the drive unit 6 on the side of the front wheels Wf. At this time, as described referring to FIG. 7, the one-way clutch 50 of the disengagement mechanism is released (OWC free) and the hydraulic brakes 60A and 60B are inactive, whereby the electric motors 2A and 2B are stopped.

Furthermore, also in the case of spontaneous deceleration, as described referring to FIG. 7, the one-way clutch 50 of the disengagement mechanism is released (OWC free) and the hydraulic brakes 60A and 60B are inactive, whereby the electric motors 2A and 2B are stopped.

On the other hand, in the case of deceleration regeneration, for example, in the case that driving is carried out by the drive power of the drive unit 6 on the side of the front wheels Wf, as detailed above referring to FIG. 8, the one-way clutch 50 of the disengagement mechanism is released (OWC free), but the hydraulic brakes 60A and 60B are engaged, whereby regenerative charging is performed by the electric motors 2A and 2B.

Figure 29:
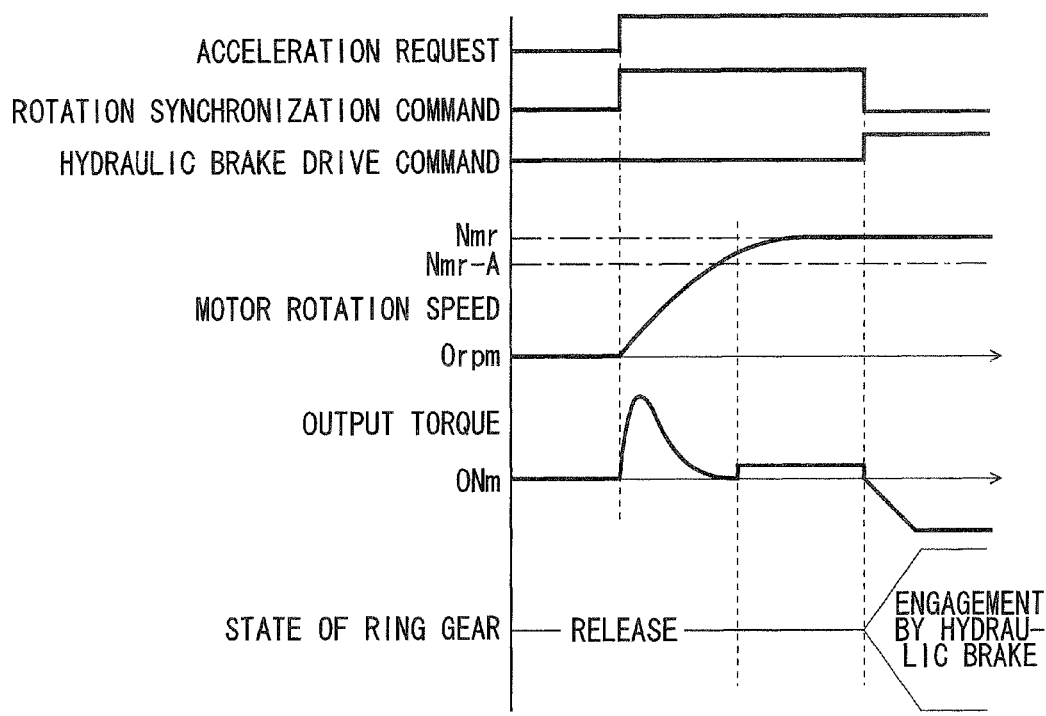
FIG. 29 is a timing chart showing various parameters used when the state of the vehicle 3 is changed from high speed cruise to deceleration regeneration.

Referring to FIGS. 28 and 29, the control performed for the electric motors 2A and 2B and the hydraulic brakes 60A and 60B of the drive unit 1 by the management ECU 9 when the state of the vehicle 3 is changed from high speed cruise to deceleration regeneration will be described below. The timing at which the state of the vehicle 3 is changed from high speed cruise to deceleration regeneration is indicated by an elliptical broken line in FIG. 28. FIG. 29 is a timing chart showing various parameters used when the state of the vehicle 3 is changed from high speed cruise to deceleration regeneration.

As shown in FIG. 28, when the state of the vehicle 3 is high speed cruise, the traveling using the drive unit 6 on the side of the front wheels Wf is performed, and the electric motors 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. Hence, the vehicle 3 is traveling using front-wheel drive. When the driver makes an deceleration request in this state, the management ECU 9 issues a command (rotation speed synchronization command) for raising the rotation speeds (motor rotation speeds) of the electric motors 2A and 2B to the target rotation speed Nmr.

The management ECU 9 judges whether the deceleration request by the driver is present on the basis of the brake pedal depression force Br shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of the signal from the vehicle speed sensor 117 shown in FIG. 1, and the management ECU 9 judges the rotation speeds of the axles 10A and 10B on the basis of the signals from the rotation speed sensors 117a and 117b shown in FIG. 1.

When the motor rotation speed rises to the value (Nmr−A) lower than the target rotation speed Nmr by the predetermined value, the management ECU 9 controls the electric motor 2A, 2B so that the electric motor outputs a constant torque.

After starting the control so that the electric motor 2A, 2B outputs the constant torque, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr or a time point at which a predetermined time has passed after starting the control so that the electric motor 2A, 2B outputs the constant torque.

When the management ECU 9 judges that the rotation speed synchronization of the electric motor 2A, 2B is completed, the management ECU 9 performs control so that the output torque of the electric motor 2A, 2B becomes 0. At this time, a regeneration torque is applied to the electric motor 2A, 2B in a direction in which the one-way clutch 50 is not engaged. Hence, the management ECU 9 issues the drive command for driving the hydraulic brake 60A, 60B to maintain the locking of the ring gear 24A, 24B. According to the drive command, oil is supplied from the oil pump 70 to the hydraulic brake 60A, 60B, and the ring gear 24A, 24B of the planetary gear reducer 12A, 12B is locked by the hydraulic brake 60A, 60B. Since the ring gear 24A, 24B is locked by the hydraulic brake 60A, 60B as described above, regenerative braking using the electric motor 2A, 2B is performed, and the vehicle 3 decelerates.

The timing of the drive command issued by the management ECU 9 to drive the hydraulic brake 60A, 60B is not the same as the timing when the ring gear 24A, 24B is locked by the hydraulic brake 60A, 60B. In other words, a certain period of time is required until the ring gear 24A, 24B is locked due to the time required to supply oil from the oil pump 70 to the hydraulic brake 60A, 60B, the viscosity of the oil, etc.

As described above, in the embodiment, the hydraulic brake 60A, 60B operates while the electric motor 2A, 2B is outputting the constant torque. When the hydraulic brake 60A, 60B operates while the regeneration torque of the electric motor 2A, 2B is increasing, the torque is transmitted suddenly, and a shock occurs in the traveling vehicle 3. However, as described above, in the third example of the embodiment, when the hydraulic brake 60A, 60B is operative, the disengagement mechanism is locked by the one-way clutch 50. At this time, the rotation speed of the electric motor 2A, 2B is synchronized and the ring gear 24A, 24B is not rotating, whereby no shock occurs at the engagement time of the hydraulic brake 60A, 60B and at the regenerative control time of the electric motor 2A, 2B.

Figure 30:
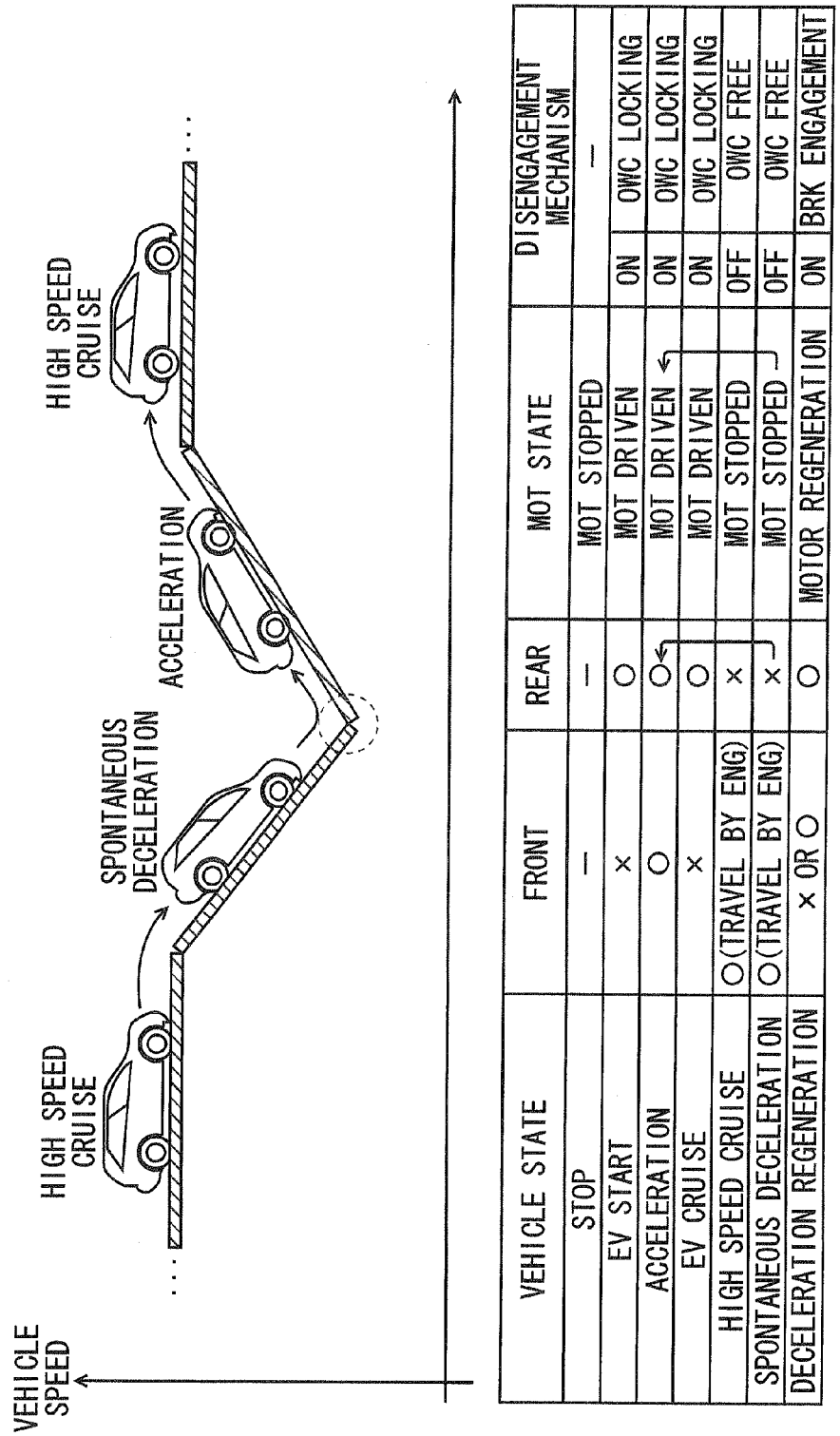
FIG. 30 is a view showing the states of the electric motor 2A, 2B and the states of the disengagement mechanism in the travel state of the vehicle 3.
Figure 31:
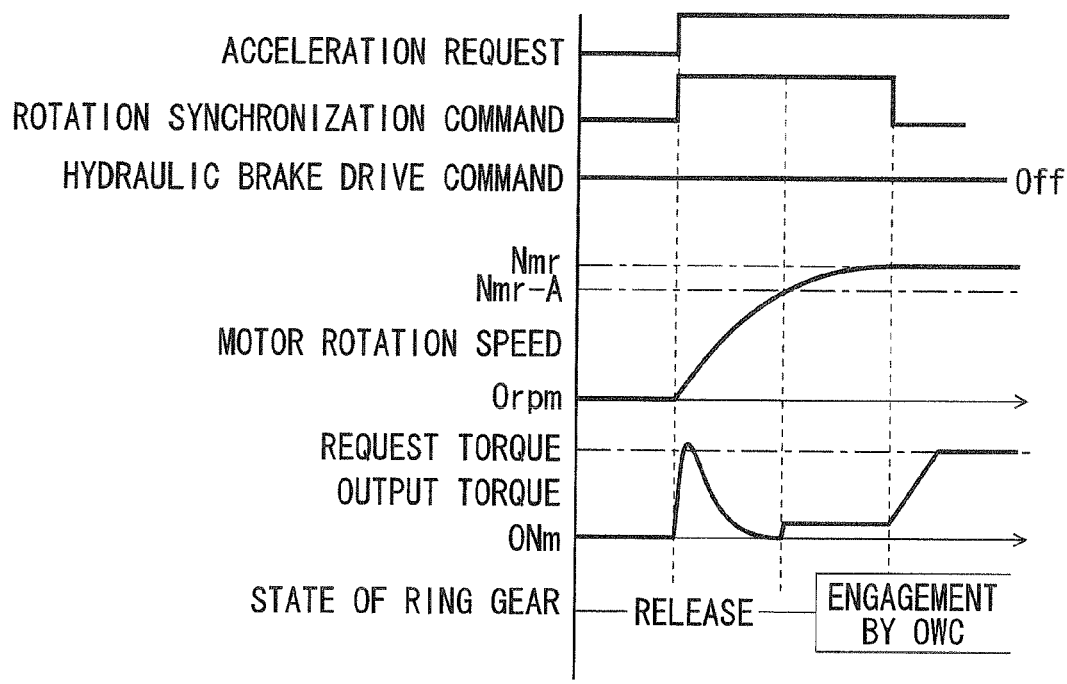
FIG. 31 is a timing chart showing various parameters used when the vehicle 3, having performing spontaneous deceleration, accelerates.

Next, referring to FIGS. 30 and 31, the control performed for the electric motors 2A and 2B of the drive unit 1 by the management ECU 9 when the vehicle 3, having performing spontaneous deceleration, accelerates will be described. FIG. 30 is a view showing the states of the electric motor 2A, 2B and the states of the disengagement mechanism (the one-way clutch 50 and the hydraulic brake 60A, 60B) in the travel state of the vehicle 3. The timing at which the vehicle 3, having been performing spontaneous deceleration, accelerates is indicated by an elliptical broken line in FIG. 30. FIG. 31 is a timing chart showing various parameters used when the vehicle 3, having been performing spontaneous deceleration, accelerates.

As shown in FIG. 30, when the state of the vehicle 3 is spontaneous deceleration, the electric motors 2A and 2B of the drive unit 1 are stopped. Since the electric motors 2A and 2B are stopped, the one-way clutch 50 of the disengagement mechanism is released (OWC free). Furthermore, the hydraulic brakes 60A and 60B are inoperative. When the driver makes an acceleration request in this state, the management ECU 9 issues a command (rotation speed synchronization command) for raising the rotation speeds (motor rotation speeds) of the electric motors 2A and 2B to a target rotation speed Nmr.

The management ECU 9 judges whether the acceleration request by the driver is present on the basis of the accelerator pedal opening Ap shown in FIG. 1. In addition, the management ECU 9 determines the target rotation speed Nmr on the basis of the vehicle speed or the rotation speeds of the axles 10A and 10B. Furthermore, the management ECU 9 judges the vehicle speed on the basis of the signal from the vehicle speed sensor 117 shown in FIG. 1, and the management ECU 9 judges the rotation speeds of the axles 10A and 10B on the basis of the signals from the rotation speed sensors 117a and 117b shown in FIG. 1.

When the motor rotation speed rises to the value (Nmr−A) lower than the target rotation speed Nmr by the predetermined value, the management ECU 9 controls the electric motor 2A, 2B so that the electric motor outputs a constant torque. After starting the control so that the electric motor 2A, 2B outputs the constant torque, the management ECU 9 judges that the rotation speed synchronization of the electric motor 2A, 2B is completed. The timing at which the management ECU 9 judges that the rotation speed synchronization of the electric motor 2A, 2B is completed is a time point at which the rotation speed of the electric motor 2A, 2B has reached the target rotation speed Nmr or a time point at which a predetermined time has passed after starting the control so that the electric motor 2A, 2B outputs the constant torque.

Before the management ECU 9 judges that the rotation speed synchronization of the electric motor 2A, 2B is completed, the ring gear 24A, 24B of the planetary gear reducer 12A, 12B is locked by the one-way clutch 50. At this time, the electric motor 2A, 2B outputs a drive torque in a direction in which the one-way clutch 50 is engaged. Upon judging that the rotation speed synchronization of the electric motor 2A, 2B is completed, the management ECU 9 controls the electric motor 2A, 2B so that the electric motor outputs a request torque. Hence, the output torque from the electric motor 2A, 2B is transmitted to the rear wheel Wr, and the vehicle 3 accelerates.

As described above, in the embodiment, the ring gear 24A, 24B is locked by the one-way clutch 50 while the electric motor 2A, 2B is outputting the constant torque. When the ring gear 24A, 24B is locked while the output torque of the electric motor 2A, 2B is increasing, the torque is transmitted suddenly to the rear wheel Wr, and a shock occurs in the traveling vehicle 3. However, as described above, in the third example of the embodiment, since the output torque of the electric motor 2A, 2B is constant when the ring gear 24A, 24B is locked by the one-way clutch 50, no shock occurs. The above-mentioned description provides an example in which the vehicle 3, having performing spontaneous deceleration, accelerates; however, similar control is also performed when the vehicle 3, having performing high speed cruise, further accelerates.

Figure 32:
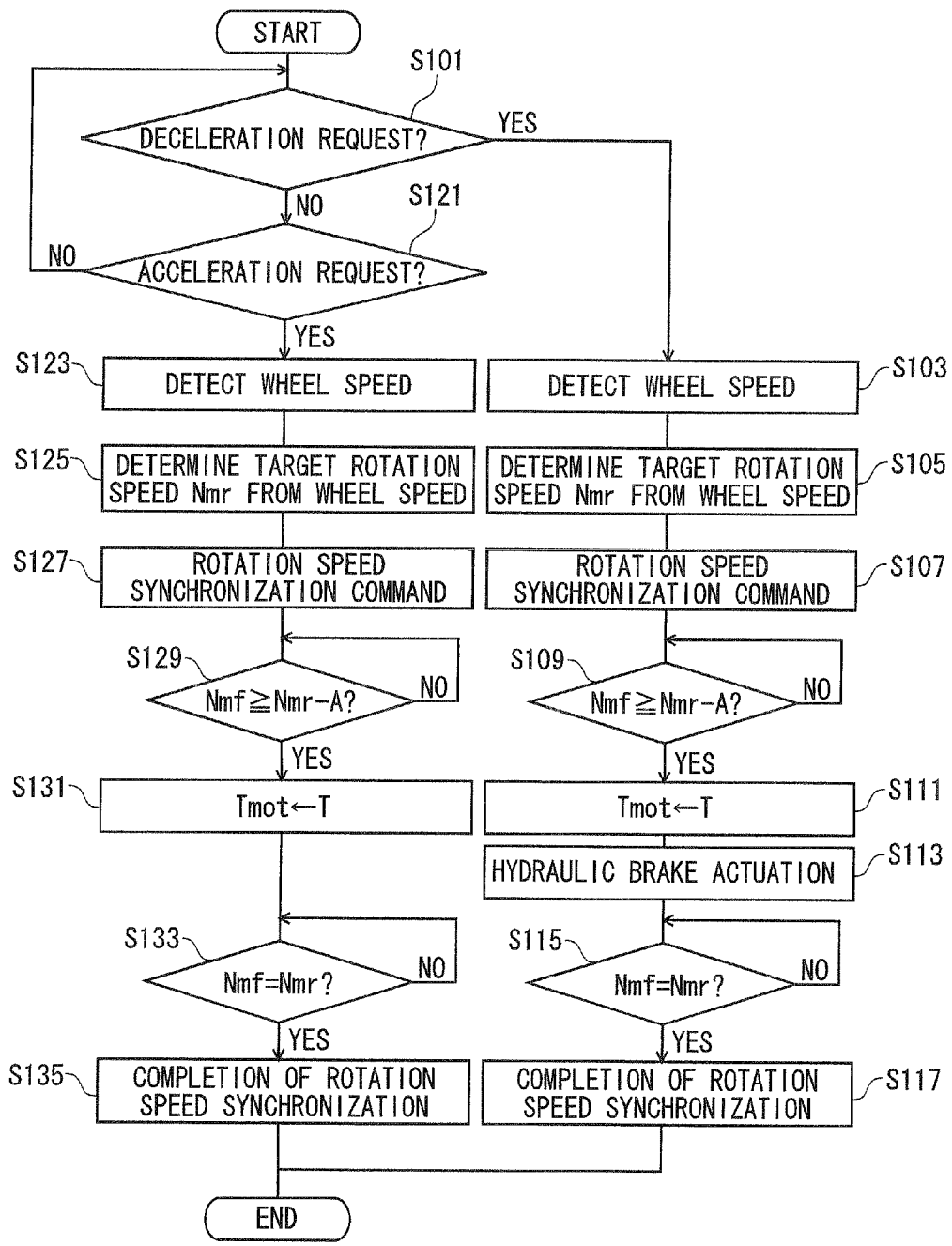
FIG. 32 is a flowchart showing the content of a sequence of control performed by the management ECU 9.

The above-mentioned control performed for the electric motor 2A, 2B and the hydraulic brake 60A, 60B of the drive unit 1 by the management ECU 9 will be described on the basis of a flowchart. FIG. 32 is a flowchart showing the content of the control performed by the management ECU 9. As shown in FIG. 32, the management ECU 9 judges whether a deceleration request from the driver is present on the basis of the brake pedal depression force Br (at step S101). In the case that the deceleration request is present, the processing advances to step S103; in the case that no deceleration request is present, the processing advances to step S121.

At step S103, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S105). Then, the management ECU 9 issues a command (rotation speed synchronization command) for raising the rotation speed (motor rotation speed) Nmf of the electric motor 2A, 2B to the target rotation speed Nmr (at step S107). The management ECU 9 judges whether the motor rotation speed Nmf has reached the value (Nmr−A) lower than the target rotation speed Nmr by the predetermined value (at step S109).

When the relationship Nmf≥Nmr−A is satisfied, the management ECU 9 controls the electric motor 2A, 2B so that the electric motor output the constant torque T (at step S111). Furthermore, the management ECU 9 issues a drive command for driving the hydraulic brake 60A, 60B (at step S113). Next, the management ECU 9 judges whether the motor rotation speed Nmf has reached the target rotation speed Nmr (at step S115). When the relationship Nmf=Nmr is satisfied, the management ECU 9 judges that the rotation speed synchronization of the electric motor 2A, 2B is completed (at step S117). When the management ECU 9 judges that the rotation speed synchronization is completed at step S115, the regeneration torque is applied to the electric motor 2A, 2B in a direction in which the one-way clutch 50 is not engaged. Hence, the management ECU 9 keeps issuing the drive command for driving the hydraulic brake 60A, 60B even after the judgment. Accordingly, regenerative braking using the electric motor 2A, 2B is performed, and the vehicle 3 decelerates.

On the other hand, in the case that no deceleration request is present and the processing advances to step S121, the management ECU 9 judges whether an acceleration request from the driver is present on the basis of the accelerator pedal opening Ap. In the case that the acceleration request is present, the processing advances to step S123; in the case that no acceleration request is present, the processing returns to step S101.

At step S123, the management ECU 9 detects the rotation speed of the axle 10A, 10B on the basis of the signal from the rotation speed sensor 117a, 117b. Next, the management ECU 9 determines the target rotation speed Nmr on the basis of the rotation speed (at step S125). Then, the management ECU 9 issues a command (rotation speed synchronization command) for raising the rotation speed (motor rotation speed) Nmf of the electric motor 2A, 2B to the target rotation speed Nmr (at step S127). The management ECU 9 judges whether the motor rotation speed Nmf has reached the value (Nmr−A) lower than the target rotation speed Nmr by the predetermined value (at step S129).

When the relationship Nmf≥Nmr−A is satisfied, the management ECU 9 controls the electric motor 2A, 2B so that the electric motor outputs the constant torque T (at step S131). Next, the management ECU 9 judges whether the motor rotation speed Nmf has reached the target rotation speed Nmr (at step S133). When the relationship Nmf=Nmr is satisfied, the management ECU 9 judges that the rotation speed synchronization of the electric motors 2A and 2B is completed (at step S135). Upon judging that the rotation speed synchronization of the electric motor 2A, 2B is completed, the management ECU 9 controls the electric motor 2A, 2B so that the electric motor outputs the request torque. Hence, the output torque from the electric motor 2A, 2B is transmitted to the rear wheel Wr, and the vehicle 3 accelerates.

Figure 33:
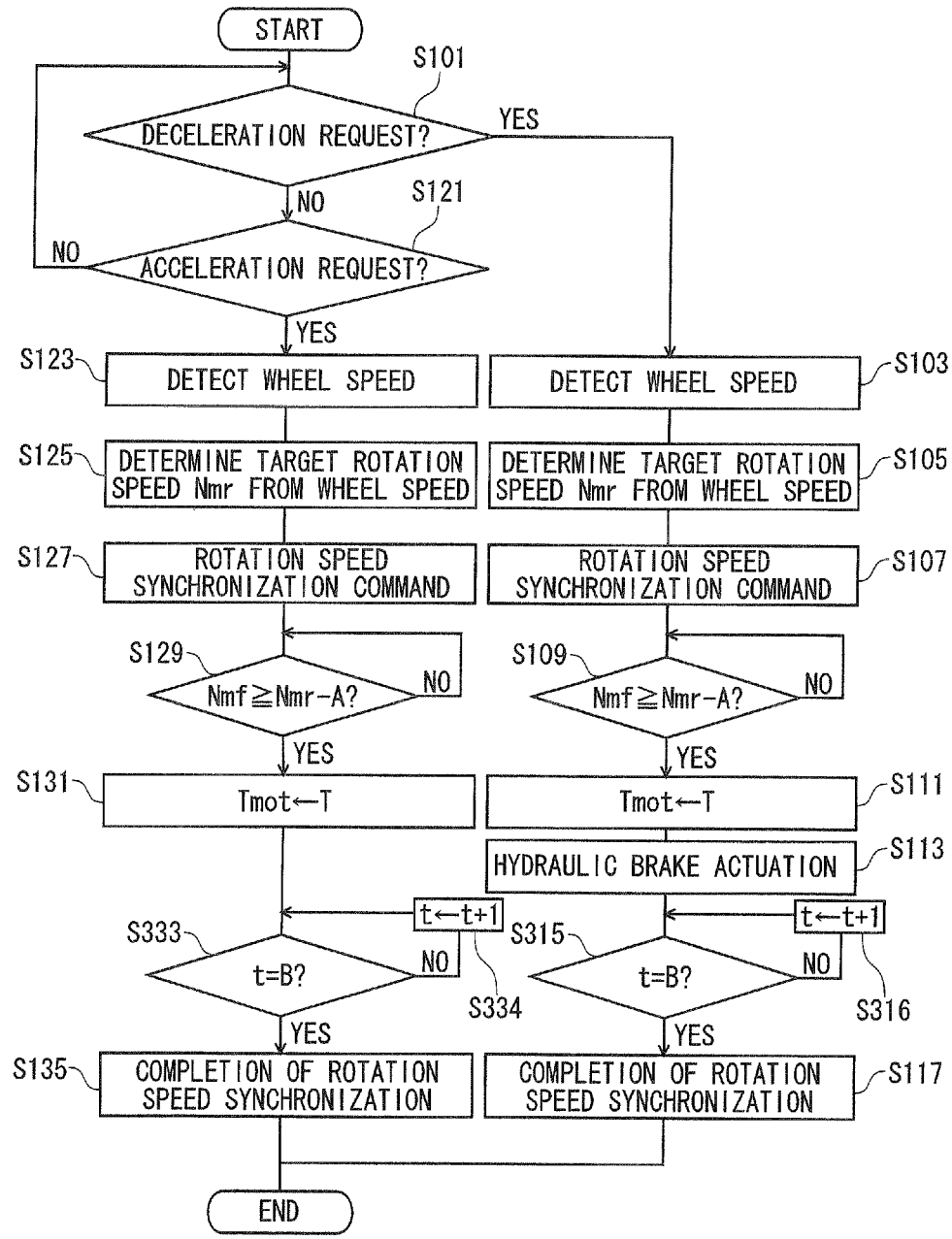
FIG. 33 is a flowchart showing the content of another sequence of control performed by the management ECU 9.

In the flowchart described above and shown in FIG. 32, the management ECU 9 judges whether the motor rotation speed Nmf has reached the target rotation speed Nmr at steps S115 and S133. However, as shown in FIG. 33, it may be possible that the management ECU 9 counts the time t elapsed from the start of the control (steps S111 and S131) in which the electric motor 2A, 2B outputs the constant torque T (at steps S316 and S334) and judges whether the elapsed time t has reached the predetermined time B (at steps S315 and S333), instead of executing steps S115 and S133.

As described above, in the third example of the embodiment, when the state of the vehicle 3 is changed from high speed cruise to deceleration regeneration, since the hydraulic brake 60A, 60B operates while the electric motor 2A, 2B outputs the constant torque, no shock occurs in the traveling vehicle 3. Furthermore, when the vehicle 3, having performing spontaneous deceleration or high speed cruise, accelerates, since the ring gear 24A, 24B is locked by the one-way clutch 50 while the electric motor 2A, 2B outputs the constant torque, no shock occurs in the traveling vehicle 3. In other words, the shock occurring when the one-way power transmission device or the brake is engaged at the time when the electric motor is driven can be reduced.

Further, in the embodiment, the electric motor 2A and the planetary gear reducer 12A of the drive unit 1 control the left rear wheel LWr, and the electric motor 2B and the planetary gear reducer 12B of the drive unit 1 control the right rear wheel RWr. Hence, in the case that the electric motors 2A and 2B are required to be driven while the vehicle 3 is turning, the management ECU 9 makes torque requests being different from each other for the left and right electric motors 2A and 2B. In other words, the management ECU 9 calculates a request torque for each of the left and right electric motors 2A and 2B. The management ECU 9 judges whether the total value of the two request torques is equal to 0 or more. In the case that the total value is equal to 0 or more, the management ECU 9 executes steps S103 to S117 shown in FIGS. 32 and 33. On the other hand, in the case that the total value is less than 0, the management ECU 9 executes steps S123 to S135 shown in FIGS. 32 and 33.

Figure 34:
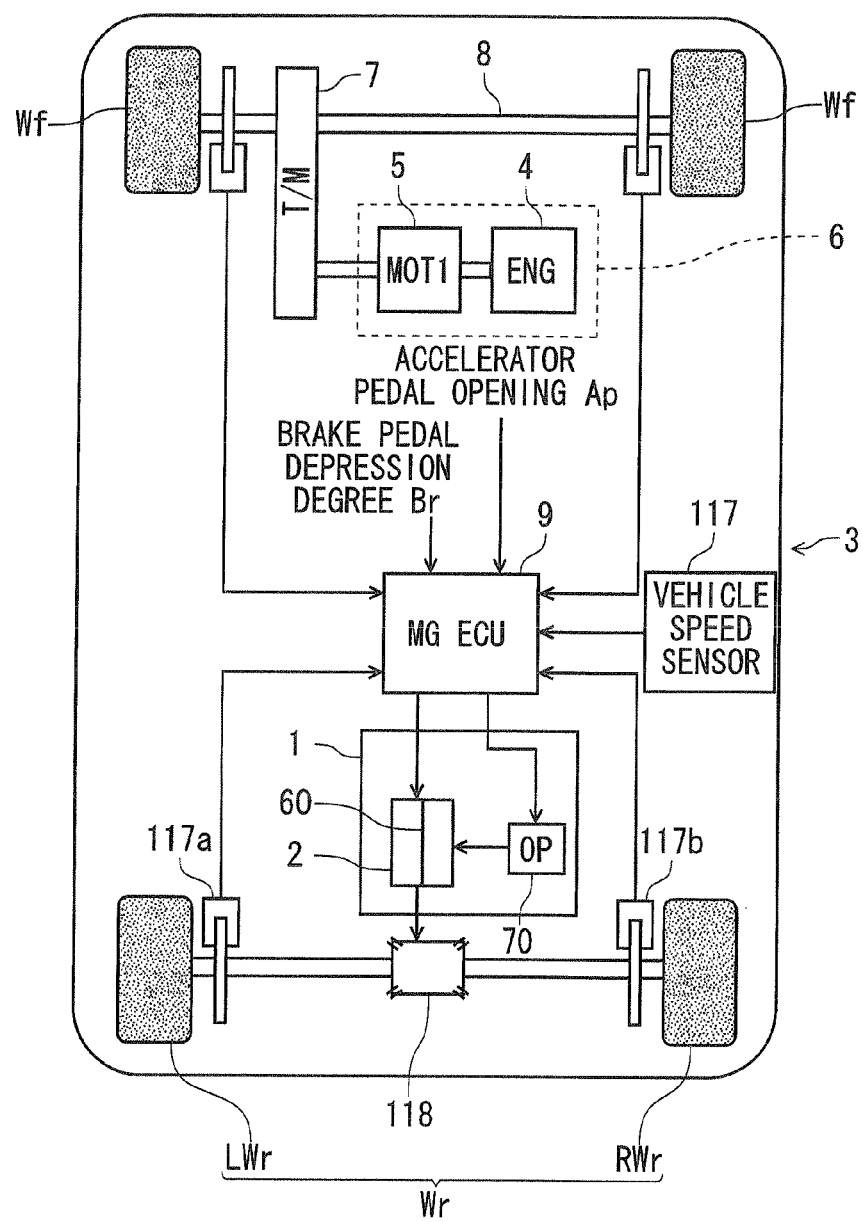
FIG. 34 is a block diagram showing a schematic configuration of a hybrid vehicle according to another embodiment of the vehicle to which the drive unit is applicable.
Figure 35:
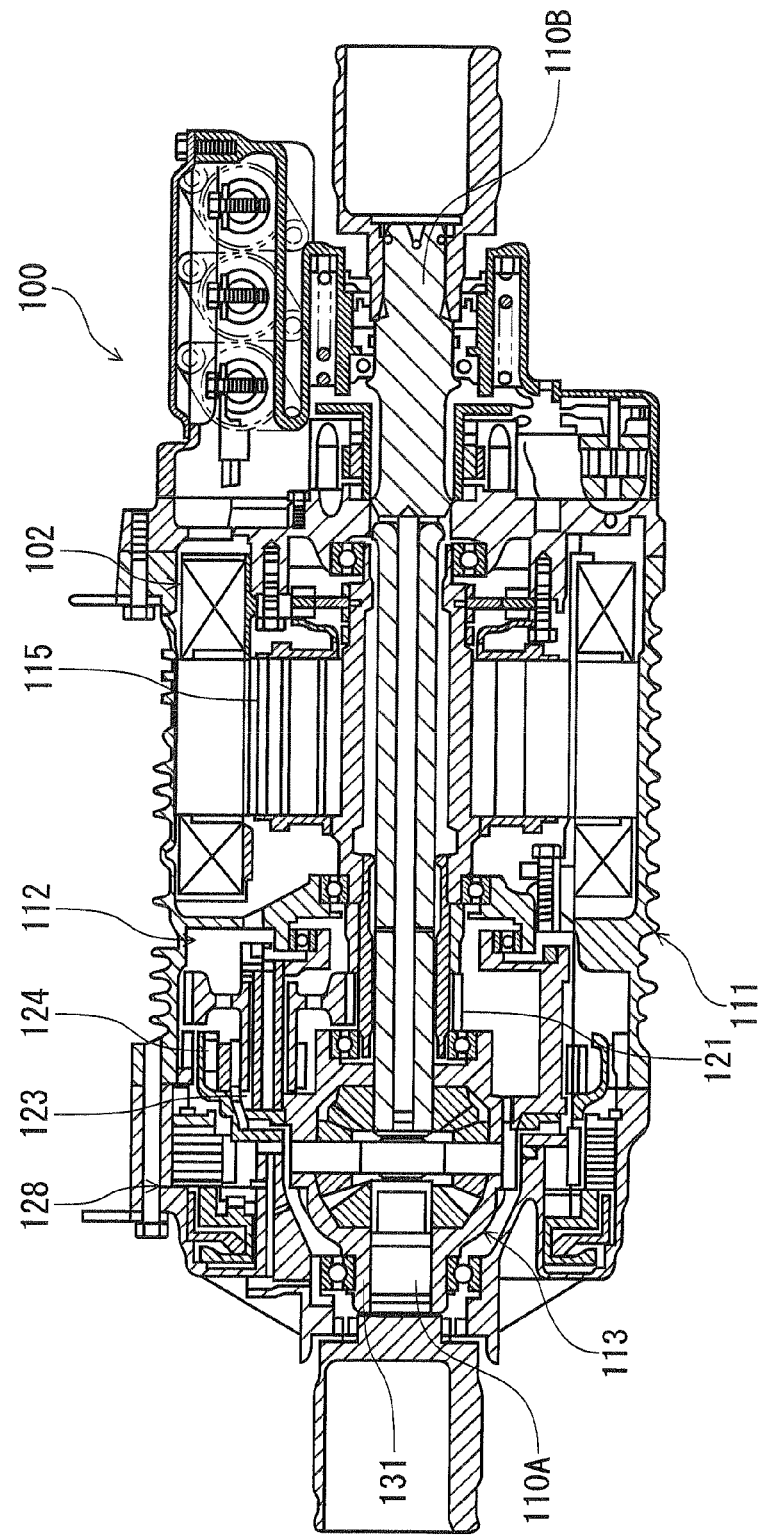
FIG. 35 is a vertical sectional view showing the drive unit described in Patent document 1.
Figure 36:
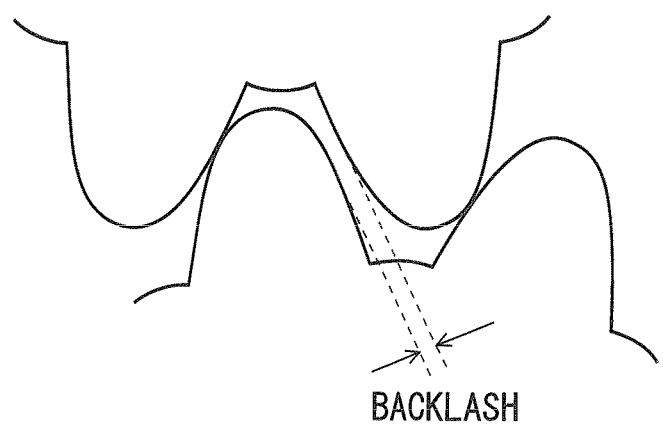
FIG. 36 is a view showing an example of the relationship between two gears opposed to each other and a backlash.
Figure 37:
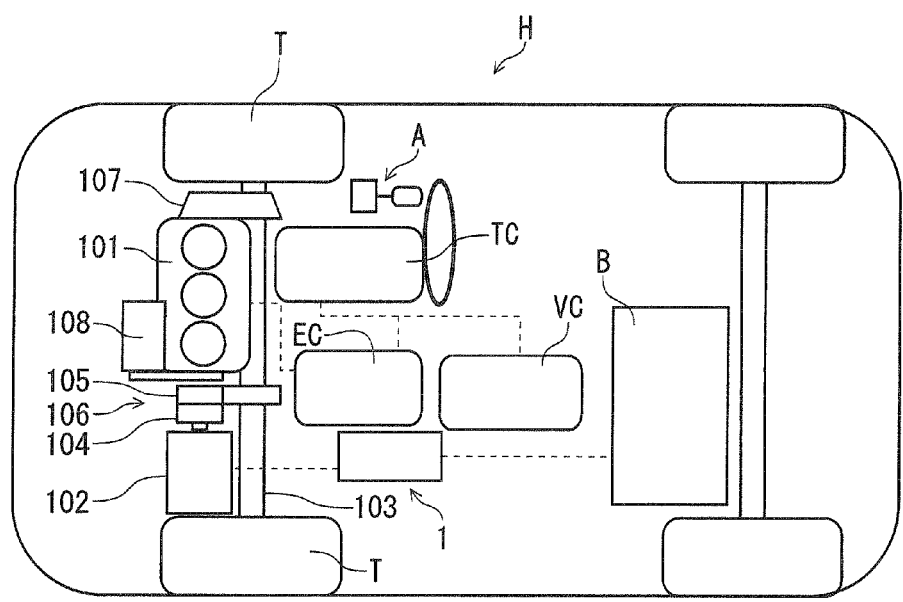
FIG. 37 is an overall view showing the hybrid vehicle described in Patent document 2.
Figure 38:
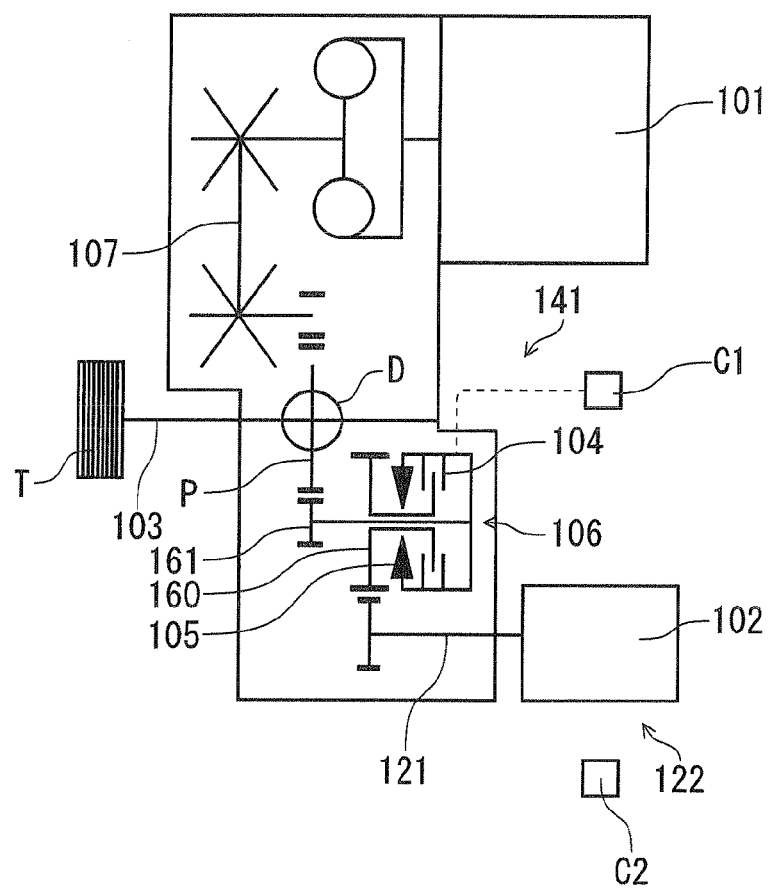
FIG. 38 is a view showing the torque transmission mechanism for use in the hybrid vehicle described in Patent document 2.
Figure 39:
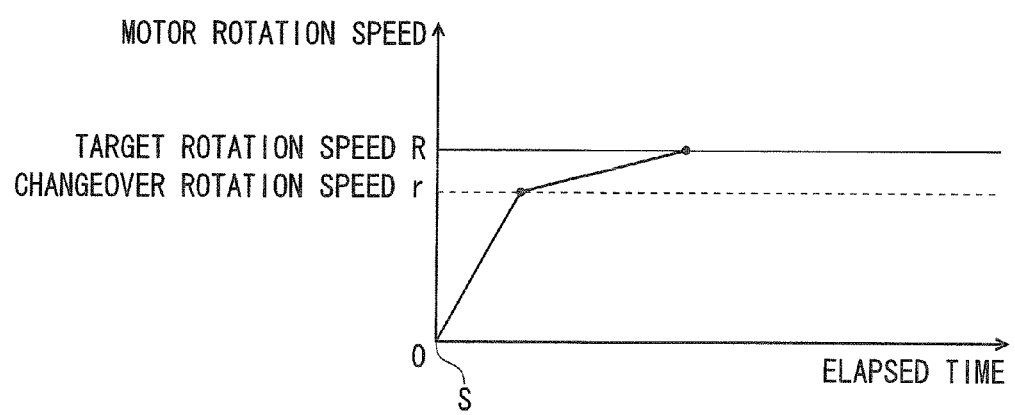
FIG. 39 is a timing chart showing motor rotation speed control performed by the rotation speed control mechanism provided for the hybrid vehicle shown in FIG. 38.

In the above-mentioned drive unit 1, the two electric motors 2A and 2B and the two planetary gear reducers 12A and 12B respectively corresponding to the left and right rear wheels Wr are provided. However, as shown in FIG. 34, a configuration in which one electric motor 2 and one planetary gear reducer 12 common to the left and right rear wheels Wr are provided may be used. In this case, however, a differential gear 118 is provided between the electric motor 2 and the axles so that the vehicle 3 can turn.

Although the present invention has been described in detail and referring to the specific embodiment thereof, it is obvious to those skilled in the art that the present invention can be changed or modified variously without departing from the spirit and scope thereof.

The present application is based on Japanese Patent Application No. 2009-180059 filed on Jul. 31, 2009, Japanese Patent Application No. 2009-180060 filed on Jul. 31, 2009 and Japanese Patent Application No. 2009-180062 filed on Jul. 31, 2009, and the contents thereof are herein incorporated by reference.

EXPLANATIONS OF LETTERS AND NUMERALS 1 drive unit
2A electric motor
2B electric motor
4 internal combustion engine
5 electric motor
6 drive unit
7 transmission
9 management ECU
117 vehicle speed sensor
117a, 117b rotation speed sensor
10A axle
10B axle
11 reducer case
12A planetary gear reducer
12B planetary gear reducer
13 frame member
13a support section
13b support section
16A, 16B cylindrical shaft
18A and 18B intermediate wall
20A, 20B resolver
21A, 21B sun gear
23A, 23B planetary gear
24A, 24B ring gear
26A, 26B first pinion
27A, 27B second pinion
33A, 33B bearing
41A, 41B bus ring
50 one-way clutch
60A hydraulic brake
60B hydraulic brake
70 oil pump
Wf front wheel
Lwr left rear wheel
Rwr right rear wheel

The invention claimed is:

1. A drive controller for a vehicle, the vehicle comprising:
a drive source configured to output a drive force to a first axle serving as one of front and rear wheel axles;
an electric motor configured to output a drive force to a second axle serving as the other of the front and rear wheel axles;
a reducer disposed on a power transmission pathway between the second axle and the electric motor;
a one-way power transmission device disposed on the power transmission pathway in series with the reducer so as to transmit a forward rotation direction torque from the electric motor to the second axle by applying a locking torque to an element of the reducer;
a two-way power transmission device disposed on the power transmission pathway in parallel with the one-way power transmission device so as to transmit a reverse rotation direction torque from the electric motor to the second axle by applying a locking torque to the element of the reducer,
the drive controller comprising:
a first detector that detects a speed of the vehicle or a rotation speed of the second axle;
a target rotation speed determination section that determines a target rotation speed of the electric motor based on the speed of the vehicle or the rotation speed of the second axle detected by the first detector;
a second detector that detects a rotation speed of the electric motor; and
a controller configured to:
control the electric motor such that the rotation speed of the electric motor is synchronized with the target rotation speed at which the one-way power transmission device locks the element of the reducer and an output torque of the electric motor becomes a constant torque after the rotation speed of the electric motor reaches a threshold rotation speed that is lower than the target rotation speed when a drive request for the electric motor is present and the drive request is a request of the forward rotation direction torque, while the vehicle is traveling by the drive force from the drive source with the one-way power transmission device releasing the element of the reducer; and
control the electric motor such that the rotation speed of the electric motor is synchronized with the target rotation speed at which the one-way power transmission device locks the element of the reducer and control the two-way power transmission device such that the two-way power transmission device is gradually activated after the rotation speed of the electric motor reaches the threshold rotation speed that is lower than the target rotation speed when the drive request for the electric motor is present but the drive request is not a request of the forward rotation direction torque, while the vehicle is traveling by the drive force from the drive source with the two-way power transmission device releasing the element of the reducer.

2. The drive controller of claim 1, wherein the controller activates the two-way power transmission device when the electric motor performs a regeneration drive and the rotation speed of the electric motor reaches the threshold rotation speed that is lower than the target rotation speed.

3. The drive controller of claim 1, wherein the controller controls the electric motor such that the electric motor outputs a predetermined torque when the electric motor performs a power drive and the rotation speed of the electric motor reaches the threshold rotation speed that is lower than the target rotation speed.

4. The drive controller of claim 3, wherein the predetermined torque is a constant torque for enabling the rotation speed of the electric motor to be synchronized with the target rotation speed.

5. The drive controller of claim 1, wherein
the electric motor, the reducer, the two-way power transmission device and the second axle are provided for each of left and right wheels provided to the second axle; and
the controller independently controls the output torque of the electric motor corresponding to each of the left and right wheels or the operation of the two-way power transmission device corresponding to each of the left and right wheels when the electric motor starts a power drive or regeneration drive while the vehicle is turning by the drive force from the drive source.

6. The drive controller of claim 1 wherein:
the controller activates the two-way power transmission device when the electric motor starts power drive and the rotation speed of the electric motor reaches the threshold rotation speed that is lower than the target rotation speed; and
the controller inactivates the two-way power transmission device when the rotation speed of the electric motor is synchronized with the target rotation speed.

7. The drive controller of claim 1, wherein the controller is configured to:
activate the two-way power transmission device when the electric motor starts a regeneration drive and the rotation speed of the electric motor reaches the threshold rotation speed that is lower than the target rotation speed; and
maintain an activation of the two-way power transmission device even when the rotation speed of the electric motor is synchronized with the target rotation speed.

8. The drive controller of claim 6, wherein:
the controller determines that the rotation speed of the electric motor is synchronized with the target rotation speed, when the rotation speed of the electric motor has exceeded the threshold rotation speed and reached the target rotation speed.

9. The drive controller of claim 6, wherein:
the two-way power transmission device transmits power between the second axle and the electric motor using a hydraulic pressure; and
the controller determines that the rotation speed of the electric motor is synchronized with the target rotation speed, when the hydraulic pressure of the two-way power transmission device has reached a threshold value.

10. The drive controller of claim 6, wherein the controller determines that the rotation speed of the electric motor is synchronized with the target rotation speed, when a predetermined time has passed after the operation of the two-way power transmission device.

11. The drive controller of claim 1, wherein the controller is configured to:
control the electric motor such that the electric motor outputs a predetermined torque when the electric motor performs a regeneration drive and the rotation speed of the electric motor reaches the threshold rotation speed that is lower than the target rotation speed; and
operate the two-way power transmission device when the rotation speed of the electric motor is synchronized with the target rotation speed.

12. The drive controller of claim 1, wherein the controller controls the electric motor such that the electric motor outputs:
- a predetermined torque when the electric motor performs a power drive and the rotation speed of the electric motor reaches the threshold rotation speed that is lower than the target rotation speed; and
- a requested torque when the rotation speed of the electric motor is synchronized with the target rotation speed.

13. The drive controller of claim 11, wherein the controller controls the electric motor such that the output torque of the electric motor is 0, when the rotation speed of the electric motor is synchronized with the target rotation speed.

14. The drive controller of claim 11, wherein the controller determines that the rotation speed of the electric motor is synchronized with the target rotation speed, when the rotation speed of the electric motor has exceeded the threshold rotation speed and reached the target rotation speed.

15. The drive controller of claim 11, wherein the controller determines that the rotation speed of the electric motor is synchronized with the target rotation speed, when a predetermined time has passed after the controller controls the electric motor such that the electric motor outputs the predetermined torque.

16. The drive controller of claim 11, wherein the predetermined torque is a constant torque for enabling the rotation speed of the electric motor to be synchronized with the target rotation speed.

17. The drive controller of claim 7, wherein:
the controller determines that the rotation speed of the electric motor is synchronized with the target rotation speed, when the rotation speed of the electric motor has exceeded the threshold rotation speed and reached the target rotation speed.

18. The drive controller of claim 7, wherein:
the two-way power transmission device transmits power between the second axle and the electric motor using a hydraulic pressure; and
the controller determines that the rotation speed of the electric motor is synchronized with the target rotation speed, when the hydraulic pressure of the two-way power transmission device has reached a threshold value.

19. The drive controller of claim 7, wherein the controller determines that the rotation speed of the electric motor is synchronized with the target rotation speed, when a predetermined time has passed after the operation of the two-way power transmission device.

20. The drive controller of claim 12, wherein the controller determines that the rotation speed of the electric motor is synchronized with the target rotation speed, when the rotation speed of the electric motor has exceeded the threshold rotation speed and reached the target rotation speed.

21. The drive controller of claim 12, wherein the controller determines that the rotation speed of the electric motor is synchronized with the target rotation speed, when a predetermined time has passed after the controller controls the electric motor such that the electric motor outputs the predetermined torque.

* * * * *